(12) United States Patent
Piestun et al.

(10) Patent No.: US 10,955,331 B2
(45) Date of Patent: Mar. 23, 2021

(54) IMAGING OR MEASUREMENT METHODS AND SYSTEMS

(71) Applicant: THE REGENTS OF THE UNIVERSITY OF COLORADO, A BODY CORPORATE, Denver, CO (US)

(72) Inventors: Rafael Piestun, Boulder, CO (US); Anurag Agrawal, Boulder, CO (US); Sean Quirin, Longmont, CO (US); Anthony Barsic, Boulder, CO (US); Ginni Grover, Boulder, CO (US)

(73) Assignee: The Regents of The University of Colorado, a body corporate, Denver, CO (US)

( * ) Notice: Subject to any disclaimer, the term of this patent is extended or adjusted under 35 U.S.C. 154(b) by 863 days.

(21) Appl. No.: 14/409,397

(22) PCT Filed: Jun. 24, 2013

(86) PCT No.: PCT/US2013/047379
§ 371 (c)(1),
(2) Date: Dec. 18, 2014

(87) PCT Pub. No.: WO2013/192619
PCT Pub. Date: Dec. 27, 2013

(65) Prior Publication Data
US 2015/0192510 A1  Jul. 9, 2015

Related U.S. Application Data

(60) Provisional application No. 61/669,453, filed on Jul. 9, 2012, provisional application No. 61/663,224, filed (Continued)

(51) Int. Cl.
*G01N 15/14* (2006.01)
*G01B 11/00* (2006.01)
(Continued)

(52) U.S. Cl.
CPC ....... *G01N 15/1429* (2013.01); *G01B 11/002* (2013.01); *G01B 11/14* (2013.01);
(Continued)

(58) Field of Classification Search
CPC ...... G01B 11/002; G01B 11/14; G01B 21/16; G01N 15/1429; G01N 15/1456;
(Continued)

(56) References Cited

U.S. PATENT DOCUMENTS

| 3,054,898 A | 9/1962 | Westover et al. |
| 3,597,083 A | 8/1971 | Fraser |

(Continued)

FOREIGN PATENT DOCUMENTS

WO  2007116365 A2  10/2007

OTHER PUBLICATIONS

Chasles, F. et al., "Full-Field Optical Sectioning and Three-Dimensional Localization of Fluorescent Particles Using Focal Plane Modulation," Optics Letters, vol. 31, No. 9, May 1, 2006, 3 pgs.

(Continued)

*Primary Examiner* — Yoshihisa Ishizuka
(74) *Attorney, Agent, or Firm* — Maschoff Brennan; Paul G. Johnson

(57) ABSTRACT

Imaging or measurement methods and systems including methods and systems for finding the three-dimensional orientation and position of multiple dipole-like particles and single molecules, methods and systems for generating helical beams and helical spread functions, and methods and systems for super-resolution and super-localization of dense arrays of emitters.

27 Claims, 32 Drawing Sheets

Related U.S. Application Data on Jun. 22, 2012, provisional application No. 61/663,189, filed on Jun. 22, 2012.

(51) Int. Cl.
*G01B 11/14* (2006.01)
*G01B 21/16* (2006.01)
*G01N 21/64* (2006.01)
*G01N 15/00* (2006.01)

(52) U.S. Cl.
CPC ......... *G01B 21/16* (2013.01); *G01N 15/1456* (2013.01); *G01N 21/6458* (2013.01); *G01N 2015/0038* (2013.01); *G01N 2015/1445* (2013.01)

(58) Field of Classification Search
CPC ....... G01N 21/6458; G01N 2015/1445; G01N 2015/0038
USPC ......................................... 702/151, 150, 152
See application file for complete search history.

(56) References Cited

U.S. PATENT DOCUMENTS

| | | | |
|---|---|---|---|
| 3,901,595 A | 8/1975 | Helava et al. | |
| 3,961,851 A | 6/1976 | Gerharz | |
| 4,178,090 A | 12/1979 | Marks et al. | |
| 4,471,785 A | 9/1984 | Wilson et al. | |
| 4,573,191 A | 2/1986 | Kidode et al. | |
| 4,794,550 A | 12/1988 | Greivenkamp, Jr. | |
| 4,825,263 A | 4/1989 | Desjardins et al. | |
| 4,843,631 A | 6/1989 | Steinpichler et al. | |
| 5,076,687 A | 12/1991 | Adelson | |
| 5,102,223 A | 4/1992 | Uesugi et al. | |
| 5,193,124 A | 3/1993 | Subbarao | |
| 5,243,351 A | 9/1993 | Rafanelli et al. | |
| 5,337,181 A | 8/1994 | Kelly | |
| 5,521,695 A | 5/1996 | Cathey, Jr. et al. | |
| 5,701,185 A | 12/1997 | Reiss et al. | |
| 6,344,893 B1 | 2/2002 | Mendlovic et al. | |
| 6,969,003 B2 | 11/2005 | Havens et al. | |
| 7,342,717 B1 | 3/2008 | Hausmann et al. | |
| 7,604,981 B1 | 10/2009 | Harris, Jr. et al. | |
| 7,705,970 B2 | 4/2010 | Piestun et al. | |
| 8,620,065 B2 | 12/2013 | Piestun et al. | |
| 8,693,742 B2 | 4/2014 | Piestun et al. | |
| 2003/0035105 A1 | 2/2003 | Quist et al. | |
| 2003/0061035 A1 | 3/2003 | Kadmbe | |
| 2003/0096220 A1 | 5/2003 | Lafferty et al. | |
| 2004/0125373 A1 | 7/2004 | Oldenbourg et al. | |
| 2005/0057744 A1 | 3/2005 | Pohle et al. | |
| 2006/0126921 A1 | 6/2006 | Shorte et al. | |
| 2007/0121107 A1 | 5/2007 | Tsai et al. | |
| 2007/0268366 A1 | 11/2007 | Raskar et al. | |
| 2008/0137059 A1 | 6/2008 | Piestun et al. | |
| 2009/0206251 A1 | 8/2009 | Hess et al. | |
| 2009/0244090 A1 | 10/2009 | Zhang et al. | |
| 2009/0295908 A1* | 12/2009 | Gharib ................. | G01B 11/002 348/46 |
| 2010/0231922 A1* | 9/2010 | Hess ........................ | G01B 9/04 356/496 |
| 2010/0278400 A1 | 11/2010 | Piestun et al. | |
| 2011/0002530 A1 | 1/2011 | Zhuang et al. | |
| 2011/0249866 A1 | 10/2011 | Piestun et al. | |
| 2011/0310226 A1 | 12/2011 | McEldowney | |
| 2012/0029829 A1* | 2/2012 | Li ........................ | A61B 5/0059 702/19 |
| 2012/0062708 A1 | 3/2012 | Johnson et al. | |
| 2012/0182558 A1 | 7/2012 | Masumura | |
| 2012/0273676 A1 | 11/2012 | Kuijper | |
| 2013/0102865 A1 | 4/2013 | Mandelis et al. | |
| 2013/0147925 A1* | 6/2013 | Lew ..................... | H04N 13/204 348/49 |
| 2014/0078566 A1 | 3/2014 | Rosen | |
| 2014/0192166 A1 | 7/2014 | Cogswell et al. | |
| 2014/0226881 A1 | 8/2014 | Piestun et al. | |
| 2015/0035946 A1 | 2/2015 | Piestun et al. | |
| 2015/0192510 A1 | 7/2015 | Piestun et al. | |
| 2016/0048963 A1 | 2/2016 | Piestun et al. | |
| 2016/0125610 A1 | 5/2016 | Piestun | |
| 2016/0231553 A1 | 8/2016 | Piestun et al. | |

OTHER PUBLICATIONS

Dowski, Jr., Edward R. et al., "Single-Lens Single-Image Incoherent Passive-Ranging Systems," Applied Optics, vol. 33, No. 29, Oct. 10, 1994, 12 pgs.

Greengard, Adam et al., "Depth From Diffracted Rotation," Optics Letters, vol. 31, No. 2, Jan. 15, 2006, 3 pgs.

Greengard, Adam et al., "Depth From Rotating Point Spread Functions," Proceedings of SPIE, vol. 5557, 2004, 7 pgs.

Greengard, Adam et al., "Fisher Information of 3D Rotating Point Spread Functions," Computational Optical Sensing and Imaging Presentation, Jun. 6, 2005, 31 pages.

Johnson, Gregory E. et al., "Passive Ranging Through Wave-Front Coding: Information and Application," Applied Optics, vol. 39, No. 11, Apr. 10, 2000, 11 pgs.

Juette, "Three-dimensional sub-1 00 nm resolution fluorescence microscopy of thick samples," 2008, Nat Methods 5: 3 pgs.

Kao, H. Pin et al., "Tracking of Single Fluorescent Particles in Three Dimensions: Use of Cylindrical Optics to Encode Particle Position," Biophysical Journal, vol. 67, Sep. 1994, 10 pgs.

Pavani, et al., "Three-dimensional, single-molecule fluorescence imaging beyond the diffraction limit by using a double-helix point spread function", PNAS, Mar. 3, 2009, and online published, Feb. 11, 2009, 5 pgs.

Pavani et al., "Three dimensional tracking of fluorescent microparticles using a photon-limited double-helix response system", Optics Express, 2008, 10 pgs.

Pentland, Alex Paul, "A New Sense for Depth of Field," IEEE Transactions on Pattern Analysis and Machine Intelligence, vol. PAMI-9, No. 4, Jul. 1987, 9 pgs.

Diestun, Rafael et al., "Wave Fields in Three Dimensions: Analysis and Synthesis," J. Opt. Soc. Am. A., vol. 13, No. 9, Sep. 1996, 12 pgs.

Sirat, Gabriel Y., "Conoscopic Holography. I. Basic Principles and Physical Basis," J. Opt. Soc. Am. A, vol. 9, No. 1, Jan. 1992, 14 pgs.

Subbarao, Murali et al., "Analysis of Defocused Image Data for 3D Shape Recovery Using a Regularization Technique," SPIE, vol. 3204, 1997, 12 pgs.

Thomann et al., "Automatic fluorescent tag detection in 30 with super-resolution: application to analysis of ahromosome movement", J. of Microscopy, 2002, 16 pgs.

International Search Report and Opinion, dated Dec. 12, 2014 in PCT Application No. PCT/US2014/052756.

Kong, F. "Photoacoustic-guided convergence of light through optically diffusive media", Opt. Lett. 36, 2053-5 (2011).

Judkewitz, B., "Speckle-scale focusing in the diffusive regime with time reversal of variance-encoded light", Nature Photonics, Mar. 17, 2013, 300-305.

International Search Report and Written Opinion dated Jul. 22, 2014 as received in Application No. PCT/US2014/029391.

International Search Report and Written Opinion dated Jan. 27, 2016 in PCT Application No. PCT/US2015/059331 (15 pages).

Vellekoop I.M., "Focusing coherent light through opaque strongly scattering media", Optics Letters, Aug. 15, 2007, vol. 32, No. 16.

Vellekoop I.M., "Demixing light paths inside disordered metamaterials", Optics Express, Jan. 7, 2008, vol. 16, No. 1.

X. Xu, "Time-reversed ultrasonically encoded optical focusing into scattering media", Nature Photonics 5, Jan. 16, 2011, 154-157.

K. Si., "Breaking the spatial resolution barrier via iterative sound-light interaction in deep tissue microscopy", Scientific Reports, Oct. 19, 2012.

Chaigne, T., "Controlling Light in Scattering Media Noninvasively Using the Photo-acoustic Transmission-matrix".

(56) References Cited

OTHER PUBLICATIONS

Conkey, D.B., "Genetic algorithm optimization for focusing through turbid media in noisy environments", Optics Express, Feb. 27, 2012, vol. 20, No. 5.

Conkey, D.B., "High-speed scattering medium characterization with application to focusing light through turbid media", Optics Express, Jan. 16, 2012, vol. 20, No. 2.

Yang, Xin, "Three-dimensional scanning microscopy through thin turbid media", Optics Express, Jan. 30, 2012, vol. 20, No. 3.

Popoff, S.M., "Measuring the Transmission Matrix in Optics: An Approach to the Study and Control of Light Propagation in Disordered Media", Physical Review Letters, Mar. 12, 2010, PRL 104, 100601.

Yaqoob, Z., "Optical phase conjugation for turbidity suppression in biological samples", Nat Photonics, Jun. 1, 2009.

Si, K., "Fluorescence imaging beyond the ballistic regime by ultrasound pulse guided digital phase conjugation", Nat Photonics, Oct. 1, 2012, 657-661.

Katz, O., "Focusing and compression of ultrashort pulses through scattering media", Nature Photonics 5, May 22, 2011, 372-377.

Aguet, Francois et al., "A Maximum-Likelihood Formalism for Sub-Resolution Axial Localization of Fluorescent Nanoparticles," Optics Express, vol. 13, No. 26, Dec. 26, 2005, 20 pgs.

GB Examination Report dated Feb. 12, 2015 as received in Application No. 1422460.4.

GB Examination Report Search Report dated Jul. 6, 2015 as received in Application No. 1422460.4.

International Search Report and Written Opinion dated Feb. 6, 2014 in related PCT Application No. PCT/US2014/047379 (19 pages).

European Patent Application 13806611.3, Examination Report dated Oct. 16, 2018, 7pgs.

\* cited by examiner

IMAGING OR MEASUREMENT METHODS AND SYSTEMS

STATEMENT AS TO RIGHTS TO INVENTIONS MADE UNDER FEDERALLY SPONSORED RESEARCH AND DEVELOPMENT

This invention was made with government support under grant numbers DBI-0852885, DBI-1063407, and DGE-0801680 awarded by the National Science Foundation. The government has certain rights in the invention.

BACKGROUND

The use of digital devices to collect and store irradiance patterns representative of the scene has provided a convenient means for storing and processing images. Consequently image processing algorithms are increasingly used to decode the sampled patterns into a form conveying the most relevant information to the user. Examples include but are not limited to using algorithms to remove optical aberrations and extract depth information encoded into the collected irradiance pattern. For improved results from post-processing, the imaging system has evolved into functionally encoded optics (both light collection and illumination) to enhance the information extraction capacity for parameters relevant for the user. Such designs may incorporate the use of aberrations, such as defocus for example, to enhance the encoding of 3D information as the shape/size/position/orientation/rotation of an object.

SUMMARY

Figure 1:
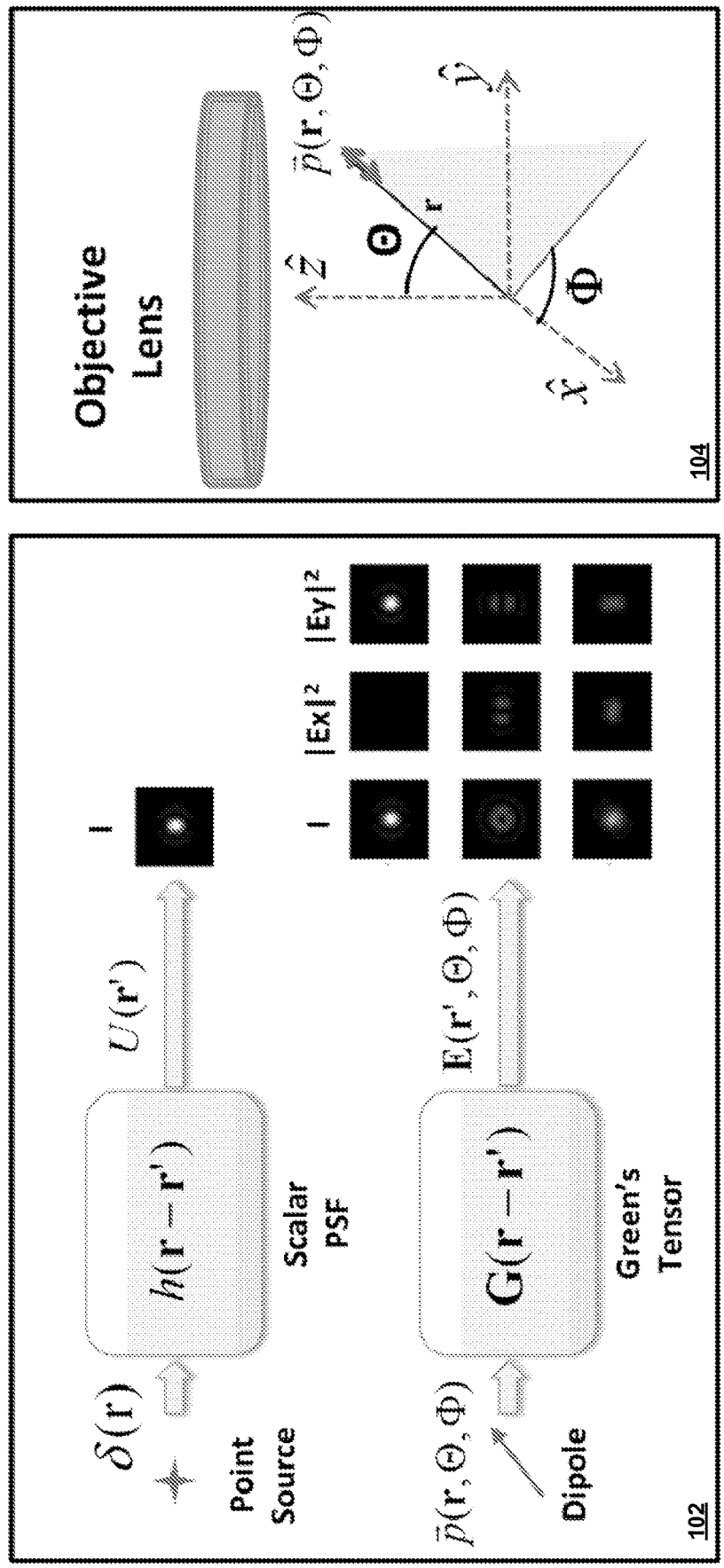
FIG. 1 shows an example first diagram in accordance with the disclosure.

In an aspect, a method for estimating at least one of position and angular orientation of a particle is disclosed. The method may include or comprise imaging at least a portion of a radiation pattern emitted by the particle in response to an excitation beam directed to a medium containing the particle, and estimating at least one of position and angular orientation of the particle within the medium based on an imaged radiation pattern.

Additionally, or alternatively, the method may include or comprise estimating at least one of position and angular orientation of the particle within the medium based on an assumption that the radiation pattern is dipole or dipole-like.

Additionally, or alternatively, the method may include or comprise outputting a measurement that provides a three-dimensional coordinate representation of position of the particle within the medium.

Additionally, or alternatively, the method may include or comprise outputting a measurement that provides a representation of angular orientation of the particle within the medium.

Additionally, or alternatively, the method may include or comprise imaging at least the portion of the radiation pattern using a single particular optical or imaging channel, and estimating position and angular orientation of the particle based on total intensity of the imaged radiation pattern.

Additionally, or alternatively, the method may include or comprise imaging at least the portion of the radiation pattern using a plurality of optical or imaging channels, and estimating position and angular orientation of the particle based on total intensity of the imaged radiation pattern.

Additionally, or alternatively, the method may include or comprise imaging at least the portion of the radiation pattern using a plurality of optical or imaging channels with orthogonal linear polarization states.

Additionally, or alternatively, the method may include or comprise imaging at least the portion of the radiation pattern using a plurality of optical or imaging channels with orthogonal elliptical polarization states.

Additionally, or alternatively, the method may include or comprise imaging at least the portion of the radiation pattern at a single particular focal plane.

Additionally, or alternatively, the method may include or comprise imaging at least the portion of the radiation pattern at a first focal plane and a second different focal plane.

Additionally, or alternatively, the method may include or comprise modulating radiation emitted by the particle in at least one of spatial or temporal phase, amplitude, or polarization.

Additionally, or alternatively, the method may include or comprise selectively modulating radiation emitted by the particle to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

In an aspect, an imaging or measurement system. The imaging or measurement system may include or comprise a source arranged and configured to output an excitation beam that is directed to a sample containing at least one particle that emits a dipole or dipole-like radiation pattern when impinged by the excitation beam, at least one sensor arranged and configured to capture at least one image of at least a portion of a radiation pattern emitted by the at least one particle in response to impingement by the excitation beam, and at least one processing device coupled to the at least one sensor and configured to estimate and store in memory a positional and angular representation of the at least one particle within the sample based on the at least one image.

Additionally, or alternatively, the imaging or measurement system may include or comprise at least one output device coupled to the at least one processing device and configured to output a measurement that provides a three-dimensional coordinate representation of position of the at least one particle within the sample, and a measurement that provides an axis-angle representation of angular orientation of the at least one particle within the sample.

Additionally, or alternatively, the at least one sensor is positioned along a particular optical path of the imaging or measurement system, and the at least one processing device is configured to estimate and store in memory the positional and angular representation of the at least one particle within the sample based on total intensity of at least the portion of the radiation pattern.

Additionally, or alternatively, the at least one sensor is a first sensor, and the imaging or measurement system comprises a beam splitter configured and arranged to direct a radiation emitted by the at least one particle along a first optical path of the imaging or measurement system that includes the first sensor and a second optical path of the imaging or measurement system that includes a second sensor, wherein the at least one processing device is coupled to the first and second sensor and is configured to estimate and store in memory position and angular orientation of the at least one particle based on a first radiation pattern captured by the first sensor and a second radiation pattern captured by the second sensor.

Additionally, or alternatively, the at least one processing device is configured to estimate and store in memory position and angular orientation of the at least one particle based on total intensity of the first radiation pattern and the second radiation pattern.

Additionally, or alternatively, the beam splitter comprises a polarizing beam splitter, and the at least one processing device is configured to estimate and store in memory position and angular orientation of the at least one particle based on combination of the first radiation pattern and the second radiation pattern that have orthogonal linear polarization states.

Additionally, or alternatively, the beam splitter comprises a polarizing beam splitter, and the at least one processing device is configured to estimate and store in memory position and angular orientation of the at least one particle based on combination of the first radiation pattern and the second radiation pattern that have orthogonal elliptical polarization states.

Additionally, or alternatively, the imaging or measurement system may include or comprise a masking module disposed along a particular optical path with the at least one sensor, wherein the masking module is arranged and configured modulate radiation emitted by the at least one particle in at least one of phase, time, amplitude, or polarization.

Additionally, or alternatively, the imaging or measurement system may include or comprise a masking module disposed along a particular optical path with the at least one sensor to selectively modulate radiation emitted by the at least one like particle to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

In an aspect, a computing system is disclosed. The computing system may include or comprise one or more processors, and a memory communicatively coupled with and readable by the one or more processors and having stored therein processor-readable instructions that, when executed by the one or more processors, cause the one or more processors to perform a calculation to estimate, and store within the memory for processing, position and angular orientation of at least one particle within a sample based on an imaged radiation pattern emitted by the at least one particle in response to impingement by an excitation beam directed to the sample containing the at least one particle, wherein radiation emitted by the at least one particle is modulated in at least one of spatial or temporal phase, amplitude, or polarization prior to imaging thereof.

Additionally, or alternatively, the computing system may include or comprise at least one output device coupled to the one or more processors, wherein the processor-readable instructions when executed by the one or more processors cause the one or more processors to output to the at least one output device a measurement that provides a three-dimensional coordinate representation of position of the at least one particle within the sample, and a measurement that provides an axis-angle representation of angular orientation of the at least one particle within the sample.

Additionally, or alternatively, radiation emitted by the at least one particle is selectively modulated prior to imaging thereof to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

In an aspect, a method for generating at least one of point spread functions (PSFs) or helical beams is disclosed. The method may include or comprise passing radiation emitted by one or more emitters through at least one mask module disposed within an optical system to generate a single-helix PSF, a multi-helix PSF, or a helical beam.

Additionally, or alternatively, the at least one mask module comprises at least one phase mask that includes a number of optical phase vortices or phase screw dislocations.

Additionally, or alternatively, the at least mask module comprises at least one mask that modulates one or more properties of at least a portion of radiation emitted by the one or more emitters according to a predetermined application-specific requirement.

Additionally, or alternatively, the method may include or comprise generating one of: the single-helix PSF of light intensity in three-dimensional space; the multi-helix PSF of light intensity in three-dimensional space; and the helical beam.

Additionally, or alternatively, the at least one mask module comprises at least one phase mask that includes a number of optical phase vortices or phase screw dislocations located along about one or more lines.

Additionally, or alternatively, the at least one mask module comprises at least one mask that exhibits apodization.

Additionally, or alternatively, the method may include or comprise selectively modulating radiation emitted by one or more emitters to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

In an aspect, an optical system arranged and configured to generate a point spread function (PSF) of helical form is disclosed. The optical system may include or comprise one or more light sources, one or more masks disposed within the optical system, a lens system disposed within the optical system, one or more sensor arrays disposed within the optical system, wherein the sensor arrays are configured to capture one or more images of at least one particle, and one or more central processing units or graphical processing units to control the optical system and process data received by the one or more sensor arrays to generate the PSF of helical form.

Additionally, or alternatively, at least one of the one or more masks includes a number of optical phase vortices or phase screw dislocations.

Additionally, or alternatively, at least one of the one or more masks are selectively predefined to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

Additionally, or alternatively, the one or more masks generate one of a single-helix and a multi-helix of light intensity in three-dimensional space when emitted radiation is passed therethrough.

Additionally, or alternatively, at least one mask of the one or more masks includes a number of optical phase vortices or phase screw dislocations located along about one or more lines.

Additionally, or alternatively, at least one mask of the one or more masks exhibits apodization.

Additionally, or alternatively, the one or more central processing units or graphical processing units control the optical system and process data received by the one or more sensor arrays to localize the at least one particle in three dimensions.

Additionally, or alternatively, the one or more central processing units or graphical processing units control the optical system and process data received by the one or more sensor arrays to image the at least one particle in three dimensions.

Additionally, or alternatively, the one or more central processing units or graphical processing units control the optical system and process data received by the one or more sensor arrays to estimate range of the at least one particle.

Additionally, or alternatively, the one or more central processing units or graphical processing units control the optical system and process data received by the one or more sensor arrays to image the at least one particle over time in three dimensions.

Additionally, or alternatively, the one or more central processing units or graphical processing units control the optical system and process data received by the sensor arrays to image and localize one or more emitters over time in three dimensions and reconstruct structure of an object by assembling three-dimensional positions of emitter localizations.

Additionally, or alternatively, optical system may include or comprise one or more microscope objectives and a sample stage for mounting a sample.

Additionally, or alternatively, the one or more central processing units or graphical processing units control the optical system and process data received by the one or more sensor arrays to image in three-dimensions, wherein at least one of: rotation free pattern is used as a reference for restoration; optical encoding is estimated from a resulting image using Maximum Likelihood Estimation or a Bayesian estimator to restore an image locally; at least one of multiple images are used to estimate an original three dimensional function; and multiple images are used to estimate the original three dimensional function using a depth-from-defocus operation with local diffusion operations, non-local diffusion operations, or expectation maximization algorithms.

Additionally, or alternatively, a generated PSF of helical form provide an extended depth of field and axial ranging system.

In an aspect, a non-transitory processor-readable medium incorporated within an optical ranging system and comprising processor-readable instructions is disclosed. The processor-readable instructions may be configured to cause one or more processors to at least one of estimate from an optically encoded image using Maximum Likelihood Estimation or Bayesian estimator the locate axial location of an object, estimate a particular three-dimensional function from multiple images, and estimate a particular three-dimensional function from multiple images using depth-from-defocus actions with local diffusion operations, non-local diffusion operations, or expectation maximization algorithms.

In an aspect, a computer-implemented method is disclosed. The method may include or comprise receiving at least one of spatial, temporal, or spectral data associated with emission of radiation from emitters contained within a sample, and estimating a number of emitters within the sample from at least one of spatial, temporal, or spectral characteristics of all solution outputs among a finite set of solution outputs.

Additionally, or alternatively, the method may include or comprise passing radiation emitted by the emitters through an optical system to optimize estimating the number of emitters within the sample.

Additionally, or alternatively, the method may include or comprise determining whether spatial characteristics resemble a superposition of system point spread functions based on the all solution outputs.

Additionally, or alternatively, the method may include or comprise outputting at least one parameter that provides a representation of the estimated number of emitters.

Additionally, or alternatively, the method may include or comprise estimating position of at least one of the number of emitters within the sample.

Additionally, or alternatively, the method may include or comprise passing radiation emitted by the emitters through an optical system to optimize estimating the number of emitters within the sample.

Additionally, or alternatively, the method may include or comprise outputting a measurement that provides a three-dimensional coordinate representation of position of the at least one of the number of emitters within the sample.

Additionally, or alternatively, the method may include or comprise estimating angular orientation of at least one of the number of emitters within the sample.

Additionally, or alternatively, the method may include or comprise outputting a measurement that provides a representation of angular orientation of the at least one of the number of emitters within the sample.

Additionally, or alternatively, the emitters are stationary blinking emitters, molecules, or quantum dots.

In an aspect, a computing system is disclosed. The computing system may include or comprise one or more processors a memory communicatively coupled with and readable by the one or more processors and having stored therein processor-readable instructions that, when executed by the one or more processors, cause the one or more processors to perform a calculation to estimate, and store within the memory for processing, a number of emitters within a sample from at least one of spatial, temporal, or spectral characteristics of all solution outputs among a finite set of solution outputs based upon a corresponding one of spatial, temporal, or spectral data associated with emission of radiation from emitters contained within the sample.

Additionally, or alternatively, the one or more processors having stored therein processor-readable instructions that, when executed by the one or more processors, cause the one or more processors to determine whether spatial characteristics resemble a system point spread function based on the all solution outputs.

Additionally, or alternatively, the one or more processors having stored therein processor-readable instructions that, when executed by the one or more processors, cause the one or more processors to output at least one parameter that provides a representation of the estimated number of emitters.

Additionally, or alternatively, the one or more processors having stored therein processor-readable instructions that, when executed by the one or more processors, cause the one or more processors to estimate position of the number of emitters within the sample.

Additionally, or alternatively, the one or more processors having stored therein processor-readable instructions that, when executed by the one or more processors, cause the one or more processors to output a measurement that provides a three-dimensional coordinate representation of position of the number of emitters within the sample.

In an aspect, a non-transitory processor-readable medium comprising processor-readable instructions is disclosed. The processor-readable instructions may be configured to cause one or more processors to at least one of receive video data of stationary blinking emitters, create a two-dimensional matrix from the video data, where each row is a time series of a particular pixel, perform blind source separation a plurality of times with a different assumed number of blinking emitters, examine at least one of spatial, temporal, and spectral characteristics of particular solutions, and estimate a number of the stationary blinking emitters from the at least one of spatial, temporal, and spectral characteristics of particular solutions.

Additionally, or alternatively, the processor-readable instructions configured to cause one or more processors to determine whether the spatial characteristics resemble a system point spread function based on the particular solutions.

Additionally, or alternatively, the processor-readable instructions configured to cause one or more processors to output for display the estimated number of the stationary blinking emitters.

Additionally, or alternatively, the processor-readable instructions configured to cause one or more processors to estimate position of the number of the stationary blinking emitters within a medium containing the number of the stationary blinking emitters.

Additionally, or alternatively, the processor-readable instructions configured to cause one or more processors to estimate angular orientation of the number of the stationary blinking emitters within a medium containing the number of the stationary blinking emitters.

DETAILED DESCRIPTION

I. Introduction

The present disclosure is generally directed to or towards imaging or measurement methods and systems. For example, methods and systems for finding the three-dimensional (3D) orientation and position of dipole or dipole-like particles and molecules are disclosed herein. Such elements may be "dipole" or "dipole-like" because radiation emitted by the same in response to excitation may be modeled as a dipole, it will be appreciated however that the concepts of the present disclosure are applicable to many other scenarios or models as well. Associated features or elements as described throughout may be beneficial and/or advantageous in many respects, as the 3D orientation and location of individual molecules is an important marker for the local environment and the state of a molecule. Further, precise dipole localization is also significant for superresolution imaging. Additionally, methods and systems for generating helical beams and helical spread functions are disclosed herein. Associated features or elements as described throughout may be beneficial and/or advantageous in many respects, as they may enable the development of optical systems that provide control of the point spread function (PSF) spread and depth range. Further, methods and systems for super-resolution and super-localization of dense arrays of emitters are disclosed herein. Associated features or elements as described throughout may be beneficial and/or advantageous in many respects, as they may enable the use of a combination of spatial and temporal information to precisely resolve a number of emitters at resolutions below the diffraction limit. Although not so limited, an appreciation of the various aspects of the present disclosure may be understood in light of the following description in connection with the drawings.

II. Finding the 3D Orientation and Position of Multiple Dipole-Like Particles and Single Molecules In some embodiments, wide-field microscope configurations are analyzed and/or optimized to simultaneously measure parameters for fixed dipole emitters. Examination of the polarization properties for dipole emitters may reveal how information transfer is improved. An information theoretic analysis may be used to quantify the performance limits through comparison of the Cramer-Rao Lower Bounds (CRB or CRLB) in a photon limited environment. In some embodiments, bi-focal polarization sensitive systems, which detect either linear or elliptical polarization states, are candidates for simultaneously estimating the 3D dipole location and orientation. In quantitative terms, and as may be understood in light of the following in further detail below, such estimation may correspond to an (x, y, z) output or representation for a dipole, as well an output or representation that indicates which axis or axes the dipole is orientated along.

To provide context, it is noted that the photo-physical properties of individual fluorophores, florescent chemical compounds that can re-emit energy upon excitation, can depend on both the orientation and location of a molecule with respect to its environment. Therefore, it is contemplated that direct measurement of these properties is of interest for sampling the local environment, detecting chemical reactions, measuring molecular motions, sensing conformational changes, and/or as a means to realize optical resolution beyond the diffraction limit. Further, using wide-field microscopy for single-molecule detection is beneficial because it may allow for parallelized information throughput from a 3D volume, potentially containing many events of interest. However, certain single-molecule orientation techniques operate on a single molecule at a time and within a reduced depth of defocus, significantly limiting their applicability. These limitations restrict the number of available resolvable elements to analyze the volume.

Standard optical microscopes are limited with respect to localizing isotropically emitting molecules in all three dimensions. The performance may be enhanced with the use of PSFs engineered specifically for 3D localization of isotropic emitters. Single molecules that are free to rotate may be modeled as point emitters as a result of the rapid and random orientation changes on a time scale much shorter than detection device integration time. Techniques that use multiple defocused image planes, astigmatic PSFs, and Double-Helix PSFs (DH-PSFs) have demonstrated that the optical system response may be tailored for a particular task to enhance performance. Efficient estimators have demonstrated the possibility of reaching the fundamental limit of 3D localization precision provided by the CRLB. The use of an accurate system model, proper estimators, and calibration may achieve the localization precision limit and avoid bias. However, the application of such techniques to dipole emitters, such as fixed single molecules, is not straightforward and when the proper model and estimator are not used this may lead to orientation-dependent systematic errors. If present, this bias might be eliminated by proper system (optics and matched reconstruction) design.

A microscope system and/or method is disclosed for estimating the location and/or orientation of multiple fixed dipoles in a wide field system. Such a system and method, or systems and methods, may for example precisely distinguish among different dipole positions and orientations in 3D space. In some embodiments, the response of a system to a dipole input for different positions and orientations is the Green's tensor. Green's tensor engineering as described throughout for the estimation of dipole localization and orientation is the generalization of PSF engineering for the case of isotropic emitters. It is contemplated that the difference is the a priori assumption about the nature of the emitting particles, and what this may imply for the optical system design. In general, PSF engineering assumes the imaging of point emitters and provides the possibility of generating information efficient responses that encode the desired parameters. Similarly, Green's tensor engineering may address the possibility of shaping the optical response to fixed dipoles at varying orientations. With the additional degrees of freedom in dipole orientation, other PSFs designs may no longer provide optimum information, efficient solutions, etc., hence opening the way to novel task specific designs as discussed below. In accordance with the present disclosure, solutions based on polarization encoded imaging are presented and are shown to overcome the limitations of polarization insensitive systems.

Referring now to FIG. 1, an example first diagram 100 is shown in accordance with the principles of the present disclosure. In particular, the first diagram 100 illustrates in schematic 102 the difference between PSF engineering and Green's tensor engineering. The green tensor's is the response of the system to a dipole input, whereas the PSF is the response of the system to a point source. The output of the Green's tensor system is a function of the dipole orientation. Each of the rows shown in schematic 102 related to the Green's tensor system is a unique dipole orientation. The first diagram 100 further illustrates in schematic 104 the position and orientation of a dipole with respect to an objective lens, here $(\Theta, \Phi)$ represent the azimuthal and polar angles respectively, with the z-axis is parallel to the optical axis. In this manner, and as described in further detail below, a quantitative output or representation of a dipole may be derived to simultaneously estimate the 3D location and orientation of the dipole.

The intensity distribution resulting from dipole radiation has analytic solutions. Given the position $(x_0, y_0, z_0)$ and orientation $(\Theta, \Phi)$ (e.g., schematic 104 in FIG. 1) of a dipole immersed in a medium of refractive index $n_1$, the far-field radiation pattern in the spherical co-ordinate system may be given as $$E_\theta = \pi(\theta)[\cos\Theta \sin\theta + \sin\Theta \cos(\phi-\Phi)] \quad (1)$$

$$E_\phi = -\pi(\theta)\sin\Theta \sin(\phi-\Phi)] \quad (2)$$

where $\pi(\theta)$ is the phase factor introduced due to the position of the dipole and given by $$\pi(\theta) = \exp[ikn_1(x_0 \sin\theta \cos\phi + y_0 \sin\theta \sin\phi - z_0 \cos\theta)] \quad (3)$$

Above, $E_\theta$ and $E_\phi$ denote the azimuthal and polar fields, respectively, and angles $\theta$ and $\phi$ denote the azimuthal and polar angles. An objective lens (e.g., see schematic 104 in FIG. 1) acts as a coordinate transformation element that maps the fields from spherical coordinates, object space, to cylindrical coordinates, back focal plane. Accordingly, the fields and the intensity distribution at the back focal plane of the microscope objective are given as $$\begin{bmatrix} E_\phi \\ E_\rho \end{bmatrix} = \begin{bmatrix} E_\phi \\ E_\theta \end{bmatrix} \frac{\sqrt{n_2}}{\sqrt{n_1} \cos\theta} \quad (4)$$

$$I(r, \phi, \Theta, \Phi) \propto (E_\rho E_\rho^* + E_\phi E_\phi^*) \quad (5)$$

where $n_2$ is the refractive index after the microscope objective and the ratio $\sqrt{n_2}/\sqrt{n_1}\cos\theta$ is required for energy conservation. The field at the back focal plane is then focused on the detector using a tube lens. A polarization element or modulation device may be placed in the back focal plane to engineer the response of the system or Green's tensor.

Here, systems in consideration are standardized to use an objective lens with numerical aperture (NA) of 1.4 and an assumed emission wavelength of the emitter at $\lambda=532$ nm. The dipole is assumed to be immersed in a medium of refractive index $n_1=1.52$. The $E_\rho$ and $E_\phi$ fields obtained are in cylindrical coordinates, but for convenience the fields may be decomposed in orthogonal linear polarizations given as $$E_y = E_\rho \sin\phi + E_\phi \cos\phi \quad (6)$$

$$E_x = E_\rho \cos\phi - E_\phi \sin\phi \quad (7)$$

From the above equations, and as shown in at least schematic 102 of FIG. 1, it may be understood that the emission pattern of the dipole, the total intensity I, and the intensity of the two linear polarizations $|E_x|^2$ and $|E_y|^2$ strongly depend on dipole orientation.

Figure 2:
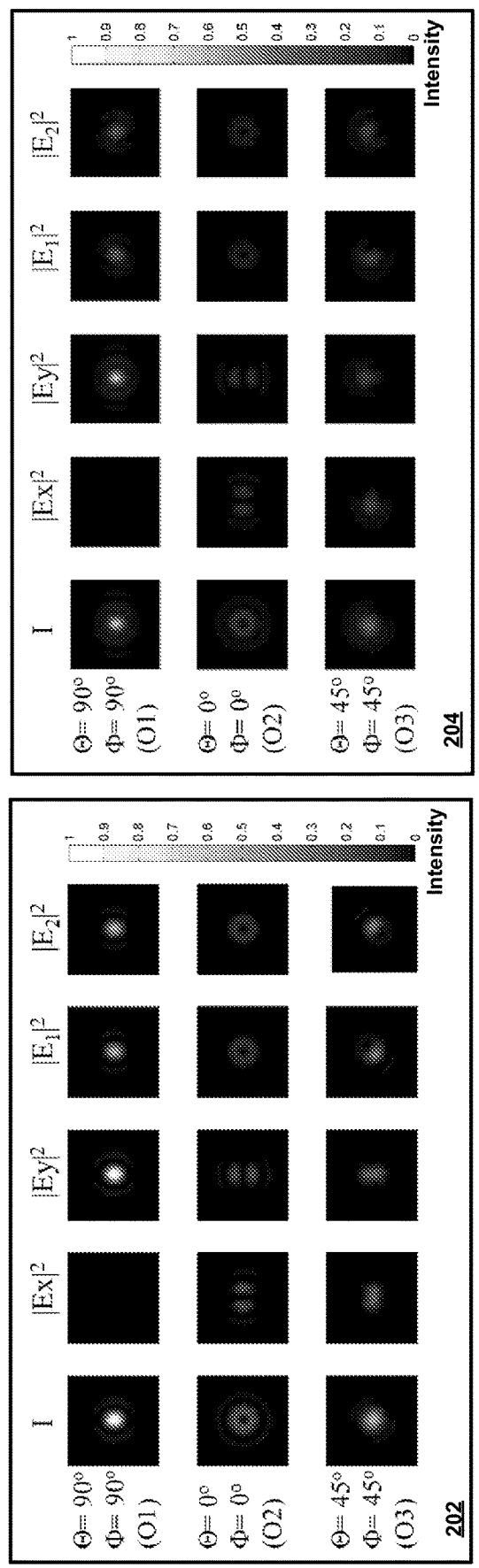
FIG. 2 shows an example second diagram in accordance with the disclosure.

Referring now additionally to FIG. 2, an example second diagram 200 is shown in accordance with the principles of the present disclosure. In particular, the second diagram 200 illustrates in plot 202 the associated intensity distributions for a dipole located at the focal plane, and in plot 204 the associated intensity distributions for a dipole located at or about 200 nm from the focal plane. More specifically, the second diagram 200 illustrates a simulation of detected images for dipoles aligned along three representative orientations, where I is the detected total intensity in a single channel system, and $|Ex|^2$, $|Ey|^2$, $|E_1|^2$, and $|E_2|^2$ correspond to images obtained in two-channel systems. The dipole is oriented along $\hat{y}(\Theta=90°\ \Phi=90°)$, also referred to as O1, $\hat{z}(\Theta=0°\ \Phi=0°)$, also referred to as O2, and $(\Theta=45°\ \Phi=45°)$, also referred to as O3.

FIG. 2 thus shows five different intensity distributions, corresponding to the five columns in each of plot 202 and plot 204, demonstrating the variability when using either total intensity or two different polarization state decompositions. For a dipole oriented along $\hat{y}$ the intensity $|Ex|^2$ is zero and all the energy lies in the intensity $|Ey|^2$. This is because the electric field of a dipole is linearly polarized along the dipole axis; which is true even when the dipole is defocused, implying that there is no information about the z-position of the dipole in $|Ex|^2$ for a dipole along $\hat{y}$. In order to ensure that, irrespective of the orientation of the dipole, neither of the two orthogonal polarizations states are zero, it is contemplated that a set of elliptical polarization images to be realized by combining the linear polarizations may be used $$E_1 = (E_x + iE_y)/\sqrt{2} \quad (8)$$

$$E_2 = (iE_x + E_y)/\sqrt{2} \quad (9)$$

It may be understood that $E_1$ and $E_2$ form an orthogonal basis set. The intensity distributions of these two elliptical polarizations are shown as the last two columns in FIG. 2, both in plot 202 and plot 204. Further, it may be understood that for the dipole orientations considered here, the elliptical polarization method results in uniform energy distribution between the two images. The simulated images in FIG. 2 reveal that molecule localization and orientation information is carried in the images at the orientations investigated, and it is contemplated that the total intensity microscope (Case A), the linear polarization microscope (Case B) and elliptical polarization microscope (Case C) are possible solutions.

As discussed further below in connection with FIG. 3, a number of different imaging systems are contemplated and compared, which are designed to employ either linear polarization, elliptical polarization or no polarization, as a means to retrieve additional information from the system towards dipole localization/orientation estimation. In addition to investigating the utility of polarization modulation, the use of bi-focal microscope configurations (i.e. simultaneously capturing the images at two different planes) is contemplated, as it may be applicable for the axial localization of isotropic emitters. Because of the inherent low signal collection in single-molecule imaging, each system may be designed so that no photons exiting the objective pupil are lost beyond the neglected minor losses at the passive devices such as, for example, polarizers, wave plates, lenses, beam splitters, etc.

Figure 3:
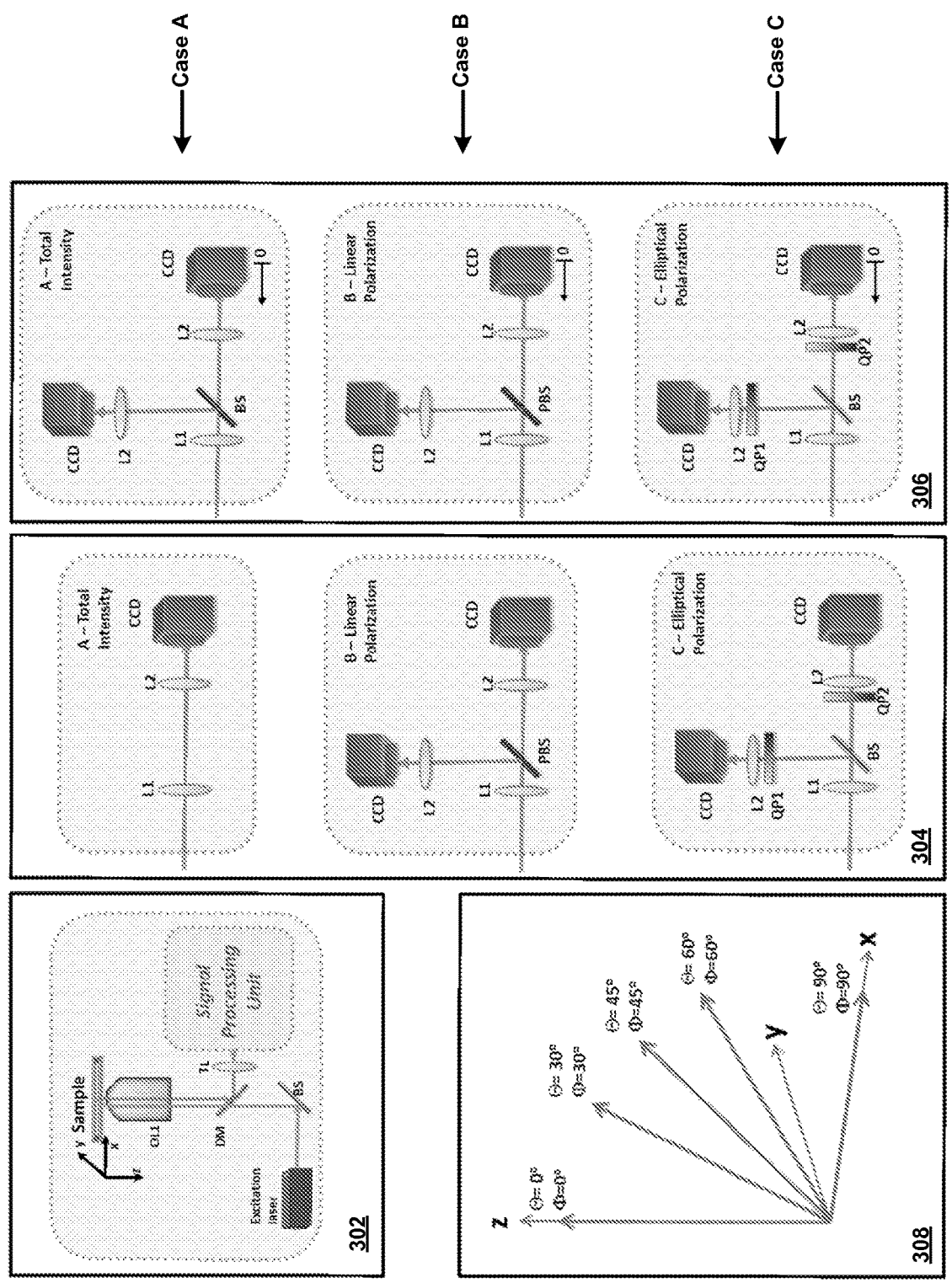
FIG. 3 shows an example third diagram in accordance with the disclosure.

Referring now to FIG. 3, an example third diagram 300 is shown in accordance with the principles of the present disclosure. In particular, the third diagram 300 illustrates in schematic 302 an imaging system or set-up including an excitation laser, a sample, a signal processing unit, and a number components (e.g., lens, mirror, objective, etc.) disposed within or along an imaging or optical path. The third diagram 300 further illustrates six optical signal processing systems split into two categories, Category 1 and Category 2. The third diagram 300 illustrates in schematic 304 Category 1 systems that collect information from a single focal plane. The third diagram 300 illustrates in schematic 306 Category 2 systems that uses two images located at two different focal depths. The systems as shown in schematic 304 and schematic 306 may each respectively be wholly or at least partially incorporated within or the single processing unit shown in schematic 302, and may be further categorized as total intensity systems (Case A), linear polarization systems (Case B), and elliptical polarization systems (Case C). Case A considers a unit that images the total intensity; whereas Case B considers the use of two imaging channels with orthogonal linear polarization states, the dipole emission is collected by a microscope objective and split by a polarizing beam splitter in the back focal plane. Case C shows the use of two imaging channels that employ orthogonal elliptical polarizations as shown in equations (8) and (9) above. In Case C, the emission light is split using a 50:50 beam splitter in the back focal plane and each channel contains a polarizer element such as a quarter-wave plate. The quarter-wave plate in channel one (1) has its fast axis along x, whereas the quarter-wave plate in channel two (2) has its fast axis along y. These two channels are then imaged separately using a pair of tube lenses.

Referring now additionally to FIG. 2, the intensity distributions show that for dipoles oriented along O1 ($\Theta=90°\ \Phi=90°$) and O2 ($\Theta=0°\ \Phi=0°$) some of the systems in Cases A, B and C might be lacking in information about the dipole's position and/or orientation whereas there is finite information for dipoles oriented along O3 ($\Theta=45°\ \Phi=45°$). Results for two intermediate orientations at O4 ($\Theta=30°\ \Phi=30°$) and O5 ($\Theta=60°\ \Phi=60°$) may also be obtained. The third diagram 300 illustrates in schematic 308 these five dipole orientations (O1, O2, O3, O4, and O5).

Referring still to FIG. 3, the third diagram 300 illustrates at least six example systems considered for dipole location and orientation estimation in accordance with the present disclosure. In particular, the third diagram 300 illustrates: in schematic 302 a traditional microscope system with a signal processing unit for Green's function engineering; in schematic 304 three signal processing units that focus at the same plane; and in schematic 306 three signal processing units that focus at two different planes leading to a bifocal system. In schematic 304 and schematic 306 Case A represents systems that measures the total intensity, Case B represents systems with two polarization channels, imaging the intensities $|Ex|^2$ and $|Ey|^2$ separately, and Case C represents systems with two polarization channels, imaging the intensities of the elliptical polarizations components, $(|E_x + iE_y|^2)/2$ and $(|iE_x + E_y|^2)/2$ separately. Further, as mentioned above, the third diagram 300 illustrates in schematic 308 the five dipole orientations used to compare the six systems. Various imaging components illustrated within the third diagram 300 include: TL or tube lens; L1/L2 or relay lenses; OL1 or objective lens; DM or dichroic mirror; PBS or polarizing beam splitter; QP1/QP2 or quarter-wave plates with fast axis along x and y, respectively. Other embodiments are possible. For example, more or fewer components may be used or incorporated within imaging systems in accordance with the present disclosure, and further type and number of components may be implementation-specific.

It is contemplated that the performance of a single-molecule localization/orientation solution may be analyzed using CRLB. The CRLB is a fundamental quantity associated with the lowest realizable variance to calculate the parameters of interest with unbiased estimation methods. It is further contemplated that various other lower bound analysis techniques may also be used without limitation. The lowest standard deviation of the estimator is found from the square-root of the variance (CRLB) given as $$\sigma = \sqrt{CRLB} \quad (10)$$

The standard deviation directly yields the error bound in the same units as the data measured. The imaging systems may be assumed to shift-invariant in the transverse direction, which is a good approximation in the central region of the field of view. Hence, the CRLB remains constant with transverse shifts. For 3D imaging and localization, the minimum localization volume may be of interest. One measure of this uncertainty volume may be given as $$\sigma_{3D} = \frac{4\pi}{3} \sigma_x \cdot \sigma_y \cdot \sigma_z \quad (11)$$

Similarly, for estimating the orientation of a dipole, the solid angle error may be given as $$\sigma_\Omega = \sin(\Theta) \sigma_\Theta \cdot \sigma_\Phi \quad (12)$$

Figure 4:
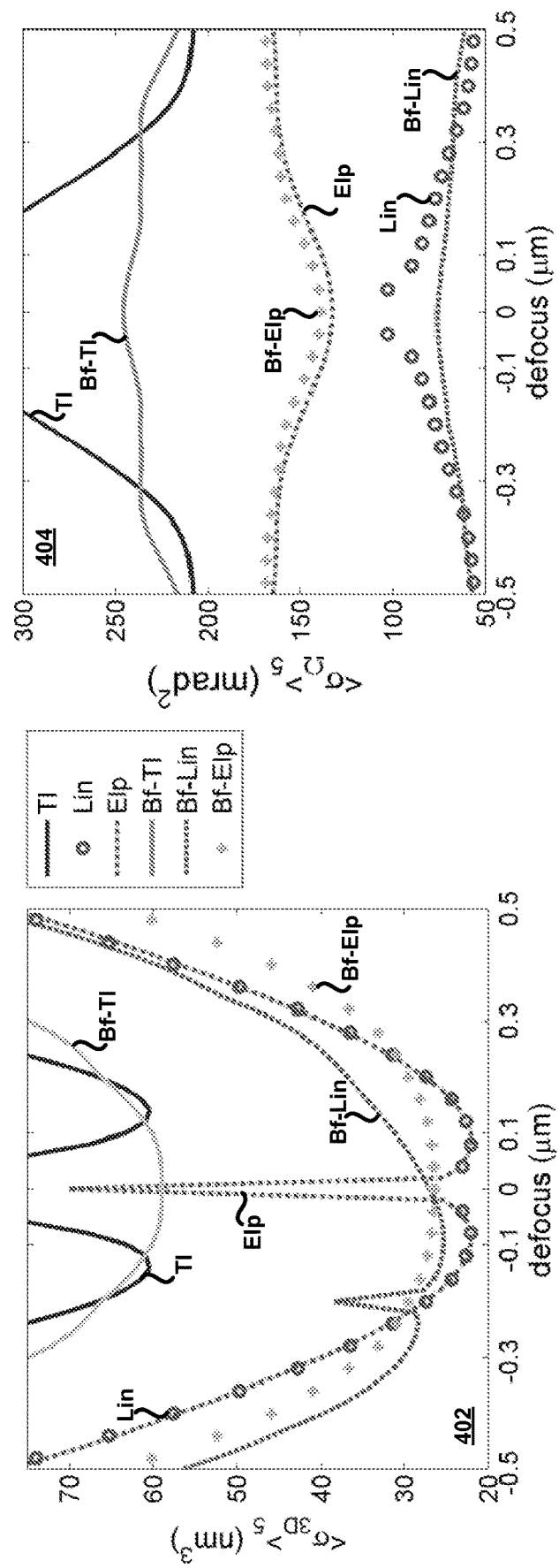
FIG. 4 shows an example fourth diagram in accordance with the disclosure.

Referring now to FIG. 4, an example fourth diagram 400 is shown in accordance with the principles of the present disclosure. In particular, the fourth diagram 400 illustrates in plot 402 average of volume localization as modeled by equation (11) as a function of defocus (μm), and in plot 404 average of solid angle error as modeled by equation (11) as a function of defocus (μm), for the five representative dipole orientations (O1, O2, O3, O4, and O5) mentioned above with respect to the axial position of the dipole. For the bifocal systems, the two focal planes were offset by 400 nm and the x-axis represents the center of the two planes. The legend indicates or identifies the six imaging systems mentioned above, single measurement-total intensity (TI; blue solid line), linear polarizations (Lin; green circles), elliptical polarizations (Elp; red dashed line), bi-focal total intensity (bf-TI; cyan solid line), bi-focal with linear polarization (bf-Lin; magenta dashed line), bi-focal with elliptical polarization (bf-Elp; yellow "plus" sign).

The CRLB for dipole position and orientation in the shot noise limit can be compared using about 5000 photons for the six imaging systems. As mentioned above, plot 402 and plot 404 in FIG. 4 show, respectively, the average of standard deviation for 3D position estimation and solid angle estimation over the five dipole orientations with respect to the axial position of the dipole. It may be understood from FIG. 4 that for an in-focus molecule, the 3D position estimation and solid angle estimation for the single channel system (see e.g., FIG. 3 in schematic 304; Case A) and the linear polarization system (see e.g., FIG. 3 in schematic 304; Case B) increases rapidly, whereas for the elliptical system (see e.g., FIG. 3 in schematic 304; Case C) they have relatively smaller value. These relatively high averages are because in near focus these three systems carry either none or very little information about z-position variations of the dipoles that lie in the x-y plane ($\Theta=90°$) and dipoles that are oriented along the optical axis ($\Theta=0°$). Therefore, it is contemplated that in some embodiments the best estimate for the z-position of the dipole is the depth of focus. Also, far from focus, the linear and elliptical polarization systems exhibit more precise localization than total intensity system but the linear polarization system has the least overall CRLB for estimating the solid angle. Thus when uniform performance over a defocus range of –z to +z is desired single plane systems may not be the best candidates.

In order to analyze the bi-focal systems, a defocus of 400 nm was chosen by optimizing the average CRLB for the dipole oriented along ($\theta=45°$, $\Phi=45°$). This orientation was selected since it gives a finite CRLB for all the different systems and for all defocus values. Among the three bi-focal systems, the system that measures the total intensity has a substantially higher 3D position estimation and solid angle estimation throughout the defocus region compared to the bi-focal systems that employ polarization. The bi-focal systems with linear and elliptical polarization present a flatter curve in the region of interest with the linear polarization system showing a lower CRLB than the elliptical one for solid angle estimation. It is noted that the bi-focal linear curve is asymmetric about z=0 and has a spike at defocus –0.2 μm. Since the radiation of a dipole is linearly polarized, the "Ex" channel of the bi-focal linear system, for a dipole along ($\Theta=90°$, $\Phi=90°$), has no information at focus and this coupled with the "Ey" channel at z=–400 nm results in a spike in the CRLB curve at –200 nm. Thus, in some embodiments, for 3D localization, depending on the region of interest, either the bi-focal elliptical system or one of the single-plane linear or elliptical systems would serve as suitable best candidates, but for orientation estimation, the bi-focal linear curve has the lowest error.

Figure 5:
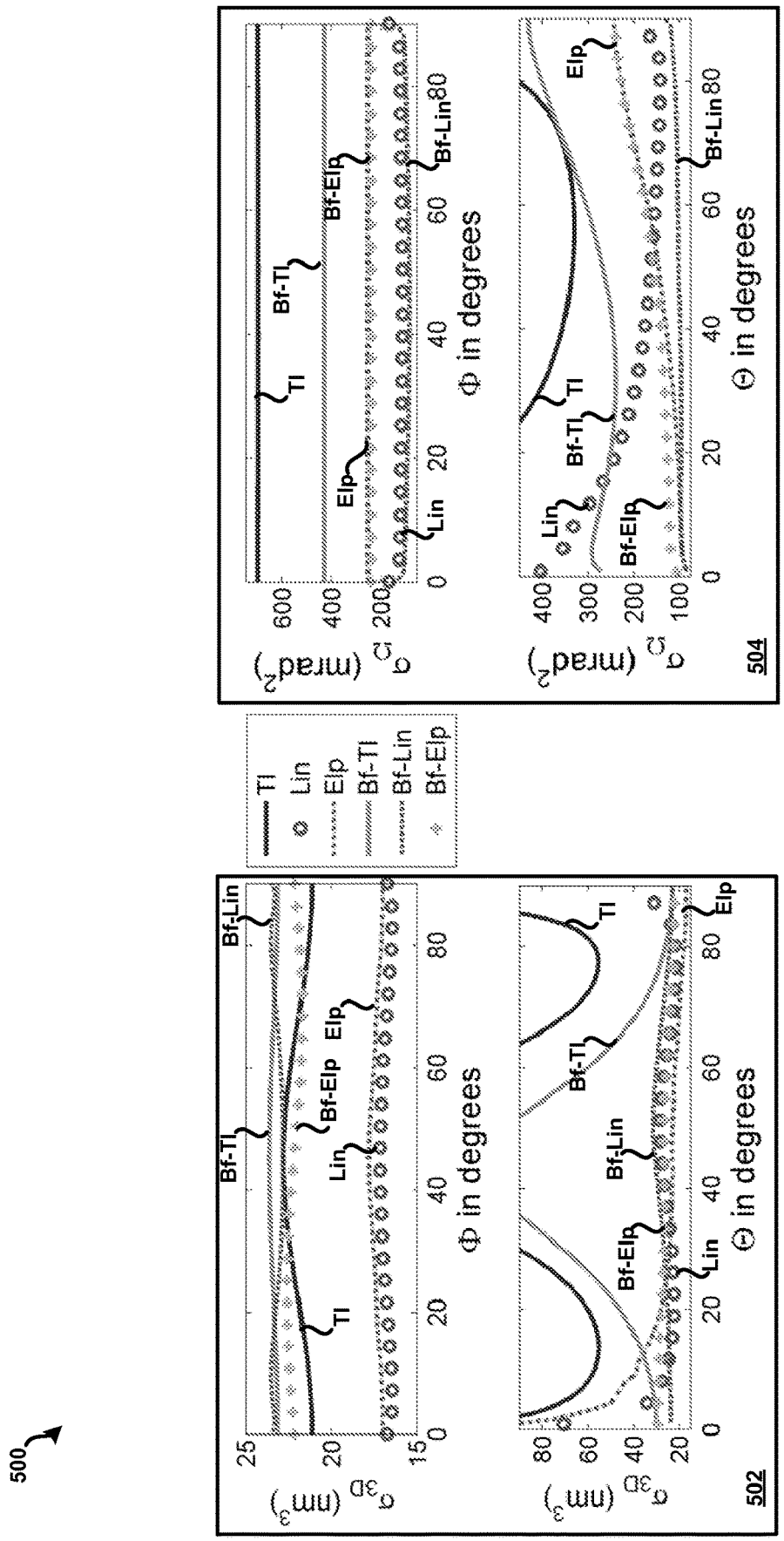
FIG. 5 shows an example fifth diagram in accordance with the disclosure.

Referring now to FIG. 5, an example fifth diagram 500 is shown in accordance with the principles of the present disclosure. In particular, the fifth diagram 500 illustrates in plot 502 average of volume localization estimation as a function of $\Theta$ and $\Phi$ (in degrees), and in plot 504 average of solid angle error estimation as a function of $\Theta$ and $\Phi$ (in degrees), for the five representative dipole orientations (O1, O2, O3, O4, and O5) with respect to the axial position of the dipole. For the bifocal systems, the two focal planes were offset by 400 nm and the x-axis represents the center of the two planes. Similar to FIG. 4, the legend indicates or identifies the six imaging systems discussed throughout, single measurement-total intensity (TI; blue solid line), linear polarizations (Lin; green circles), elliptical polarizations (Elp; red dashed line), bi-focal total intensity (bf-TI; cyan solid line), bi-focal with linear polarization (bf-Lin; magenta dashed line), bi-focal with elliptical polarization (bf-Elp; yellow "plus" sign).

Localization and orientation estimation of a dipole are functions of both, the dipoles position and orientation. Plot 502 and plot 504 in FIG. 5 show, respectively, the standard deviation for volume localization and the solid angle error CRLB for a dipole with respect to the azimuthal and polar angles. In particular, the fifth diagram 500 illustrates in plot 502 and plot 504 the standard deviation for 3D position estimation and solid angle estimation, respectively. The top row in plot 502 and plot 504 displays these as a function of angle $\Phi$, keeping $\Theta=90°$, and the bottom row in plot 502 and plot 504 show these as a function of $\Theta$, keeping $\Phi=0°$. At $\Theta=90°$ and at $\Phi=0°$ an infocus dipole has rapidly increasing CRLB, thus these plots were made for a defocus of z=100 nm to provide qualitative insight for the reader. Both the standard deviation for 3D position estimation and solid angle estimation have a nearly constant CRLB for all six systems as a function of polar angle $\Phi$ with the linear single channel and bi-focal system showing the least CRLB followed by the elliptical and total intensity systems. Indeed, as the dipole rotates in $\Phi$, the intensity distributions of the single channel system and the elliptical polarization system rotate, thus rotating the major-axis of the elliptical pattern of the dipole emission, whereas for the linear polarization system, there is energy exchange between the two channels and $\Phi$ may be determined by taking the ratio of the total intensity in the two channels.

As shown in FIG. 5 in plot 502, for volume localization with respect to $\Theta$, all systems except the total intensity provide a fairly uniform CRLB except when $\Theta$ nears 0, where all the bi-focal systems have a much lower CRLB and therefore less error. On the other hand, the solid angle is indeterminate for $\Theta=0°$ (since sin $\theta=0°$) and from the lower plot it may be understood that as $\Theta$ nears 0, the estimation of the solid angle becomes difficult using the single plane total intensity (see e.g., FIG. 3 in schematic 304; Case A), single plane linear (see e.g., FIG. 3 in schematic 304; Case B), and, the bi-focal total intensity systems (see e.g., FIG. 3 in schematic 306; Case A). The single-plane and bi-focal elliptical systems (see e.g., FIG. 3 in schematic 304 and schematic 306; Case C) and the bi-focal linear system (see e.g., FIG. 3 in schematic 306; Case B) have a relatively lower CRLB than the bi-plane elliptical system (see e.g., FIG. 3 in schematic 306; Case C) for $\Theta$ near 0. But as $\Theta$ increases the bi-focal linear system has the lowest estimation error. Thus, overall the bi-focal linear system has the lowest and flattest response for solid angle estimation.

When imaging fixed dipoles under shot noise limited conditions, systems that are sensitive to polarization are strong candidates for estimating the 3D position and orientation of the dipole. This is because the light emitted from a fixed dipole is polarized. Splitting the emitted radiation in linear polarization or a superposition of the linear positions helps estimate these parameters more efficiently. With the help of intensity patterns these polarization-sensitive systems may be effective. Further, a set of possible imaging systems is quantified by comparing their CRLB.

The significance of shifting one of the focal planes in terms of the CRLB is demonstrated. The CRLB curves establish that for a region of defocus around the center, position estimations can be uniformly improved by using a two channel bi-plane elliptical polarization sensitive system, but a single plane elliptical or linear polarization system might provide a lower CRLB for certain defocus regions. As for the orientation of the dipole, in some embodiments, they are best estimated using a two channel bi-plane linear polarization sensitive system. It is contemplated that the five parameter estimation problem for dipoles fixed in space is complex and that there are many possibilities to optimize the Green's function for determining a specific parameter.

Figure 6:
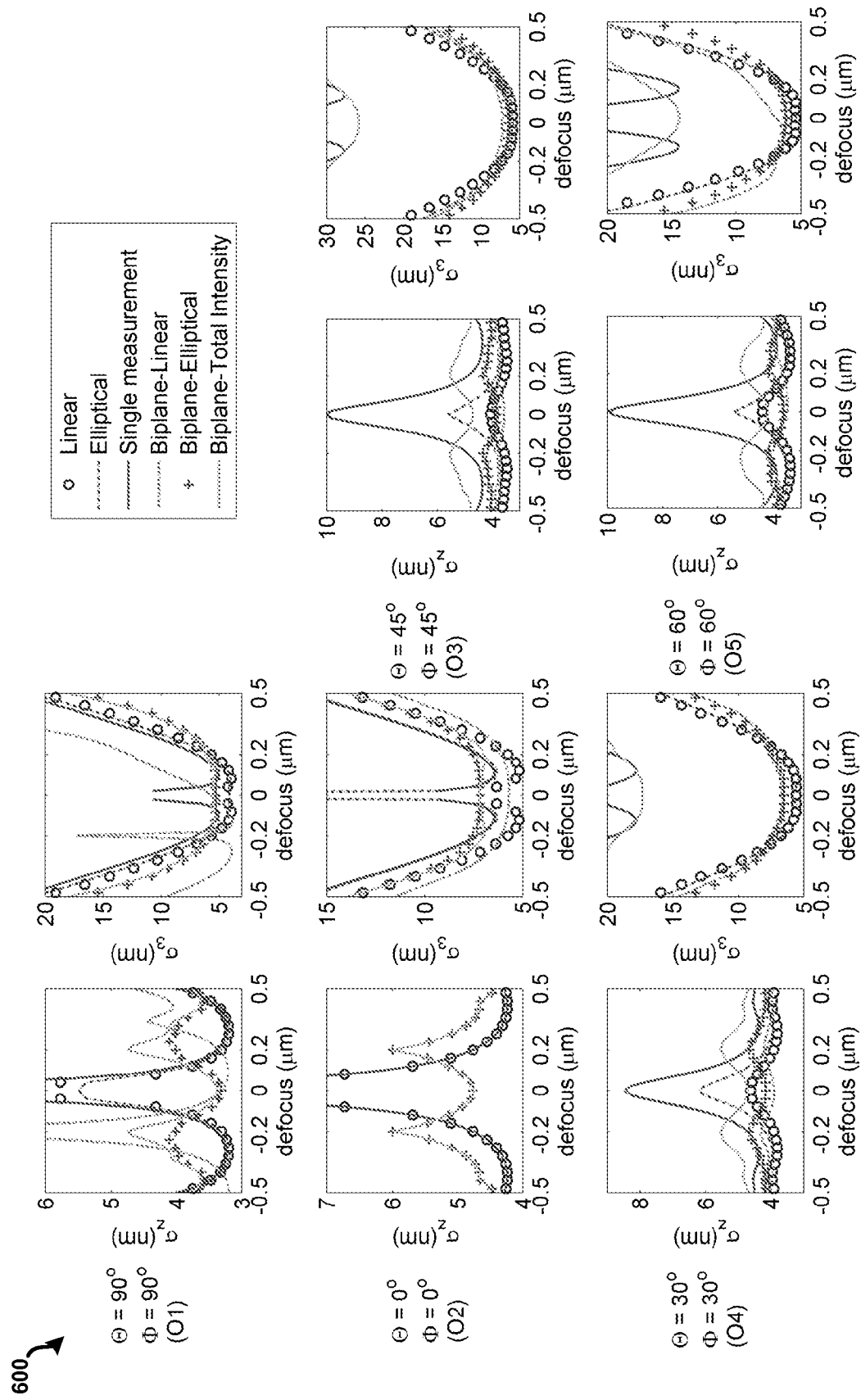
FIG. 6 shows an example sixth diagram in accordance with the disclosure.

As mentioned above, plot 402 in FIG. 4 compares the average of volume CRLB for five representative dipoles discussed throughout for example purposes. Further insight for the reader into these averages may be gained from the following discussion in connection with FIG. 6, wherein the axial and volume standard deviation are plotted for each of the mentioned dipole orientations. For instance, referring now to FIG. 6, an example sixth diagram 600 is shown in accordance with the principles of the present disclosure. In particular, the sixth diagram 600 shows $\sigma_z$ and $\sigma_{3D}$ versus axial position for dipoles oriented along O1, O2, O3, O4, and O5. The legend indicates or identifies the six imaging systems discussed throughout, single measurement-total intensity (Single measurement; red solid line), linear polarizations (Linear; blue circles), elliptical polarizations (Elliptical; green dashed line), bi-focal total intensity (Biplane-Total Intensity; yellow solid line), bi-focal with linear polarization (Biplane-Linear; cyan dashed line), bi-focal with elliptical polarization (Biplane-Eliptical; magenta "plus" sign).

Figure 7:
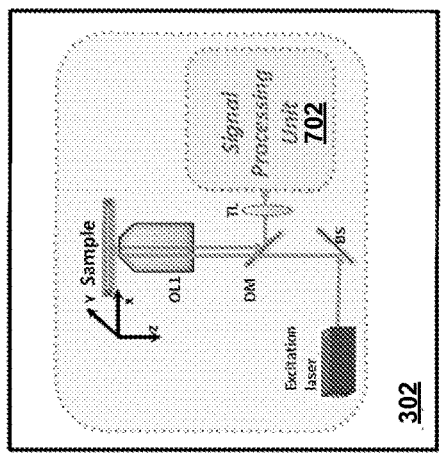
FIG. 7 shows an example seventh diagram in accordance with the disclosure.
Figure 7:
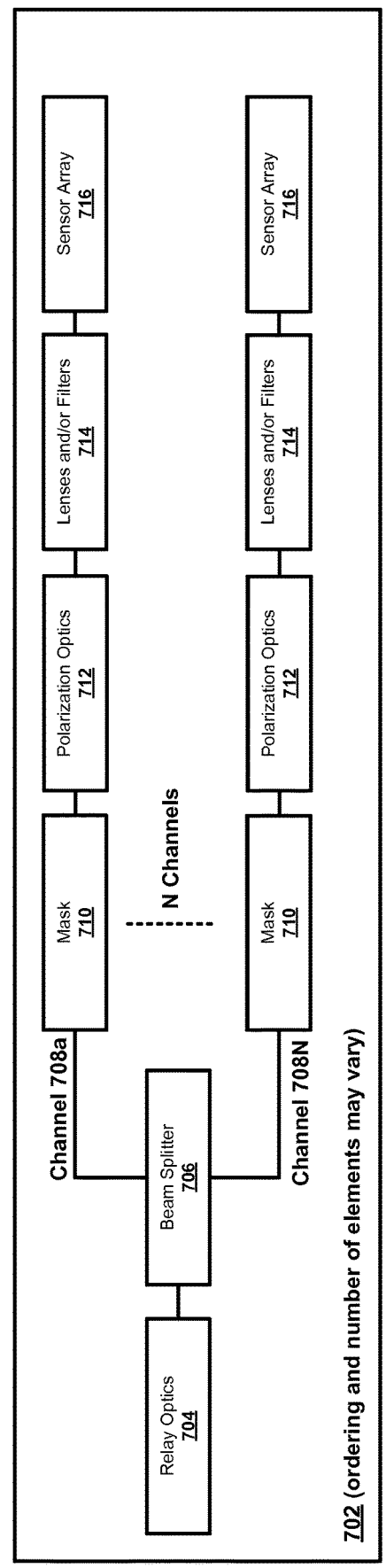

Referring now to FIG. 7, an example seventh diagram 700 is shown in accordance with the principles of the present disclosure. In particular, the seventh diagram 700 shows the schematic 302 of FIG. 3, which illustrates an example multi-channel system for Green's function engineering. The seventh diagram 700 further shows an example embodiment of the signal processing unit 702 of the schematic 302 is shown in detail. It will be appreciated that other embodiments are possible as well. For example, more or fewer components or modules may be used or incorporated within the signal processing unit 702 in accordance with the present disclosure, and further type and number of components may be implementation-specific. Additionally, it is contemplated that one or more of the components or modules of the signal processing unit 702 may be implemented wholly or least partially in software, such as a masking component or module.

In the present example, the signal processing unit 702 may include a relay optics module 704, a beam splitter module 706, and at least two channels 708a and 708N (where N is a positive integer value) each of which may include or otherwise exhibit a mask module 710, a polarization optics module 712, a lenses/filters module 714, and a sensor array module 716. In practice, the relay optics module 704 may be composed of lenses to re-image the back focal plane of the objective lens or a specific plane of the sample (see e.g., schematic 302). The beam splitter module 706 may be composed of non-polarizing or polarizing beam splitters. Examples include cube, pellicle, plate, and grating beam splitters, and many others. The beam splitter module 706 may divide the beam in one, two, or any number of channels N depending on application and/or implementation. The polarization optics module 712 may include polarizers, wave plates, etc., and/or any combination thereof. The lenses/filters module 714 may be composed of spectral filters used to filter undesired radiation, typically outside the emission spectrum of the dipole. The sensor array module 716 may include any number and combination of CCD, CMOS, and other types of light sensitive devices. The lenses/filters module 714 and sensor array module 716 may be configured to focus in different planes of the sample, for instance at different depth (z). Alternatively, a single sensor array may be used to combine all the images. Still other embodiments are possible.

The mask module 710 may be include or otherwise be composed of surface relief structured optical elements, holograms, amplitude masks, spatial light modulators, graded index elements, apodization masks, diffractive optical elements, etc., and/or any combination thereof. In practice, the mask module 710 may modulate the optical beam emitted by the dipole in phase, amplitude, or polarization. The mask module 710, or particular masks of the mask module 710, may also be modulated or changed in time to generate different images on the sensor array. Spatial light modulators may be used in such an implementation. The mask module 710 may be designed to specification with the purpose of optimizing a metric such as the CRLB with respect to one or multiple parameters that describe the position and/or orientation of the dipole. For instance, the mask module 710 may be optimized to estimate position but not orientation or vice versa. Similarly, the mask module 710 may be optimized for estimation of both location and orientation of the dipoles. Examples of masks include vortex phase masks, double helix phase masks, and many others.

Figure 8:
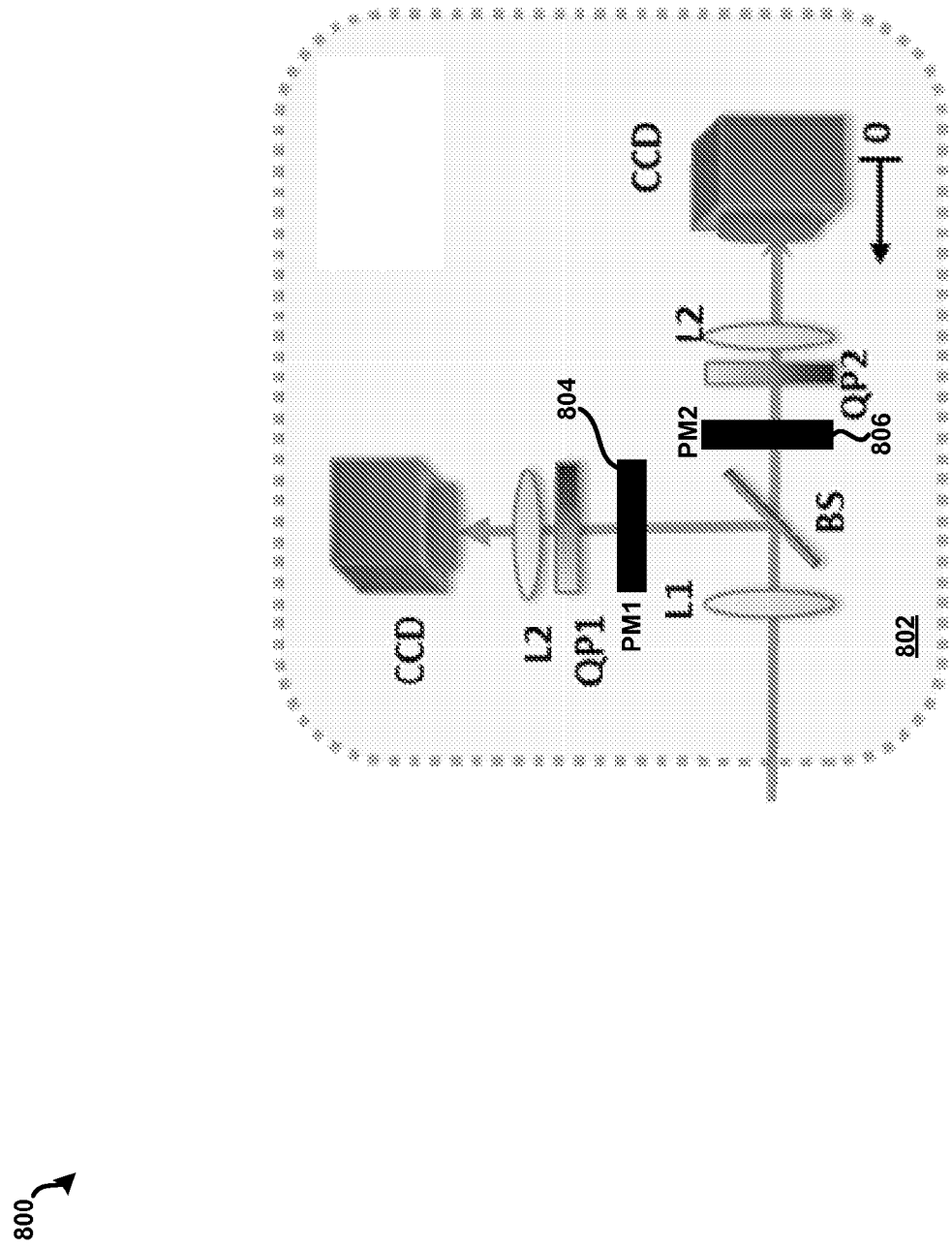
FIG. 8 shows an example eighth diagram in accordance with the disclosure.

Referring now to FIG. 8, an example eighth diagram 800 is shown in accordance with the principles of the present disclosure. In particular, the eighth diagram 800 illustrates in schematic 802 an example of a multi-channel system. The schematic 802 may be similar in some aspects to the "Case C" architecture discussed above in connection with at least FIG. 3. For example, the schematic 802 illustrates or includes polarization devices QP1/QP2, and etc. However, schematic 802 also illustrates or includes a phase mask PM1 804 and a phase mask PM2 806 disposed within or along a respective imaging or optical path. As an example, phase mask PM1 804 may correspond to or be incorporated within the mask module 710 that is in the path defined by channel 708a in FIG. 7. In this example, phase mask PM2 806 may correspond to or be incorporated within the mask module 710 that is in the path defined by channel 708N. Other embodiments are possible.

In practice, after an image (or set of images) is acquired, the position and orientation of the dipole or molecule may be obtained by comparing the images to a model of the optical system that will describe the images obtained for different positions and orientations. It is contemplated that the system model may be obtained theoretically, experimentally, or by a combination of experiments and theoretical modeling. In the present example, the model may refer to the Green's tensor of the optical system. The comparison may be performed by one of more of many algorithms, including pattern matching, mean square error minimization, maximum likelihood estimation, Bayesian, and L1 minimization. Still other embodiments are possible. In example embodiments, a set of images from the model may be determined that best fits the data which is embedded in noise. Once the best fit is found, the location and/or orientation of the molecules is obtained. The selection of the mask module 710, or particular masks or other features or elements of the mask module 710, in FIG. 7 and FIG. 8 may be made to obtain a precise estimation of the localization and/or orientation of a dipole. A possible metric to compare different masks and combinations of masks is the CRLB, but other metrics are possible or available.

Figure 9:
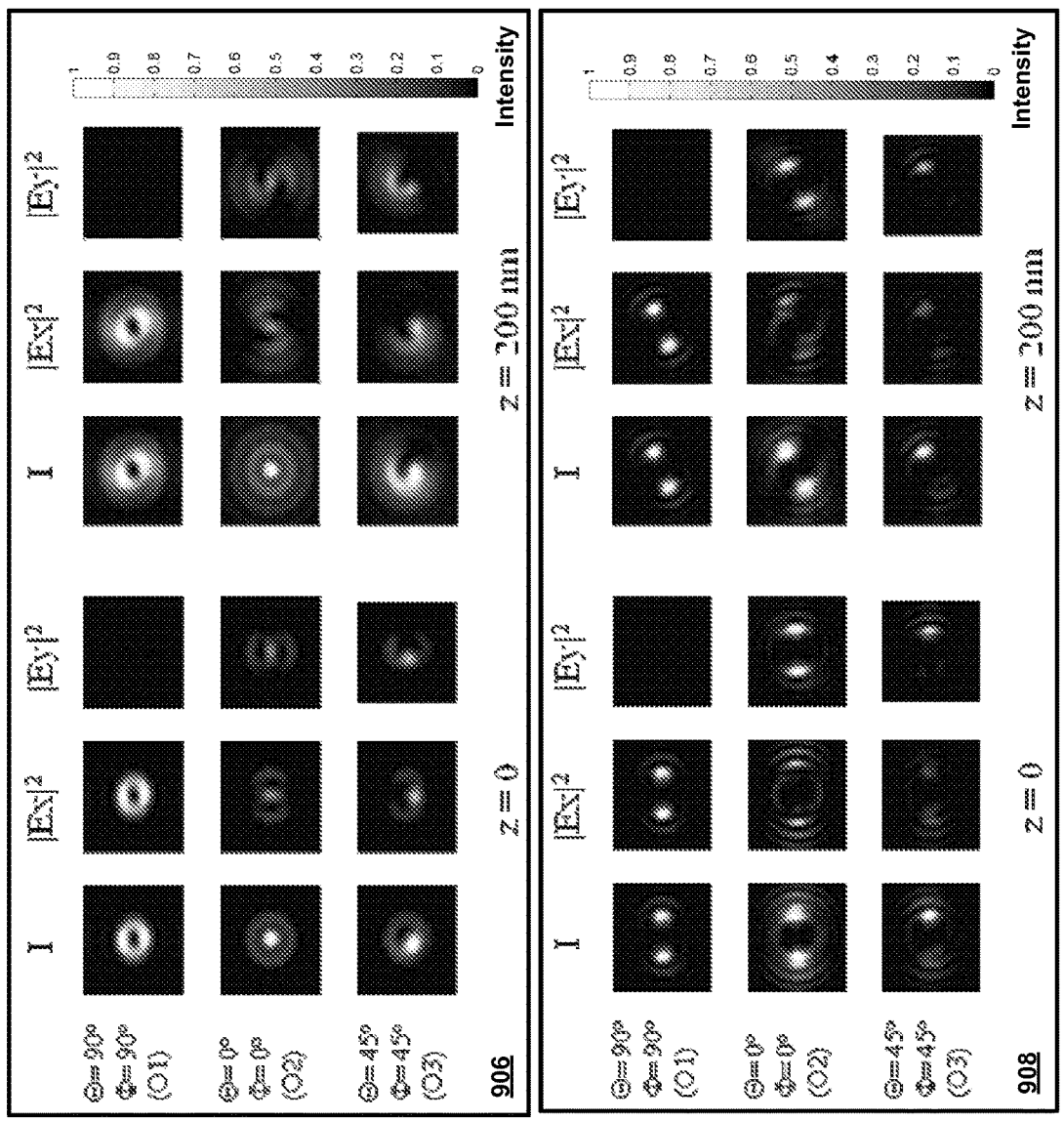
FIG. 9 shows an example ninth diagram in accordance with the disclosure.
Figure 9:
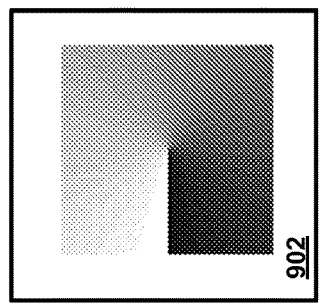
Figure 9:
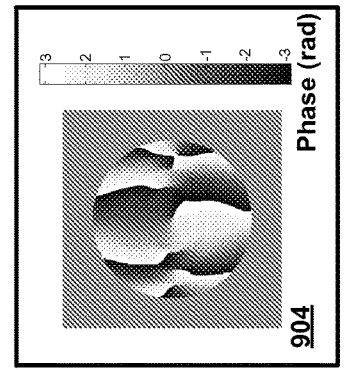

Referring now to FIG. 9, an example ninth diagram 900 is shown in accordance with the principles of the present disclosure. More specifically, the ninth diagram 900 illustrates patterns obtained with a vortex phase mask and a double-helix phase mask to localize point source emitters. The ninth diagram 900 illustrates in schematic 902 and schematic 904 a gray level representation of the phase map (pupil phase function) of the vortex and double helix phase maps. The ninth diagram 900 further illustrates in plot 906 and plot 908 the intensity patterns obtained with a one channel system and a two linear polarization channel system for the vortex and double helix masks respectively.

Figure 10:
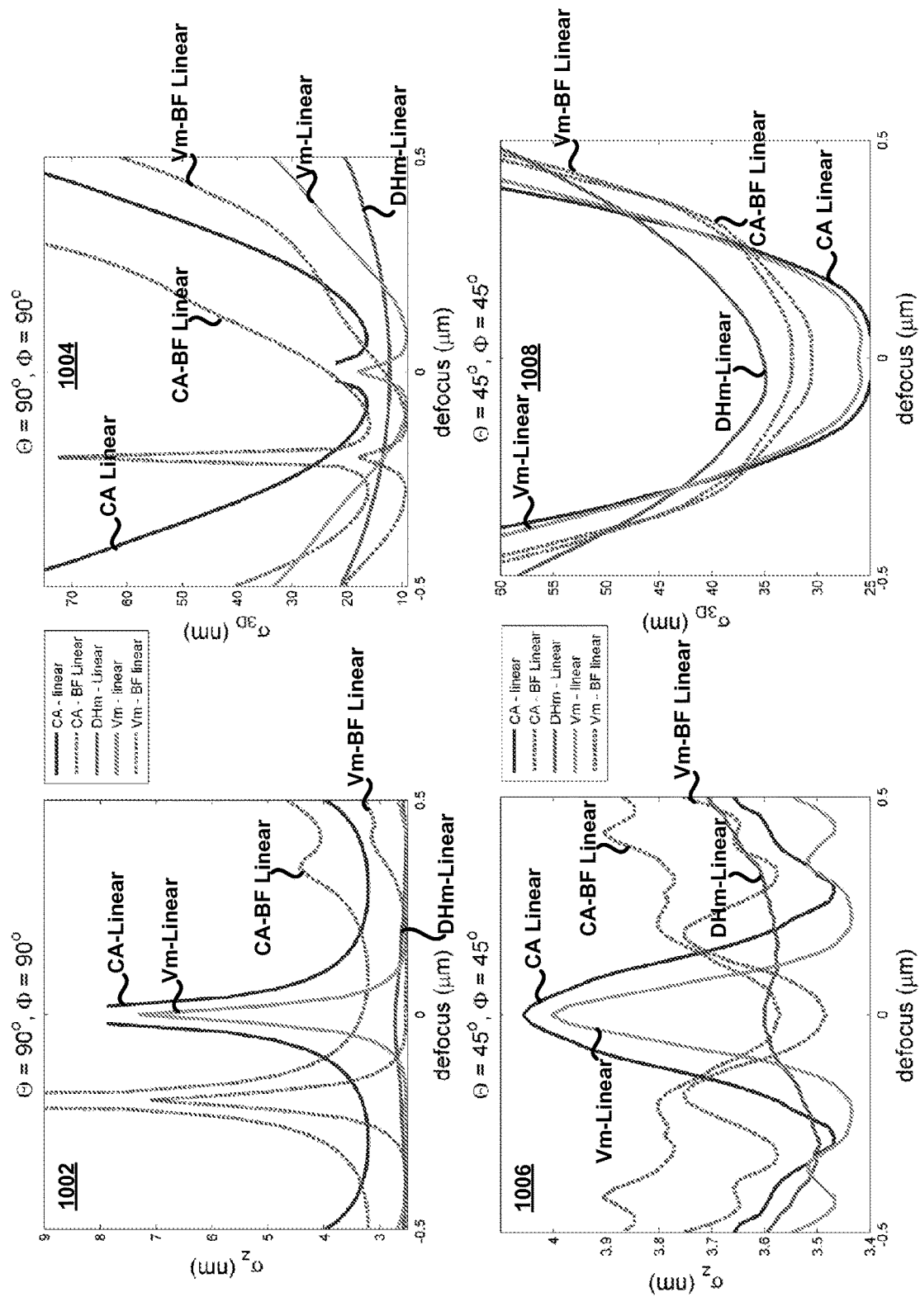
FIG. 10 shows an example tenth diagram in accordance with the disclosure.

Referring now to FIG. 10, an example tenth diagram 1000 is shown in accordance with the principles of the present disclosure. In particular, the tenth diagram 1000 in plot 1002, plot 1004, plot 1006, and plot 1008, compares the $\sigma = \sqrt{CRLB}$ for axial localization and 3D localization for various dipole orientations as a function of defocus (µm). The respective plots 1002, 1004, 1006, and 1008 show the result for a double-channel clear-aperture system with linear polarizations (CA-linear; blue solid line), double-channel clear-aperture system with linear polarizations and bi-focal detection (CA-BF linear; green intermittent line), double-channel double-helix phase mask with linear polarizations (DHm-Linear; red solid line), double-channel vortex phase mask with linear polarizations (Vm-linear; cyan solid line), and double-channel vortex phase mask with linear polarizations and bi-focal detection (Vm-BF linear; green intermittent line).

Figure 11:
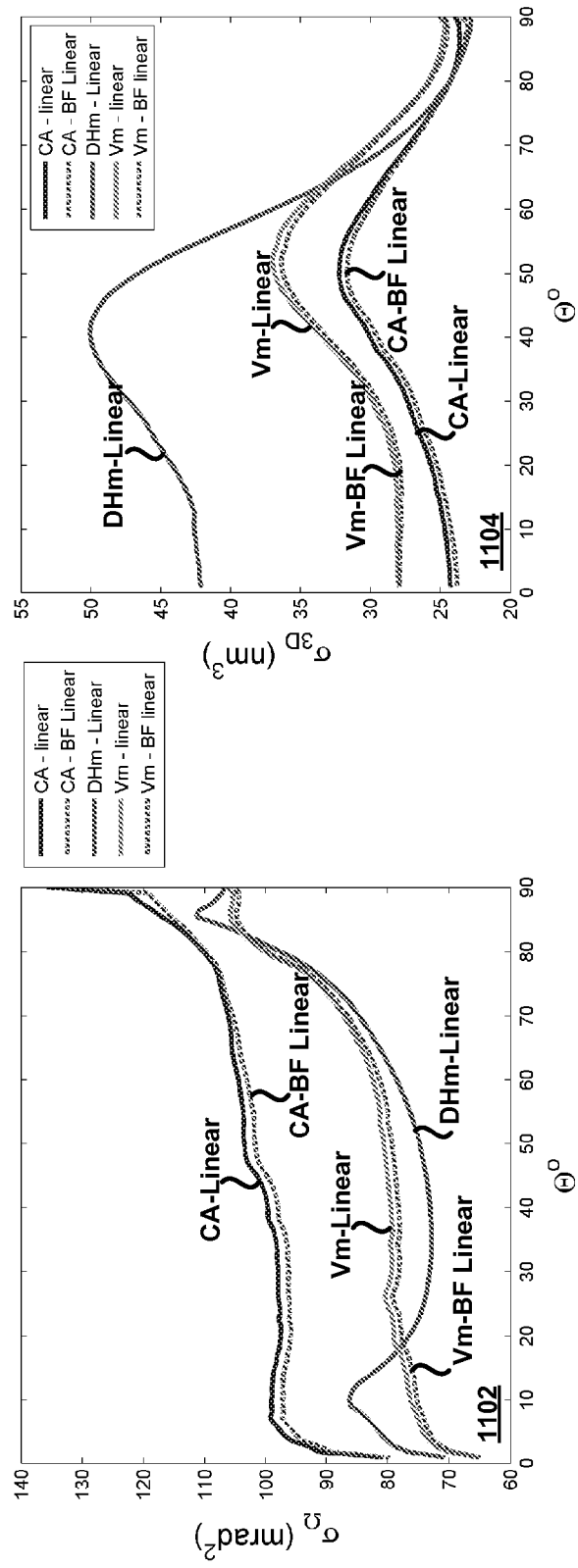
FIG. 11 shows an example eleventh diagram in accordance with the disclosure.

Referring now to FIG. 11, an example eleventh diagram 1100 is shown in accordance with the principles of the present disclosure. In particular, the eleventh diagram 1100 illustrates in plot 1102 and plot 1104 the average of $(\sigma_\Omega)$ and $(\sigma_{3D})$, respectively, as a function of the angle θ for the different systems considered in FIG. 10. More specifically, the eleventh diagram 1100 that phase mask systems can significantly improve orientation estimation. While the vortex and double-helix masks present similarly low $(\sigma_\Omega)$, the vortex mask is better at 3D localization. These examples show the potential of using a multi-channel system with phase masks and polarization devices to improve estimation of orientation or localization. The legend listing in FIG. 11 is the same as that shown in FIG. 10.

II. Generating Helical Beams and/or Helical Point Spread Functions

Optical diffraction limits the resolution in the visible spectrum to at or about 200 nm in the transverse direction and at or about 500 nm in depth. Therefore, observation of cellular structures which are of the order of tens of nanometers is not possible with traditional optical microscopy. As an alternative, biologists rely on electron and x-ray microscopy to image such small structures. However, these techniques are damaging to the sample and preclude live-cell imaging. Advances in optical methods and engineering of the fluorescent properties of dyes and proteins have enabled tools that overcome the optical diffraction barrier and facilitate imaging at the nanometer scale. Methods have been developed to overcome the diffraction limit in three dimensions. One approach is to engineer the excitation pattern using structured illumination or scanning localized beams as in stimulated emission depletion microscopy. Another super-resolution approach involves stochastically activating sparse sets of emitters distributed within the field of view which are sequentially changed over time. This time-sequential imaging provides a map of particle localizations that generates a 2D or 3D super-resolution image. Different mechanisms for the control of the emission lend different names to the technique including (fluorescence) photoactivated localization microscopy (PALM), (direct) stochastic optical reconstruction microscopy (STORM), and ground state depletion microscopy followed by individual molecule return (GSDIM). These super-resolution approaches have been extended to three dimensions by using microscope modalities that modify the optical point spread function to extract 3D information from the imaged emitters. Resolution below 50 nm in the transverse direction and 100 nm in depth are possible. 3D microscopes with astigmatic response, bi-plane detection, interferometric detection (IPALM), double-helix point spread function (DH-PSF), and tilted mirrors have been applied to super-resolution imaging.

While 3D PALM/STORM methods enable scanning-free volume imaging, the depth range depends upon the technique. Typical values are 650 nm for the interferometric method, 800 nm for the astigmatic method, 1000 nm for the bi-plane method, and 2000 nm for the DH-PSF. The DH-PSF provides the longest depth range making it attractive to image cells with minimal focus scanning. The astigmatic PSF method has recently been extended to imaging depths from 10 μm to 150 μm enabling whole-cell and live-cell imaging with the additional use of optical techniques such as light sheet illumination.

It is contemplated that biological super-resolution imaging would benefit from the development of optical systems that provide control of the PSF spread and depth range. The PSF spread determines the localization precision in the presence of noise as well as the allowed active molecule density per image acquisition. For instance, if a specimen is 500 nm deep, the use of a PSF design with 2000 nm range would not be optimal because it would unnecessarily compromise the signal to background ratio. This is in turn the result of a fundamental tradeoff between PSF depth range and PSF spread. Furthermore, the implementation of the PSF should not degrade the photon collection efficiency and hence the use of highly transmissive phase masks to generate application specific PSFs is important. The estimation and reconstruction algorithms are also important to take advantage of the information delivered by the photon limited molecular images. The present disclosure addresses these and other issues.

In particular, embodiments of the disclosure are directed toward masks that may produce single, double, or multiple helix PSFs. The masks may, for example, be used in either imaging or beam systems such as described above at least in connection with FIG. 3. In some embodiments, the masks may include optical phase vortices or phase screw dislocations. These masks may have different or equal orders and/or may be isotropic or anisotropic. Embodiments may include masks that are developed to optimize one or more custom metrics such as energy efficiency, side lobes, peak to background, and/or uniformity in three dimensions. In some embodiments, the mask or masks may generate a single helix, double helix, or any number of helices of light intensity in 3D space. In some embodiments, the mask or masks may include a number of optical phase vortices or phase screw dislocations all located, approximately, along one or more straight lines. In some embodiments the mask or masks include apodization.

As used herein a "mask" may refer to a phase mask, an amplitude mask, a phase and amplitude mask, a hologram, a phase plate, a surface relief optical element, a graded index optical element, an artificial dielectric optical element, a metamaterial optical element, or a diffractive optical element, and etc. Such a mask may, for example, be incorporated within or comprise of the mask module 710 discussed above in connection with at least FIG. 8. As used herein the term "semi-helical" is an approximation to a helical or a spiral beam or image of a light source in a region of 3D space. A beam in this context may be defined as the 3D trajectory of bright optical field intensity.

In some embodiments, a mask or combination of masks may include both an amplitude mask and a phase mask that produce a DH-PSF when imaging a single point or used with a laser beam. In some embodiments, the amplitude mask and the phase mask comprise a single mask. In some embodiments, the amplitude mask may include, for example, a single aperture, a circular function, a Gaussian function, and etc. In some embodiments, the phase mask may be generated by multiplying vortices at different locations. In some embodiments, the mask may include a plurality of screw dislocations along a line, for example.

In some embodiments, a mask may be developed to optimize the CRLB for estimation of one or more parameters such as depth position, lateral position, or 3D position over a range; Fisher information; Mutual information; Strehl Ratio; background; Signal to Noise ratio; location and influence of zeros of the optical transfer function; energy efficiency; side lobes; peak to background; and/or uniformity in three dimensions. The mask or combination of masks of the present disclosure may therefore be useful and/or applicable to many different types of applications.

In some embodiments, a phase mask is described that includes at least one vortex singularity. For example, a mask may include a vortex or vortices disposed along a line of the mask regardless of how the placement of the line or vortices was determined. In some embodiments, an optical system with masks disclosed herein may be used to localize one or more particles in three dimensions, as well as their angular disposition. In some embodiments, the system may be used to image one or more particles or one or more objects in three dimensions. In some embodiments, the system may be used to estimate the range of one or more particles or one or more objects. In some embodiments, the system may be used to image one or more emitters (molecules, quantum dots, etc.) over time in multiple dimensions. In some embodiments, the system may be used to image and/or localize one or more emitters (molecules, quantum dots, etc.) over time in three dimensions followed by the reconstruction of the structure of the object by assembling the 3D positions of all the emitters' localizations.

Some embodiments of the disclosure may be used as a 3D imaging system. For example, the rotation free pattern may be used as a reference for restoration purposes. The optical encoding may be estimated from the resulting image using MLE or a Bayesian estimator for example to restore the image locally. And, multiple images may be used to estimate the original three dimensional function, and/or multiple images may be used to estimate the original three dimensional function using depth-from-defocus methods with local diffusion operations, non-local diffusion operations or expectation maximization algorithms.

In some embodiments, an axial ranging system can be used to estimate the optical encoding from a resulting image using MLE or Bayesian estimator for example to locate the axial location of the object. In some embodiments, an axial ranging system may be used to estimate the original three-dimensional function using multiple images. For example, multiple images may be used to estimate the original three-dimensional function using depth-from-defocus methods with local diffusion operations, non-local diffusion operations or expectation maximization algorithms for example.

In some embodiments, a 3D nanoscopic system based on a Fisher information efficient DH-PSF design, surface relief phase mask implementation for efficient light collection, and/or matched optimal reconstruction algorithms for efficient estimation and image reconstruction is disclosed. Such as system may reveal 3D super-resolution imaging of microtubules in various environments, for example, mammalian cells, with single-molecule sensitivity. In some cases, the average experimental precision is shown to be ($\Delta x$, $\Delta y$, $\Delta z$)=(6 nm, 9 nm, 39 nm) at full-width half-maximum (FWHM) with about 6000 collected photons and (51 nm, 68 nm, 122 nm) with about 1100 photons. Super-resolution imaging over the depth of about 1.2 μm shows details of the microtubule network. Such an implementation may be referred to Super-resolution Photon-efficient Imaging by Nanometric DH-PSF Localization of Emitters or SPINDLE.

Figure 12:
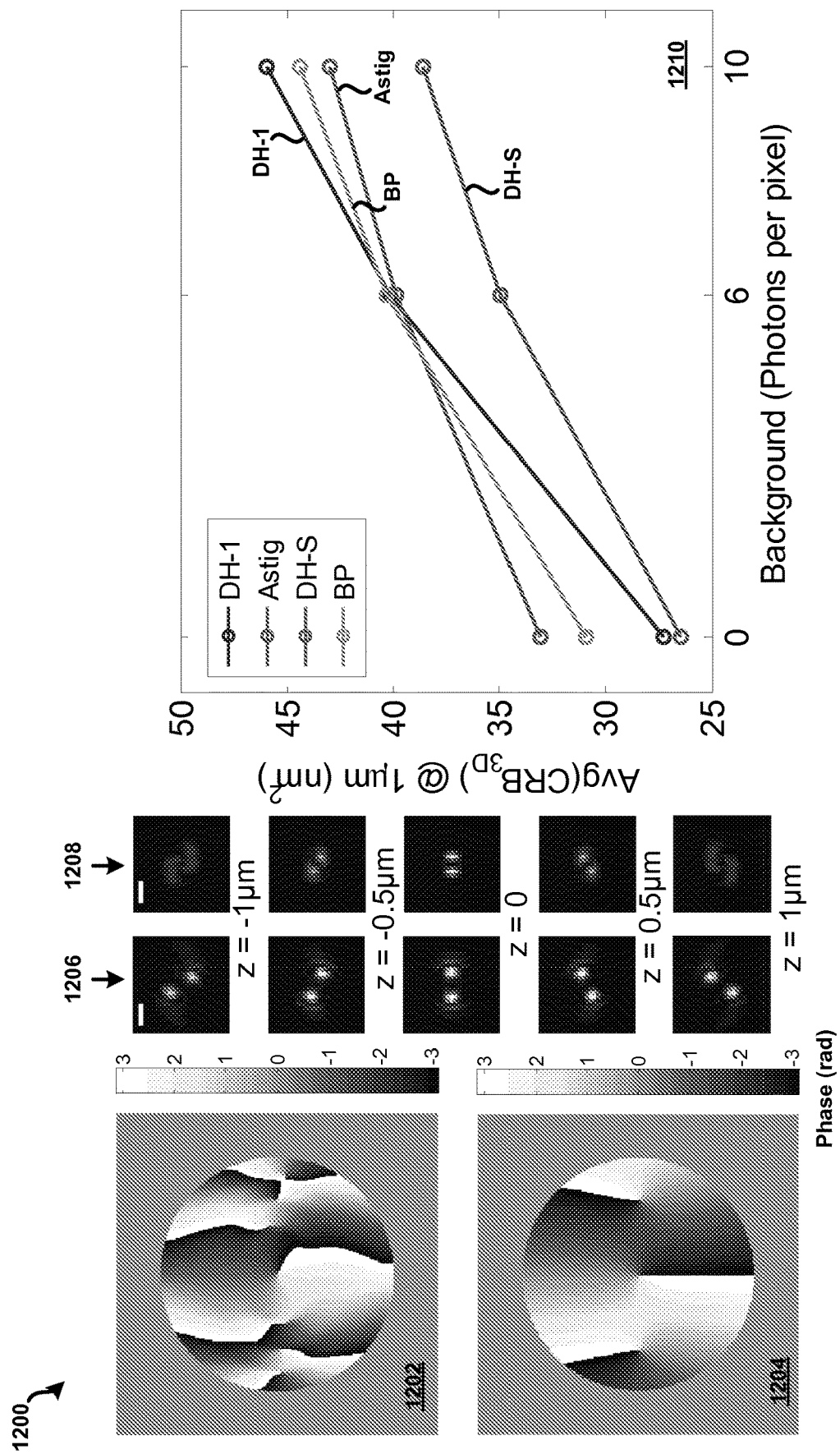
FIG. 12 shows an example twelfth diagram in accordance with the disclosure.

A DH-PSF is an engineered PSF which displays two lobes in the transverse plane that rotate with defocus. Thus, the PSF forms a double-helix of light in 3D space for each and every point-like source. The advantage of this engineered PSF is that the axial position of the imaged point source is encoded in the rotation of the two lobe pattern. Referring now to FIG. 12, an example twelfth diagram 1200 is shown in accordance with principles of the present disclosure. In particular, the twelfth diagram 1200 at schematic 1202 and schematic 1204 shows, respectively, examples of two different DH-PSF masks. Plot 1206 and plot 1208 show, respectively, examples of the DH-PSF mask and cross-section of the PSF designs (DH-1 and DH-S) optimized for different depth range and background noise. From top to bottom the images show the simulated PSF at various defocus positions using as an example a 1.45 NA microscope and $\lambda$=660 nm. The scale bar (shown in z=−1 μm image) is 500 nm. Plot 1210 shows a comparison of 3D localization methods via the Average Cramer Rao Bound (CRB3D) over 1 μm range with changing background. The calculation parameters for shot-noise limited CRB are 1.45 NA, $\lambda$=660 nm, pixel size=16 μm, 3000 detected photons at focus. No readout noise is assumed. The legend in FIG. 12 indicates or identifies, method A (DH-1; blue solid line), method B (Astig; green solid line), method C (DH-S; red solid line), and method D (BP; cyan solid line).

Still referring to FIG. 12, the DH-PSF mask and transverse slices of the DH-PSF for various defocus positions of a high NA microscope are shown in schematic 1202 and schematic 1204, respectively. The DH-PSF enhances the Fisher information for axial localization and may be used for 3D imaging applications like localization based microscopy, particle tracking, super-resolution imaging, depth ranging, profilometry and imaging optical tweezers. The DH-PSF may allow 3D localization of multiple sparse particles in a single image with high localization precision and longer depth-of-field than other 3D localization methods, making it attractive for tracking and super-resolution imaging.

In localization microscopy applications there is always some level of unavoidable background noise, which could affect the localization precision and the system resolution. To illustrate this, a comparison of the 3D localization precision limits from three alternative optical PSF choices is shown in plot 1210. The fundamental localization precision of a system is determined by the PSF, the number of photons detected, the numerical aperture, and noise; along with other practical parameters such PSF sampling. This limit is defined by the CRB, which is the "best" achievable precision by any unbiased estimator. For transverse shift-invariant and axial shift-variant systems, the CRB associated with localization along each of the three dimensions is a function of the axial position z. The CRB for 3D localization is defined as $$CRB_{3D}(z) = 1/3(CRB_X(z) + CRB_Y(z) + CRB_Z(z)).$$

In order to establish the precision performance of the system over a volume, Avg($CRB_{3D}$) is defined, which provides the average achievable precision over a given range. In plot 1210, the Avg($CRB_{3D}$) for three systems—astigmatic, bi-plane, and DH-PSF, are shown after assuming a 1 μm depth range for imaging. Such an implementation is used in microscopy and is hereafter referred to as DH-PSF-1. The CRB values are plotted as a function of the number of background photons. For a system with no background, the DH-PSF-1 performs better than the other two methods. However, as the background is increased, the DH-PSF-1 performance degrades. This is because the energy in DH-PSF-1 is transversely spread relative to a diffraction limited spot. Hence, the signal to background per pixel decreases faster for the DH-PSF-1 system with increasing background, degrading the achievable precision. Similarly, the bi-plane (BP) system spreads out the PSF energy with defocus leading to a lower signal to background and decreasing precision. The astigmatic system, owing to its relative smaller spread in the transverse plane, behaves better than the others in the presence of high background. In accordance with the present disclosure, performance of DH-PSF systems may be improved with respect to, for example, information theoretic measures. Such a design is shown where the performance is improved in terms of the Fisher information with background noise.

In accordance with the present disclosure, a first method of PSF design may include using numerical optimization. In this method, a metric is optimized in 3D PSF space subject to constraints in the phase mask to be fabricated (phase levels, size, NA, etc), physical characteristics such as wavelength, and the inherent wave equations. For instance, an iterative optimization algorithm and applied constraints may be used to have a higher efficiency DH-PSF than DH-PSF-1. By applying optimization constraints in the PSF domain to obtain a DH-PSF with higher energy in the two lobes for a shorter depth, it was observed that the algorithm converges to local minima. Further, the same iterative optimization algorithm and applied constraints may be used to have a higher efficiency DH-PSF than DH-PSF-1. By applying optimization constraints in the PSF domain to obtain a DH-PSF with higher energy in the two lobes for a shorter depth, it was observed that the algorithm converges to local minima.

Figure 13:
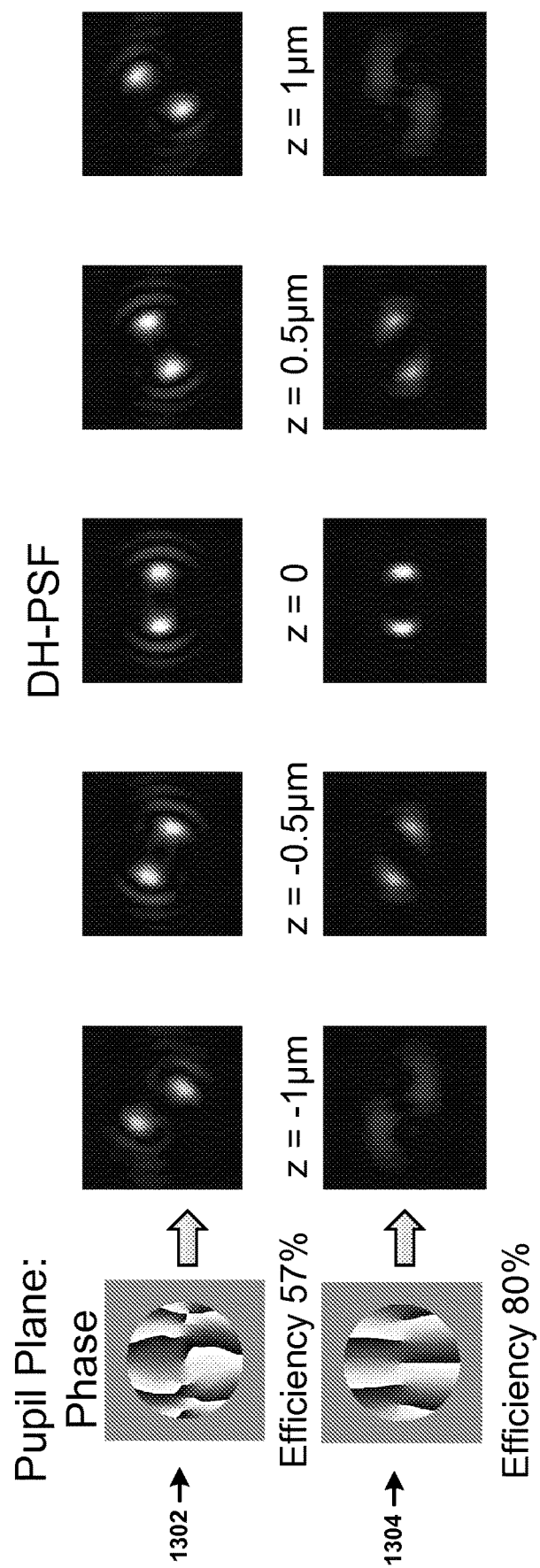
FIG. 13 shows an example thirteenth diagram in accordance with the disclosure.

Referring now to FIG. 13, an example thirteenth diagram 1300 is shown in accordance with the principles of the present disclosure. In particular, the thirteenth diagram 1300 demonstrates the difference between DH-PSF-1 and the mentioned design (previous paragraph); more energy is concentrated in the main lobes at the expense of a shorter depth range. The trade-off of concentration of energy versus the rotation range of pattern arises from wave diffraction theory as may be understood by one of skill in art. More specifically, the thirteenth diagram 1300 illustrates in image sequence 1302 an example of an original DH-PSF phase mask on the left and images of DH-PSF at different defocus positions shown on the right. The efficiency of this DH-PSF is 57%, defined as energy in two lobes at focus by thresholding at 5% of the peak value. The thirteenth diagram 1300 illustrates in image sequence 1304 an example of an optimized phase mask shown on left and the PSF with 80% energy in two lobes shown on the right. The PSF corresponds to 1.45 NA microscope at λ=660 nm.

In accordance with the present disclosure, a second method of DH-PSF design may be based on the use of vortex singularities (screw dislocations) in the pupil or other intermediate (between object and camera) plane. Vortex singularities are characteristic of the DH-PSF phase mask. As can be seen from the DH-PSF masks in FIG. 12 and FIG. 13. Examples of vortex singularities may include a mask with vortex singularities which are located roughly along a horizontal line through the center of the mask. DH-PSFs may be generated by placing vortex singularities in the pupil plane.

A vortex singularity may be a variation in the phase of the beam and can be defined in radial co-ordinates with its center at $(r_0, \theta_0)$ as $$E(r,\theta) = A(r,\theta)(re^{i\theta} - r_0 e^{i\theta_0})^c \quad (13)$$

Figure 14:
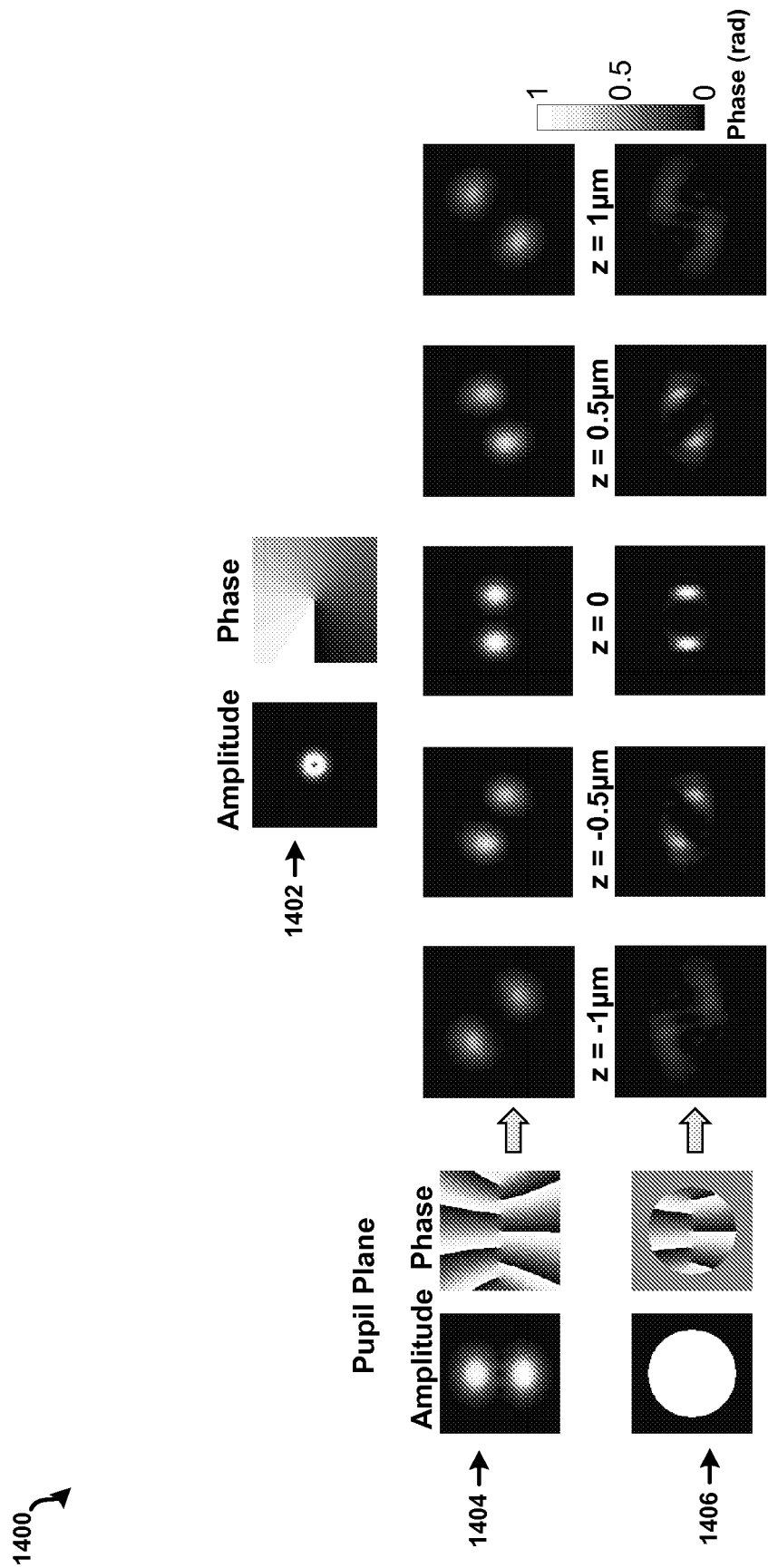
FIG. 14 shows an example fourteenth diagram in accordance with the disclosure.

Referring now to FIG. 14, an example fourteenth diagram 1400 is shown in accordance with the principles of the present disclosure. In particular, the fourteenth diagram 1400 demonstrates in image sequence 1402 an example of a vortex singularity with Gaussian amplitude. The fourteenth diagram 1400 further demonstrates in image sequence 1404 an example of a pupil function generated by placing singularities and Gaussian amplitude shown on left. On the right are images of DH-PSF at different defocus positions. The fourteenth diagram 1400 further demonstrates in image sequence 1406 an example of a pupil plane function generated by retaining only the phase of function in image sequence 1404 to generate a higher efficiency DH-PSF. The PSF corresponds to 1.45 NA microscope at λ=660 nm.

More specifically, image sequence 1402 shows a vortex singularity with a Gaussian amplitude and charge c=+1. When singularities with same charge are placed with their centers roughly along the center line, the pupil plane amplitude may have energy spread out in two lobes as shown in image sequence 1404. Image sequence 1402 shows the amplitude and phase of the pupil plane on the left which can be written as $$E_0(r,\theta) = \prod_{k=-N}^{N} (re^{i\theta} - r_k e^{i\theta_k}) A(r,\theta) \quad (14)$$

where 2N+1 singularities are added to the pupil plane, $A(r, \theta)$ is the amplitude, $r_k$ and $\theta_k$ are respectively defined as follows $$r_k = |k|r_0, \quad (15, 16)$$

$$\theta_k = \frac{\pi}{2}\left(1 - \frac{k}{|k|}\right) \text{ when } k \neq 0.$$

The example in image sequence 1402 is a Gaussian amplitude pattern where $A(r, \theta) = \exp(-r^2/\omega_0^2)$. The PSF for this pupil plane function is shown on the right in image sequence 1402 which is a rotated and scaled version of the pupil plane function at focus. For axial positions around the focus, the PSF has two lobes separated transversely. These lobes rotate about the optic axis giving it the shape of a double-helix. This result is in agreement with analysis of vortex singularities, which itself is a specific subset of rotating beams. For an exact rotating beam, the far-field pattern (a PSF is obtained by Fourier transforming the pupil function and far-field of a function is also obtained by a Fourier transform) is a scaled and 90 degrees rotated version of the pupil function. The PSF in image sequence 1406 may be appropriate for ranging and less photon constrained 3D imaging applications. However, for single-particle localization microscopy, it may be desirable to have no amplitude modulation and a phase only pupil function for the purpose of conserving photons. It is contemplated that when the phase of the pupil function shown in image sequence 1404 is retained and the amplitude is replaced with a clear circular aperture, the PSF still retains its double-helix characteristic. Image sequence 1406 shows the phase only pupil function and the corresponding DH-PSF where the pupil function may be written as $$E_1(r,\theta) = circ\left(\frac{r}{R}\right) e^{i \arg E_0(r,\theta)} \quad (17)$$

and $E_0(r, \theta)$ is the function in equation (14). For generating the DH-PSF, it is contemplated that all the vortices should lie approximately on a diameter (for example along horizontal) and on either side of the center of the field such that the energy is spread away from the horizontal line and takes the shape of two lobes. These $r_k$ and $\theta_k$ values may be found by numerical optimization and/or by other methods. In one embodiment, for generating a DH-PSF with two lobes separated horizontally at focus, $\theta_k$ may be in the range of about $0 \leq \theta_k \leq 12°$, about $168° \leq \theta_k \leq 192°$, or about $348° \leq \theta_k \leq 360$. Other embodiments are possible.

Such an implementation may be beneficial and/or advantageous in many respects. For example, the characteristics of a DH-PSF may be tuned for specific applications. For example, the distance between two lobes and peak to background intensity ratio may be optimized by varying the distance, and/or number N, of vortices. It has been determined that separation between the two lobes is inversely proportional to $r_0$ and varies slightly by changing N.

Figure 15:
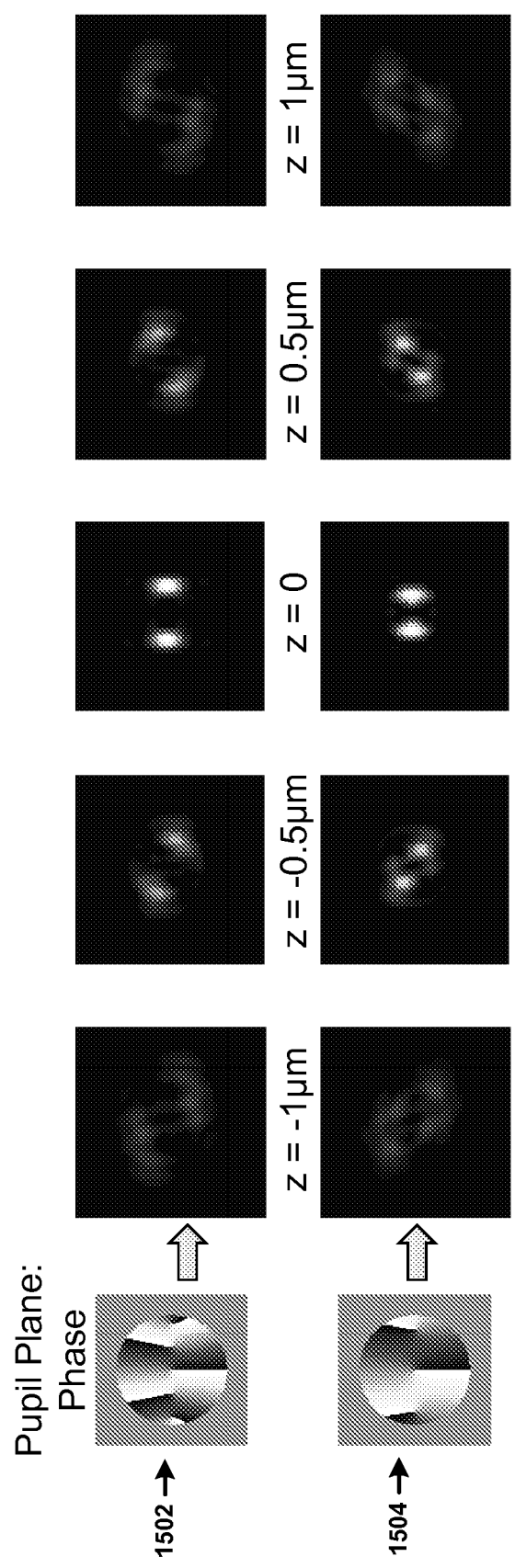
FIG. 15 shows an example fifteenth diagram in accordance with the disclosure.

Referring now to FIG. 15, an example fifteenth diagram 1500 is shown in accordance with the principles of the present disclosure. In particular, the fifteenth diagram 1500 demonstrates in image sequence 1502 an example of a DH-PSF and phase mask generated by nine (9) singularities separated by an arbitrary but fixed distance, R. The fifteenth diagram 1500 demonstrates in image sequence 1504 an example of a DH-PSF and phase mask generated by nine (9) singularities separated by distance 7/4*R. The corresponding DH-PSFs on the right show change in separation of two lobes. It is contemplated that depending on the application a more or less transversely confined DH-PSF may be generated. The PSF corresponds to 1.45 NA microscope at λ=660 nm.

More specifically, the fifteenth diagram 1500 shows two DH-PSFs with their corresponding phase only pupil functions with different $r_0$. The two PSFs have the double-helix characteristics, but the PSF in image sequence 1502 has larger distance between the two lobes than the PSF in image sequence 1504. Following the patterns, numerous DH-PSFs may be generated and the one suitable for a specific application may be selected as desired. Further, it may be understood that by changing the number of vortices in the pupil plane, the energy concentrated in two lobes is increased.

Figure 16:
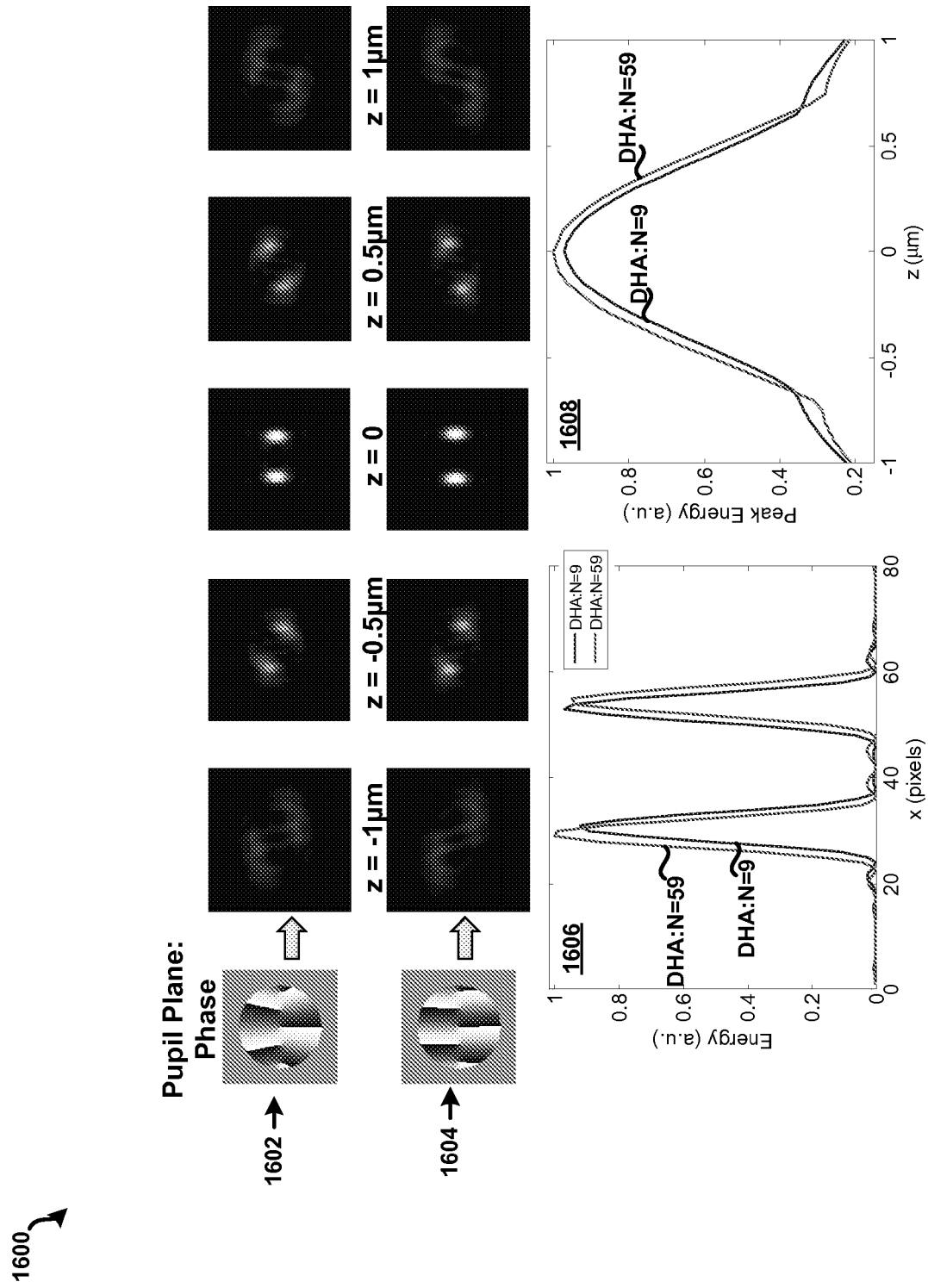
FIG. 16 shows an example sixteenth diagram in accordance with the disclosure.

Referring now to FIG. 16, an example sixteenth diagram 1600 is shown in accordance with the principles of the present disclosure. In particular, the sixteenth diagram 1600 demonstrates in image sequence 1602 an example of a DH-PSF and phase mask generated by nine (9) singularities separated by an arbitrary but fixed distance, R. The sixteenth diagram 1600 further demonstrates in image sequence 1604 an example of a DH-PSF and phase mask generated by fifty-nine (59) singularities separated by the same or similar distance R. The corresponding DH-PSFs on the right look similar but image sequence 1602 and image sequence 1604 show some changes. The sixteenth diagram 1600 further demonstrates in plot 1606 a line cross-section through the center of the two lobes of DH-PSF at focus for the two PSFs in image sequence 1602 and image sequence 1604. The sixteenth diagram 1600 further demonstrates in plot 1606 variation of peak energy of the two PSFs with defocus. These small variations in the DH-PSF by changing N may be utilized to generate the best DH-PSF for an application. The PSF corresponds to 1.45 NA microscope at $\lambda$=660 nm.

More specifically, image sequence 1602 and image sequence 1604 show two PSFs with their corresponding pupil plane phase masks with different numbers of vortices. By increasing N, energy is concentrated in the two lobes. Plot 1604 shows a line cross-section through the transverse plane of the two PSFs at focus and plot 1606 shows the variation of peak intensity along the optical axis for both the PSFs. This further demonstrates that DH-PSF engineering as described in the present disclosure may provide the freedom to design a DH-PSF for a specific application. A variety of DH-PSFs can be generated as shown in the figures. The legend in FIG. 16 indicates or identifies, DHA:N=9; blue solid line and DHA:N=59; red solid line.

Figure 17:
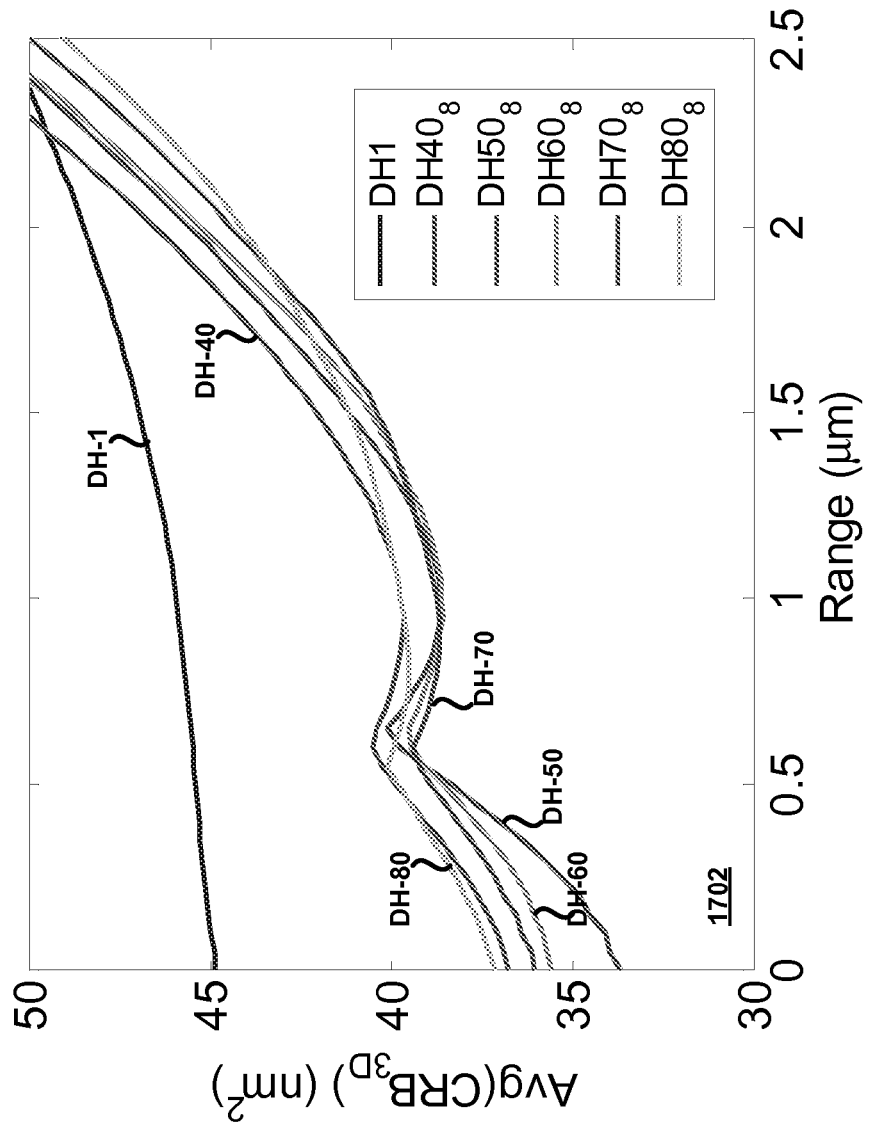
FIG. 17 shows an example seventeenth diagram in accordance with the disclosure.

For localization based 3D super-resolution microscopy, out of the numerically optimized and analytically designed PSFs, a DH-PSF was selected that gave the best CRB for a depth range of or about 1-1.5 µm and a transversely confined PSF which is shown in at least sequence 1208 of FIG. 12. FIG. 17 provides additional information on the selection criteria based on the CRB. For instance, referring now to FIG. 17, an example seventeenth diagram 1700 is shown in accordance with the principles of the present disclosure. In particular, FIG. 17 provides a plot 1702 and shows an example of selecting preferred DH-PSF for localization based super-resolution microscope.

Average CRB3D for different depth ranges for different DH-PSFs is shown. The DH-PSFs generated by vortex singularity were analyzed because a smaller transverse sized PSF was desired. The numerically optimized DH-PSF has the same separation of two lobes as DH1 design and was therefore not considered for analysis. The DH-PSFs generated by vortex singularities are named as DHRN where for example R=40 pixels is the separation between the singularities and the number of singularities N=8. Going from R=40 to 80 separation between singularities is increased. From the plot DH50_8 may be preferred for very short range but for range more than 1 µm it is very close to other PSFs. DH60_8 was chosen for localization experiment as the PSF is most confined while still giving a "good" average $CRB_{3D}$ for the range of 1-1.5 µm. The calculation parameters for shot-noise limited CRLB are 1.45 NA, $\lambda$=660 nm, pixel size=16 µm, about 3000 detected photons at focus. Background noise of about 6 photons/pixel and no readout noise is assumed. The legend in FIG. 17 indicates or identifies, DH-PSF A (DH-1; blue solid line), DH-PSF B (DH40$_8$; green solid line), DH-PSF C (DH50$_8$; red solid line), DH-PSF D (DH60$_8$; cyan solid line), DH-PSF E (DH70$_8$; magenta solid line), and DH-PSF F (DH80$_8$; yellow solid line).

It is contemplated that the DH-PSF-S of the present disclosure may not only provide best achievable precision for 3D localization experiments in high background cases, but it is more confined transversely. This may be advantageous for localization, as more particles per image can be detected. For super-resolution PALM/STORM experiments, this may translate to faster acquisition. The DH-PSF microscope systems are well suited for a variety of biological applications with flexibility of design as described here and implementation with phase elements.

Figure 18:
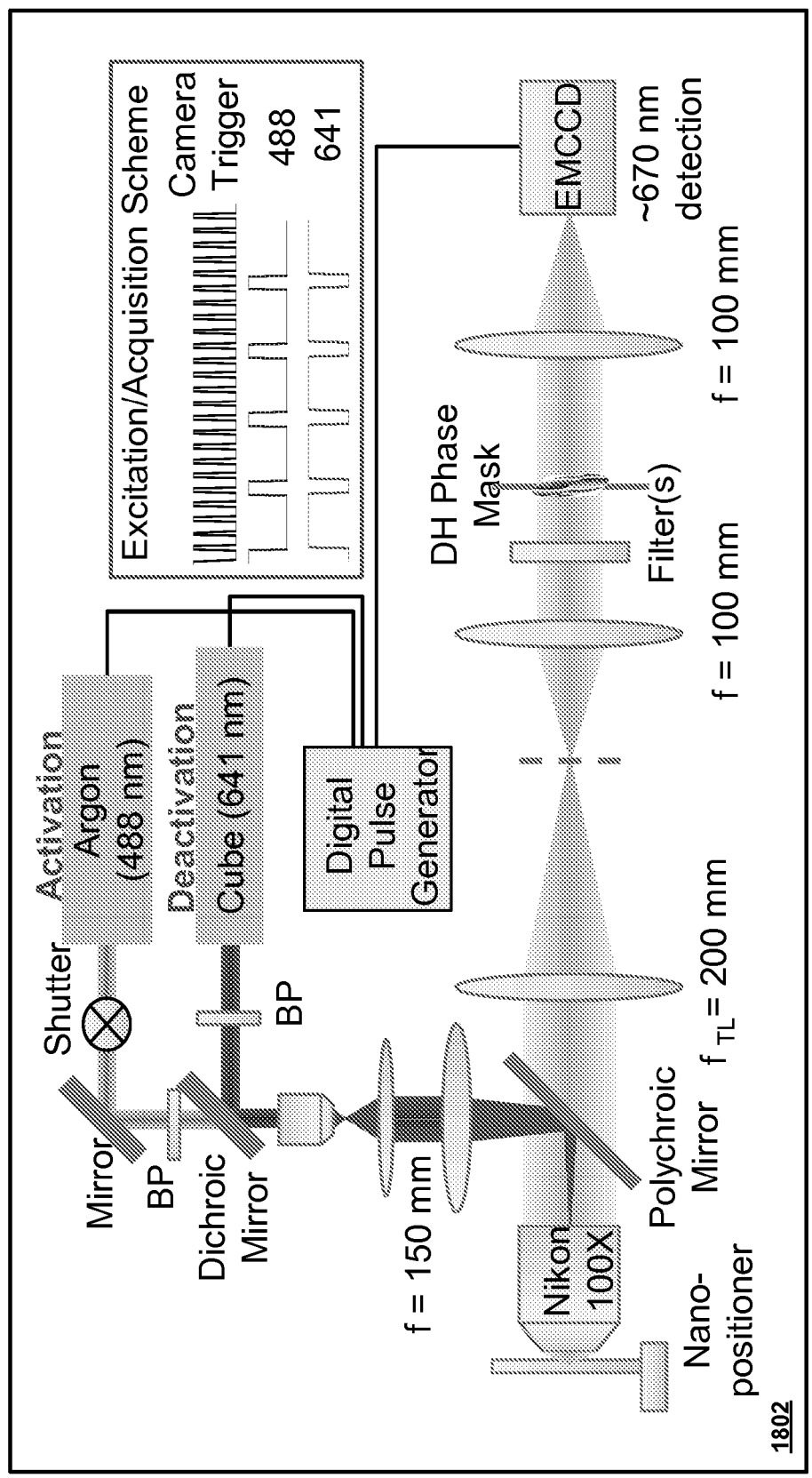
FIG. 18 shows an example eighteenth diagram in accordance with the disclosure.

Referring now to FIG. 18, an example eighteenth diagram 1800 is shown in accordance with the principles of the present disclosure. In particular, FIG. 18 provides an example schematic of a microscope set-up 1802, where if desired each of the features, elements, or components shown in the microscope set-up 1802 may be allocated a reference number such as 1804, 1806, 1808, and so on. In the present example, a sample in the rose chamber may be mounted on a piezo nanopositioner and imaged with a Nikon 1.45, 100× objective and 200 mm Nikon tube lens. The DH-PSF-S of the present disclosure may be implemented by a 4F relay setup formed by two 100 mm focal length lenses. The DH phase mask may be placed at a plane conjugate to the pupil plane of the objective. The final image may be formed on an EMCCD. Illumination lasers (641 nm Coherent Cube used for turn off and 488 nm Argon-ion for activation) may be used in synchronization with the camera in the scheme shown on the top right.

More specifically, the microscope set-up 1802 may be built on an optical table with the optical axis placed parallel to the table. Imaging may be performed with the 1.45 NA 100× Nikon (Melville, N.Y., USA) objective using an electron multiplying charged coupled device (and/or EMCCD iXon DU897E CS0 # BV, South Windsor, Conn., USA). A slide containing stained cells may be mounted in the rose chamber which may be locked down on a nano-positioning stage (Physike Intrumente PZ 164E, Irvine, Calif., USA). The 488 nm line of Argon ion laser (Coherent, Santa Clara, Calif., USA) may be used for activation and the 641 nm diode laser (Coherent Cube) may be used for deactivation. The lasers are combined with dichroic mirror-1 from Semrock (FF 541-SDi01-25×36, Rochester, N.Y., USA), to illuminate the sample uniformly with overlapping illumination. The lasers may be used in synchronization with the EMCCD as shown in the acquisition/excitation scheme in FIG. 18. A digital pulse generator may be used to control the 641 laser directly and 488 laser with a fast mechanical shutter (Uniblitz LS2 shutter, Vincent Associates, Rochester, N.Y., USA). Imaging may be performed at 20 Hz with one (1) activation pulse followed by three (3) or four (4) deactivation pulses from the 641 laser. Deactivation power density of 1-2 kW/cm$^2$ and activation power density of <2 W/cm$^2$ may be used. A polychroic mirror from Semrock (Di01-R405/488/561/635) may be used to separate excitation and emission light. The emission may further be filtered by two stacked dual-band filters (Semrock DBP FF01-538/685-25 and Omega XF3470 540-700DBEM, Brattleboro, Vt., USA). The dual-band filters allow detection of emission of reporter dye Alexa-647 and the activator dye Alexa-488.

As mentioned above, the DH-PSF may be implemented by a 4F relay setup formed by two 100 mm focal length lenses (achromatic doublets from Edmund optics). The DH phase mask may be placed at a plane conjugate to the pupil plane of the objective with the help of an x-y-z translation stage. The DH mask may have a diameter of or about 2.7 mm and act as the limiting aperture therefore reducing the effective NA of the system to or about 1.35. The mask may be fabricated by gray-scale lithography.

To estimate the z-position from a molecule image a calibration may be required. It is contemplated that this may be performed by using a calibration slide that is mounted on a piezo translation stage and moved in axial direction through the focus while continuously acquiring images of the system PSF by imaging isolated single fluorescent beads. The stage may be moved in 50 nm steps through the focus.

Figure 19:
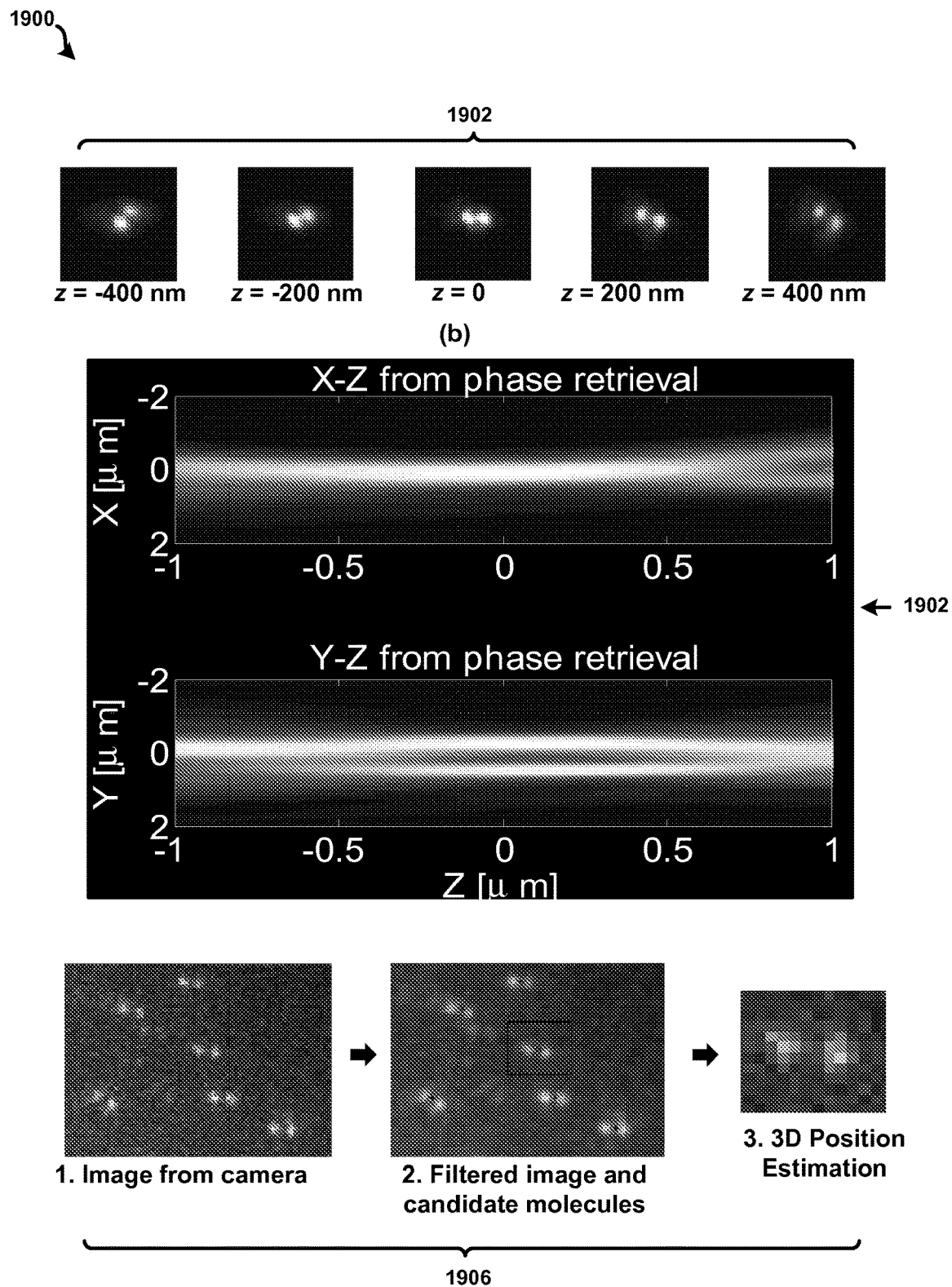
FIG. 19 shows an example nineteenth diagram in accordance with the disclosure.

Referring now to FIG. 19, an example nineteenth diagram 1900 is shown in accordance with the principles of the present disclosure. In particular, the nineteenth diagram 1900 illustrates in image 1902 images of the PSF at various positions of the translation stage mentioned above in connection with FIG. 18. The average images at each position may then be provided to a phase-retrieval algorithm which returns the complex fields at those positions to recover the 3D PSF. The nineteenth diagram 1900 further illustrates in plot 1904 x-z and y-z plots for the recovered 3D PSF. These complex fields in each transverse plane are then used by the maximum likelihood position estimation algorithm.

More specifically, the nineteenth diagram 1900 illustrates in image 1902 images of the 3D DH-PSF-S for various defocus positions, the data taken with red beads (660/680 200 nm diameter from Invitrogen) fixed on cover slide and used as z-calibration for data analysis. The nineteenth diagram 1900 further illustrates in plot 1904 an example of result of phase retrieval to create continuous 3D PSF. This may be used for maximum likelihood 3D position estimation of molecules. The nineteenth diagram 1900 further illustrates in image sequence 1906 a flowchart for processing of data. In this example, the image from the camera is filtered and potential molecule candidates are found, marked with black asterisks in the middle image. Each candidate image may be passed on to an estimator to find 3D position and number of detected photons.

In general, the data may be analyzed with for example custom written code to generate super-resolution images. Each image may be analyzed to find potential molecule candidates and then position estimations done for those potential molecules. An example of the basic steps done in the process is shown in image sequence 1906 of FIG. 19. In one embodiment, the raw image is first smoothed with an average filter and then local peaks are found using appropriate parameters with non-maximum suppression. The peaks above certain threshold of the background are selected and rough centers of the PSFs are found with peak positions of single lobes. The selected single molecule images are passed on to the 3D position estimator individually. MLE may be used for position estimation which is based on phase-retrieval. However, other embodiments are possible. In general, MLE algorithm may search through the 3D PSF model to find the best match for the molecule image to determine its x, y, and z position. The noise process for the MLE may be assumed to be Poisson. The axial position thus determined is corrected by a constant factor of or about 0.79 which arises due to the refractive index mismatch between the coverslip and the mounting medium of the sample. An example refractive index of the mounting medium may be of or about 1.35 whereas for the glass this may be of or about 1.515. The axial magnification factor due to index mismatch may be assumed to be constant within a few micrometers of the coverslip.

In some embodiments, the described imaging methods and systems demonstrate a 3D super-resolution system based on the DH-PSF as a flexible tool for biological imaging revealing details of structures at the nanoscale level. Further, the disclosed imaging methods and systems incorporates the advantage of a Fisher information efficient DH-PSF design, a photo-efficient PSF implementation with a polarization insensitive phase mask, and an optimal 3D position estimation to achieve long depth range super-resolution imaging with high precision. The DH-PSF-S implementation improves performance in high background with a minor compromise in the depth range. It also demonstrates the inherent flexibility of PSF engineering to choose a DH-PSF based on the specific application requirement. For instance, specific DH-PSF designs can target long or short depth range or a low or high background noise environment. The surface relief phase mask increases the efficiency, ease and flexibility of use over the SLM based systems. Furthermore, the phase retrieval based MLE for 3D localization increases the precision over the widely used Centroid and Gaussian estimators.

With the combination of these capabilities the described imaging methods and systems shows super-resolution imaging of micro-tubules with photo-switchable red dyes like Alexa-647 even with low photon counts. Hence, photo-activatable proteins with lower quantum efficiency may also be used. Photo-switchable probes are also attractive for multi-color imaging with single wavelength detection making use of a single phase mask in a microscope such as that shown in at least FIG. 18 for example. Further, an advantage of having a general analytical expression for the DH PSF is that the pattern may be easily controlled by specifying a small number of parameters, such as the spacing between the lobes and the rotation which are coupled to. All these patterns have different energy efficiency in the two lobes, have different rotation rates, and hence present different Fisher information and CRB for 3D position estimation. Depending on the application, for example, SNR, depth-of-field, a PSF can be generated which has two lobes rotating about the optical axis, encoding unique x, y and z position of the imaged object (point source in case of PSF). Hence an analytical design of DH-PSF gives freedom and control of DH-PSF design.

Figure 20:
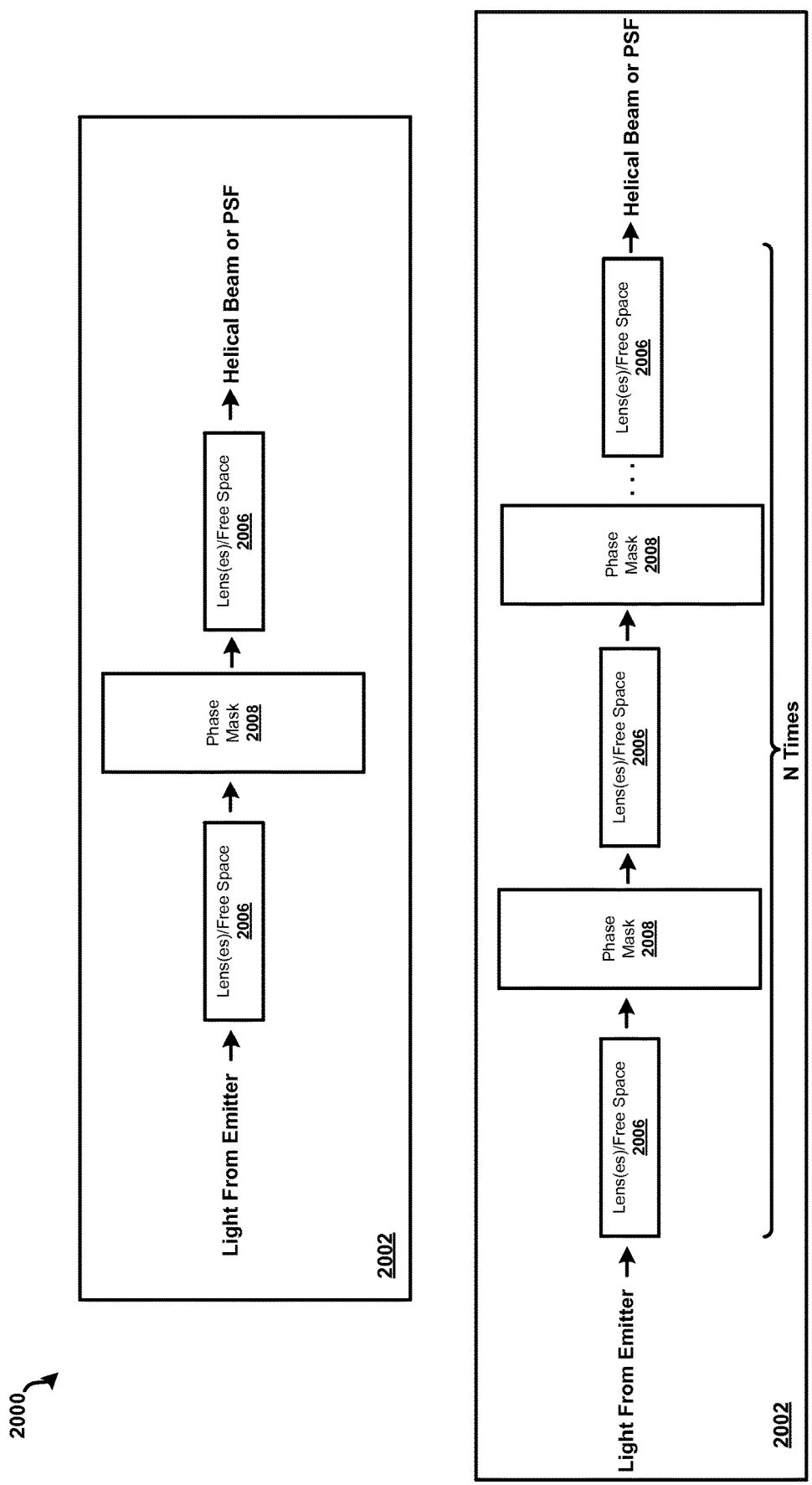
FIG. 20 shows an example twentieth diagram in accordance with the disclosure.

Referring now to FIG. 20, an example twentieth diagram 2000 is shown in accordance with the principles of the present disclosure. In particular, the twentieth diagram 2000 illustrates in schematic 2002 an example of a configuration for a helical beam PSF generation system, and in schematic 2004 an example cascading PSF generation system. In general, light from an emitter(s) may enter a lens system 2006 (or free space) pass through a phase mask 2008 and then another lens system 2006, and so on as desired, and exit as helical beam or PSF. FIG. 20 thus shows a general configuration for helical beam or PSF generation in accordance with the disclosure.

Figure 21:
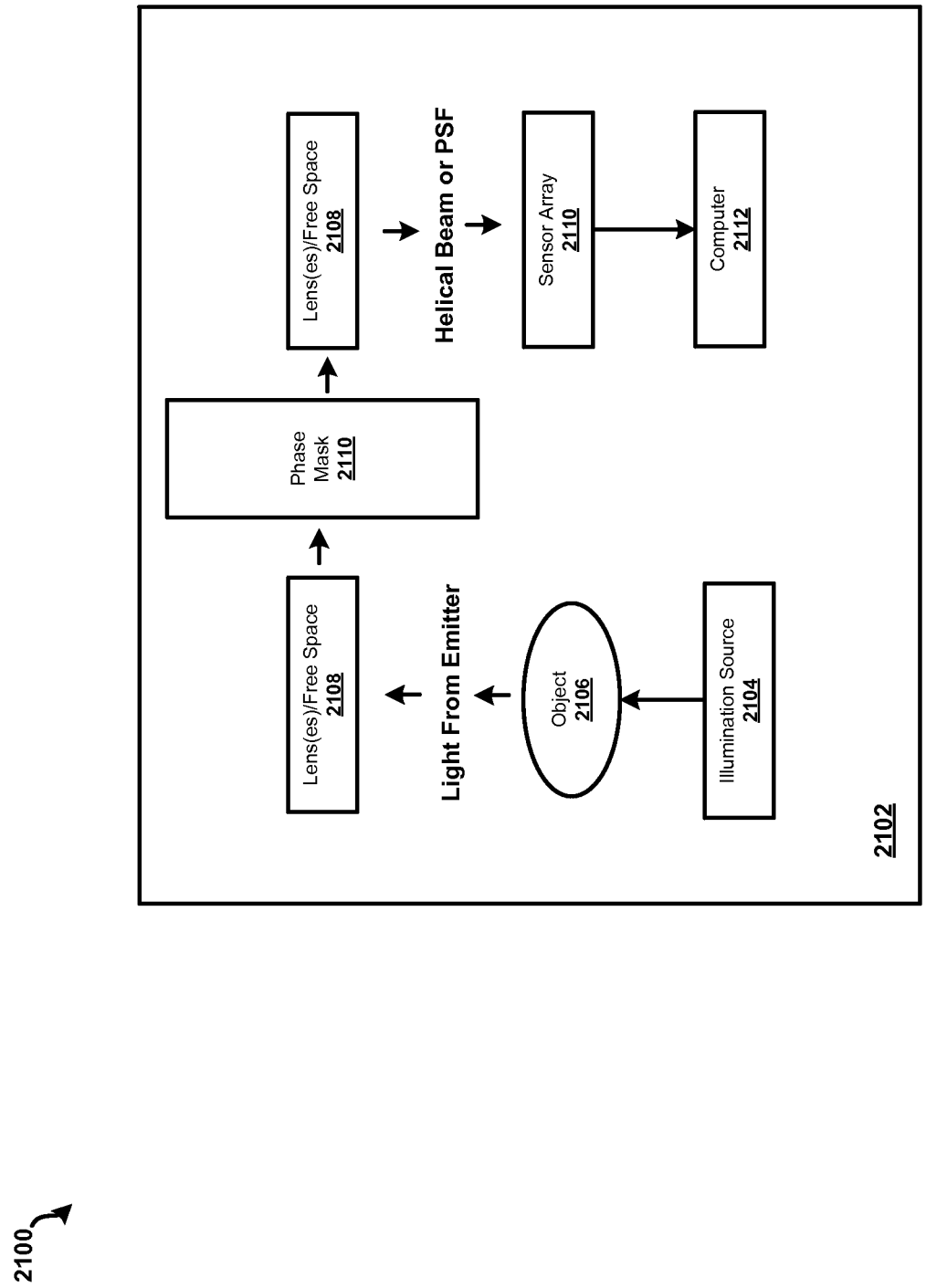
FIG. 21 shows an example twenty-first diagram in accordance with the disclosure.

Referring now to FIG. 21, an example twenty-first diagram 2100 is shown in accordance with the principles of the present disclosure. In particular, the twenty-first diagram 2100 illustrates in schematic 2102 an example of a configuration for an imaging system. In general, light from an illumination source 2104 may impinge an object or sample 2106 and light from an emitter(s) may enter a lens system 2108 (or free space), pass through a phase mask(s) 2110 and then another lens system 2108, and so on as desired, and exit as a helical beam or PSF. A sensor array 2110 may detect the helical beam or PSF and pass a signal to a computer device or system 2112 for processing.

A phase screw dislocation also called vortex or phase screw singularity is described analytically as $$E(r,\theta) = re^{i\theta} - r_0 e^{i\theta_0} \quad (14)$$

Specific result with N defects with charge c=+/−1:
Field at Aperture:

$$E_0(r, \theta) = \prod_{k=1}^{N} (re^{i\theta} - r_k e^{i\theta_k})^c \exp(-r^2/\omega_0^2) \quad (19)$$

Far Field:

$$E_0^\infty(\rho, \phi) = (i\pi\omega_0^2)^N \pi\omega_0^2 \prod_{k=1}^{N} (\rho e^{i\phi} - \rho_k e^{i\phi_k})^c \exp(-\pi^2 \rho^2 \omega_0^2) \quad (20)$$

$c = 1$ $\rho_k = r_k / \pi\omega_0^2$, $\phi_k = \theta_k - \pi/2$

Figure 22:
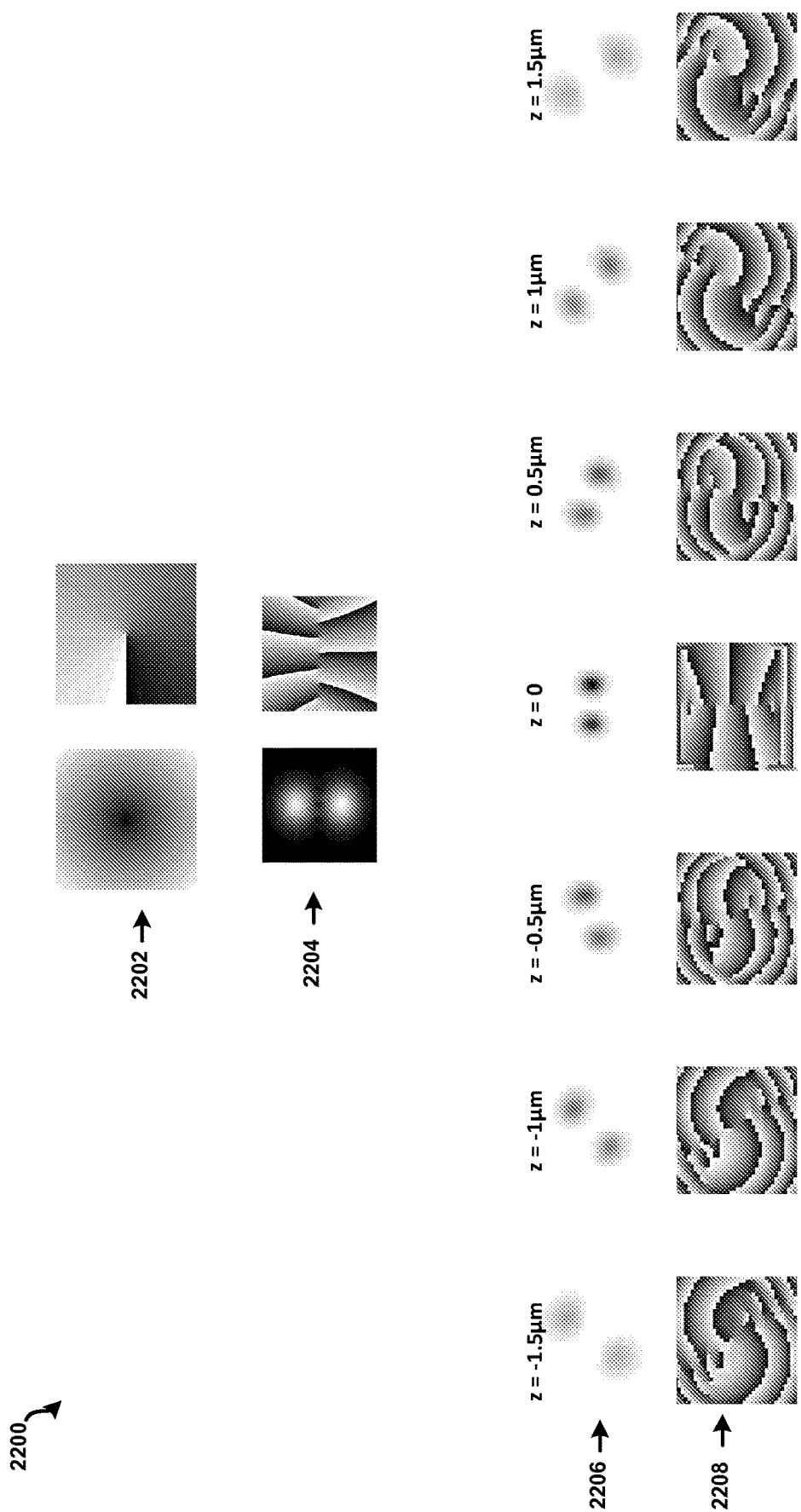
FIG. 22 shows an example twenty-second diagram in accordance with the disclosure.

The pattern may be rotated π/2 with respect to the aperture. Referring now to FIG. 22, an example twenty-second diagram 2200 is shown in accordance with the disclosure. In particular, the twenty-second diagram 2200 illustrates an image sequence 2202, 2204, 2206, and 2208, and demonstrates in image sequence 2206 an intensity profile and in image sequence 2208 phase around focus. In general, vortices can be anywhere in the field, and don't have to be in one line. If they are along a line then they form the double helical pattern in 3D.

It is noted that $$E(r, \theta) = \prod_{k=1}^{N} (re^{i\theta} - r_k e^{i\theta_k}) A(r, \theta) \quad (21)$$

wherein $A(r, \theta)=1$ is the amplitude which may be arbitrary.
Field at Aperture:

$$E_0(r, \theta) = circ\left(\frac{r}{R}\right) e^{iargE(r,\theta)} \text{ or} \quad (22, 23)$$

$$E_0(r, \theta) = \exp(-r^2/\omega_0^2) e^{iargE(r,\theta)}$$

In some embodiments the field at the aperture can have arbitrary amplitude but the phase is generated by multiplying vortices at different locations.

For the Double-Helix case $\theta_k$ may be in the range: −12°≤$\theta_k$≤12°, 168°≤$\theta_k$≤192°.

All the vortices may lie approximately on a line (e.g., horizontal) and on either side of the vertical line through the center of the field such that the energy is spread away from the horizontal line and takes shape of two lobes. These $r_k$ and $\theta_k$ values may be found by numerical optimization or other methods.

More specifically, the following are Double-Helix patterns (PSFs) generated analytically such that field has 2N+1 vortices located symmetrically about the center along x axis, $r_k$ and $\theta_k$ follow following relation and $E(r, \theta)$ is simplified:

$$E(r, \theta) = \prod_{k=-N}^{N} (re^{i\theta} - r_k e^{i\theta_k}) A(r, \theta) \quad (24)$$

Figure 23:
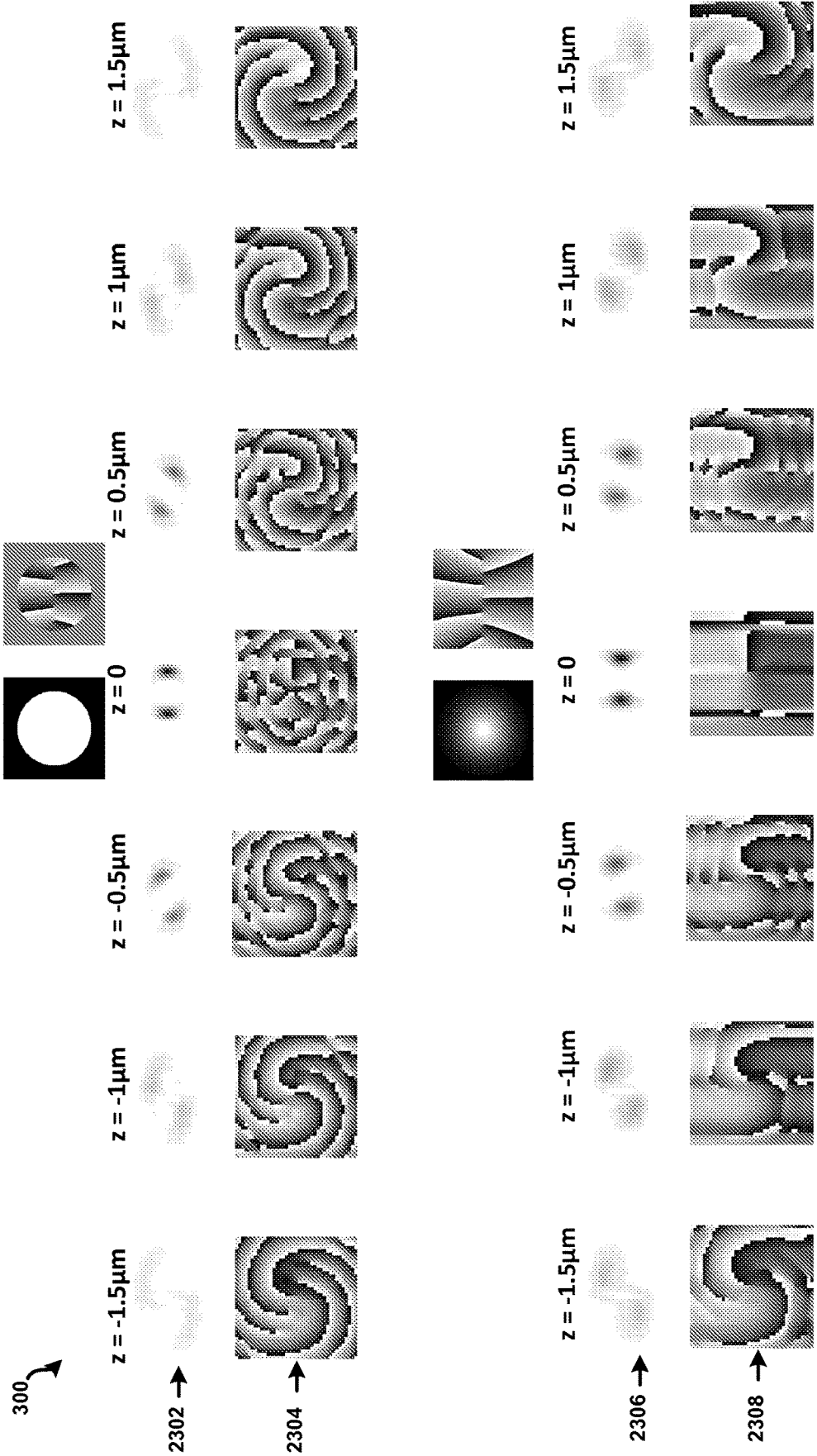
FIG. 23 shows an example twenty-third diagram in accordance with the disclosure.

$r_k = |k| r_0$ $\theta_k = \frac{\pi}{2}\left(1 - \frac{k}{|k|}\right) k \neq 0$ Field at Aperture (Phase Mask):

$$E_0(r, \theta) = circ\left(\frac{r}{R}\right) e^{iargE(r,\theta)} \quad (25)$$

where it is assumed that $A(r, \theta)=\exp(-r^2/\omega_0^2)$ but it can be anything including such as for example $A(r, \theta)=1$, $r_0$ is given with respect to size of aperture $r_0=nR$ Referring now to FIG. 23, an example twenty-third diagram 2300 is shown in accordance with the principles of the present disclosure. In particular, the twenty-third diagram 2300 demonstrates in image sequence 2302 an intensity profile and in image sequence 2304 phase patter (PSF) around focus from a circ function amplitude aperture mask. The twenty-third diagram 2300 further demonstrates in image sequence 2306 an intensity profile and in image sequence 2308 phase patter (PSF) around focus from a Gaussian amplitude mask.

Figure 24:
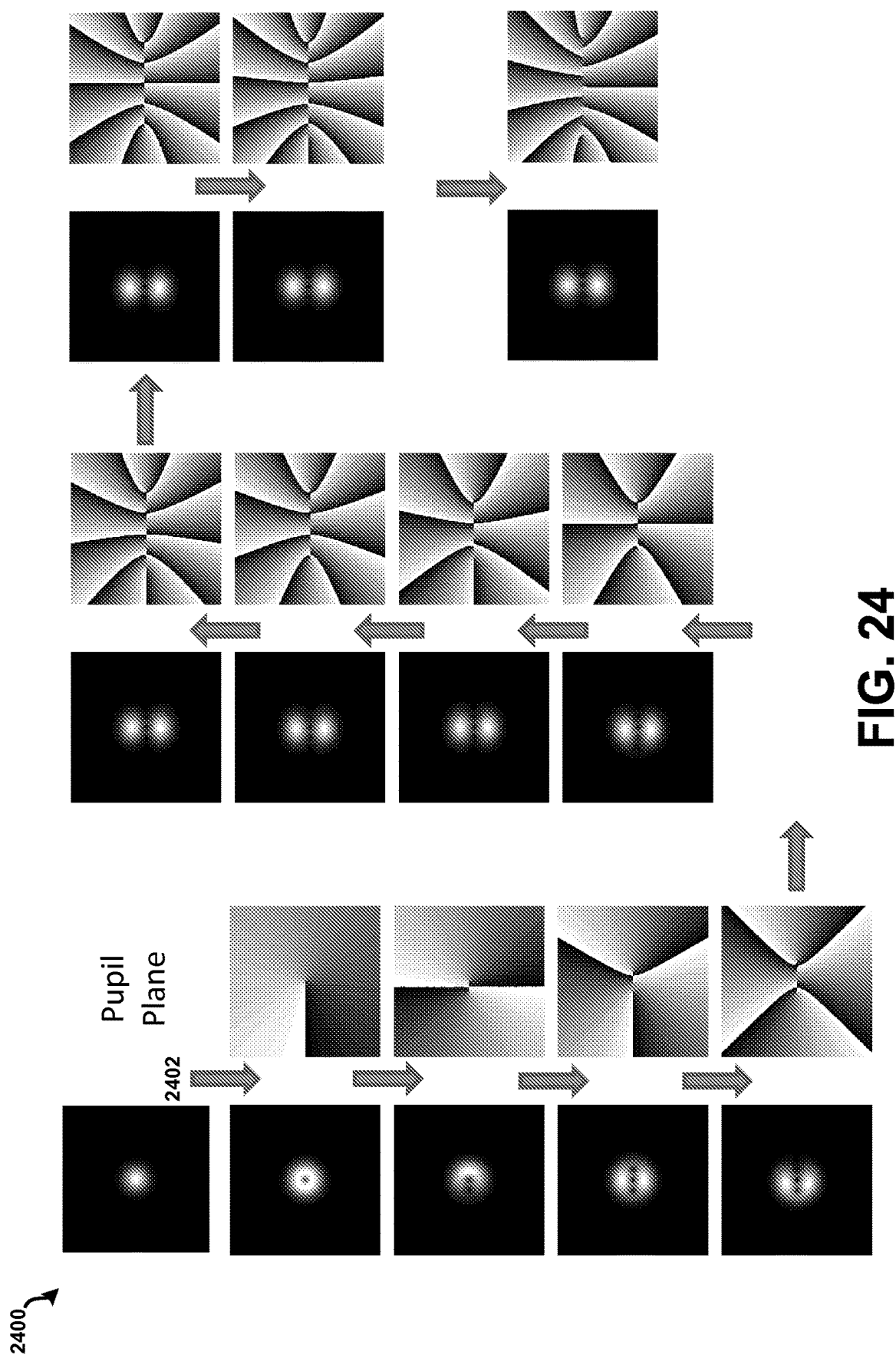
FIG. 24 shows an example twenty-fourth diagram in accordance with the disclosure.

Referring now to FIG. 24, an example twenty-fourth diagram 2400 is shown in accordance with the principles of the present disclosure. In particular, the twenty-fourth diagram 2400 demonstrates in image sequence 2402 examples of screw dislocations in the pupil plane. The images show the change in the pupil phase and the PSF in focus as the number of wavefront dislocations along a line increases. This could be performed along one or more lines to generate helical PSFs or beams in any orientation. Such an implementation illustrates PSF design by screw dislocations.

Figure 25:
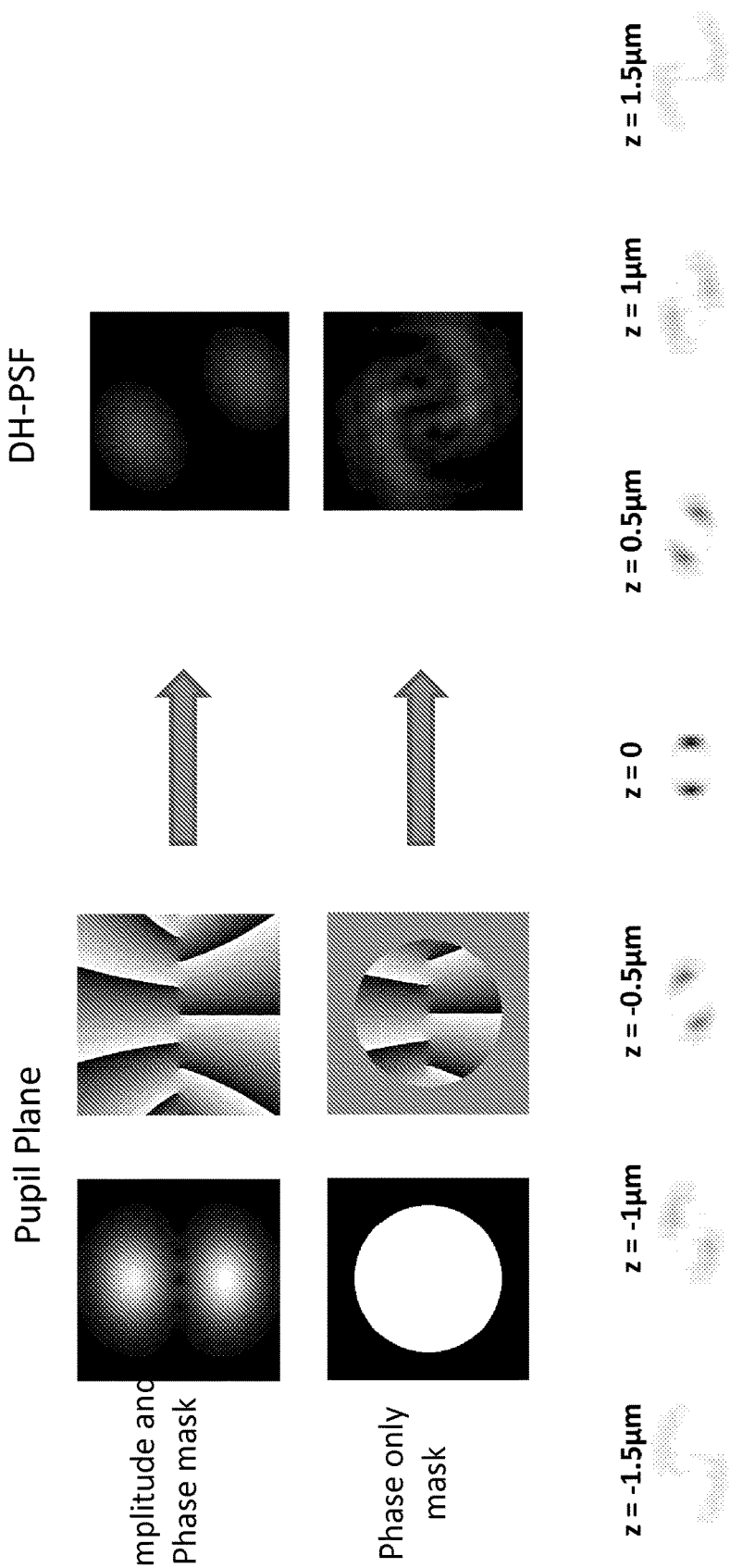
FIG. 25 shows an example twenty-fifth diagram in accordance with the disclosure.

Referring now to FIG. 25, an example twenty-fifth diagram 2500 is shown in accordance with the principles of the present disclosure. In particular, the twenty-fifth diagram 2500 demonstrates shows examples of DH-PSF using an amplitude and phase mask as well as an aperture limiting phase mask. In this example, optimization of the 3D CRLB of analytic DH-PSF may be a function of distance between dislocations, $r_0$, and number of dislocations, N.

Figure 26:
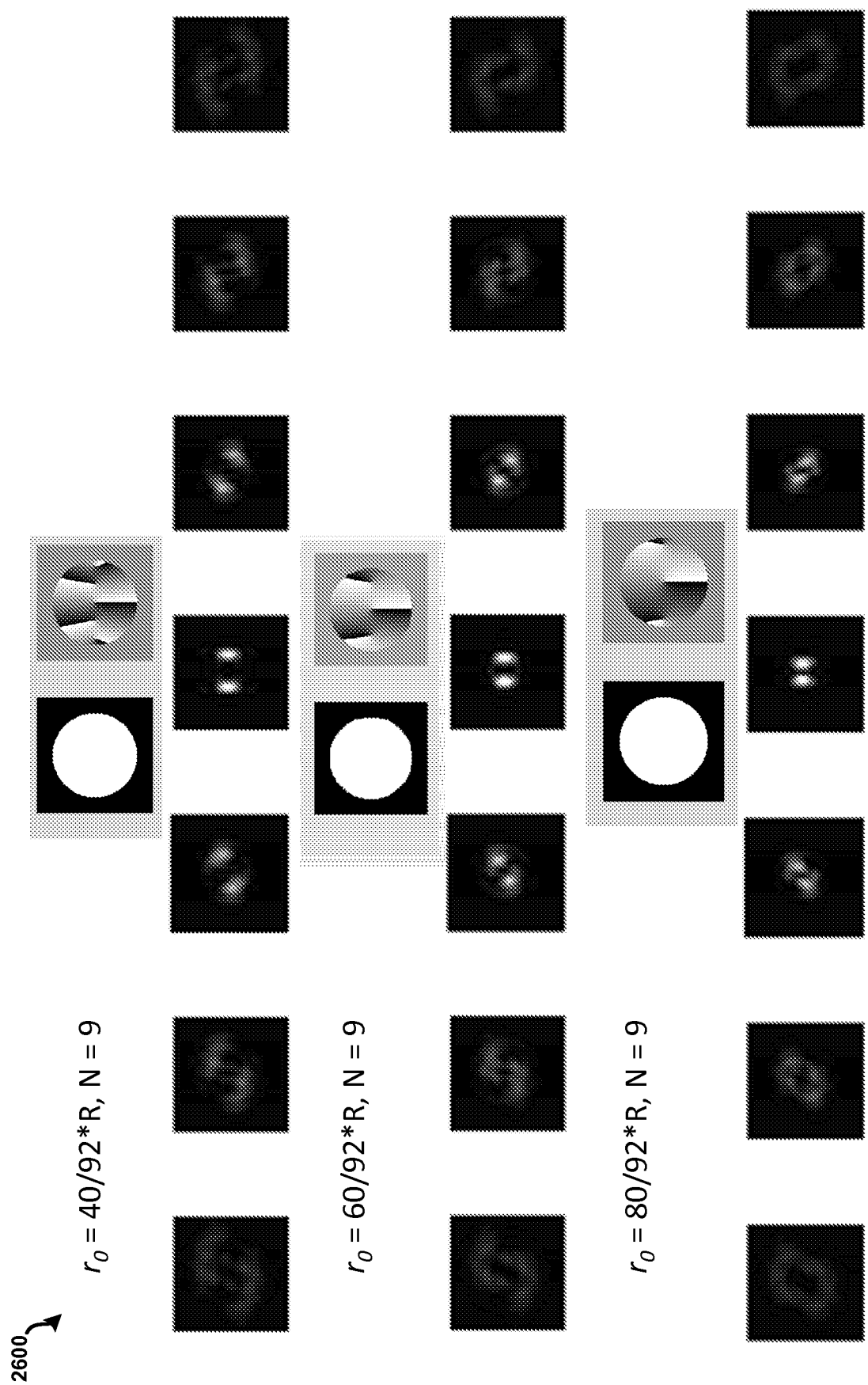
FIG. 26 shows an example twenty-sixth diagram in accordance with the disclosure.
Figure 27:
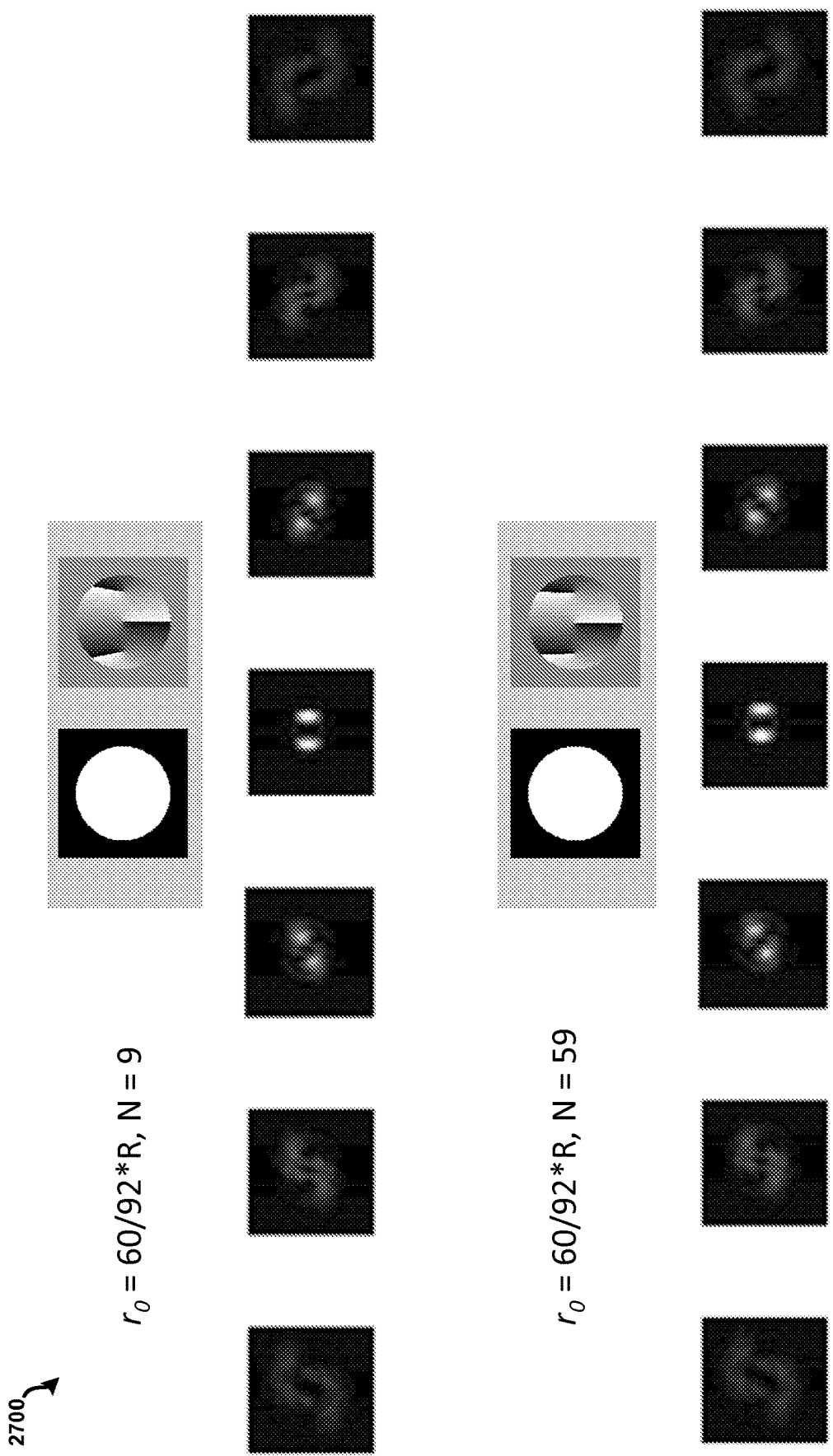
FIG. 27 shows an example twenty-seventh diagram in accordance with the disclosure.

Referring now to FIG. 26, an example twenty-sixth diagram 2600 is shown in accordance with the principles of the present disclosure. In particular, the twenty-sixth diagram 2600 shows examples of the effect of changing spacing between the vortices, $r_0$ number of vortices in the field with N same. Referring now to FIG. 27, an example twenty-seventh diagram 2700 is shown in accordance with the principles of the present disclosure. In particular, the twenty-seventh diagram 2700 shows examples of the effect of changing number of vortices in the field, N, keeping $r_0$ constant. Even though the center of vortices is not in the field but they affect the phase mask, therefore PSF and therefore Fisher Information. Change in the phase mask can affect the PSF and therefore Fisher Information.

III. Super-Resolution and/or Super-Localization of Dense Arrays of Emitters

Embodiments described herein are directed toward methods and systems for resolving dense clusters of independently blinking emitters such as quantum dots closer than the diffraction limit. Embodiments may rely one or both on the statistical independence of the quantum dots emission and the spatial PSF of the optical system. Numerical simulations indicate the ability to superresolve up to five emitters located within an area of a diffraction limited spot, while simultaneously localizing the emitters to a precision of or about 17 nm. Achieved resolution of five emitters in experimental data confirms the applicability of this approach. Embodiments may also include generalization to any type of emitter or scatterer with certain known temporal characteristics (random or deterministic) and/or certain known spatial characteristics (random or deterministic). Embodiments may be used in any of a number of applications such as, for example, imaging systems at least similar to those discussed above, astronomical observations, military applications, scientific measurements, and many other.

Optical microscopy has a fundamental resolution limit determined by diffraction. However, if one can assume the object consists of a collection of point-like sources, as is the case in single-molecule fluorescence imaging, the resolution paradigm is completely changed. Certain superresolution fluorescence microscopy techniques such as PALM and STORM rely on the ability to temporally resolve closely-spaced emitters to achieve superresolution. An important step is to control the experimental conditions such that unresolved emitters are switched temporally, here, temporal resolution is traded for spatial resolution. Such techniques still rely on the ability to resolve the emitters in time so that the images of different emitters do not overlap, therefore placing a limit on the labeling density of samples.

A related technique uses an analysis of quantum dot blinking; by exploiting their random temporal fluctuations, two emitters spaced closer than the diffraction limit may be resolved without relying on localization. This method involves performing Independent Component Analysis (ICA) on the data. The way in which ICA is able to resolve the emitters is because the quantum dots blink randomly and independently. The ICA algorithm decomposes the data into a small set of variables which have maximally non-Gaussian probability distribution functions. In principle, these non-Gaussian variables may correspond to the images of the independently blinking quantum dots in the scene.

The ICA algorithm however has a shortcoming where in order to correctly resolve the emitters, one must know the true number of emitters in the scene, which is not the case in at least an experimental setting. This is a difficult enough hurdle to preclude the method from being implemented in any nontrivial situation. In some embodiments, a method is provided that addresses this problem by incorporating spatial analysis of the quantum dots in addition to the stochastic temporal analysis. The algorithm uses ICA to generate a family of possible solutions, and then the independent components are classified according to their spatial and temporal characteristics. The result that best matches a model of quantum dot behavior is selected—referred to as Independent Component Classification (ICC) in accordance with the present disclosure.

The benefits and advantages to ICC as described throughout are numerous. Besides the ability to resolve densely spaced emitters, localization may be performed afterwards with high precision. Furthermore, ICC may be implemented with a standard fluorescence microscope; no modifications are needed. It may be preferable to use emitters that have an independent and non-Gaussian property, such as quantum dot blinking Quantum dot emitters are attractive in various types of superresolution experiments due to their high photon output, photostability, wide range of emission wavelengths, and broad absorption spectra.

Figure 28:
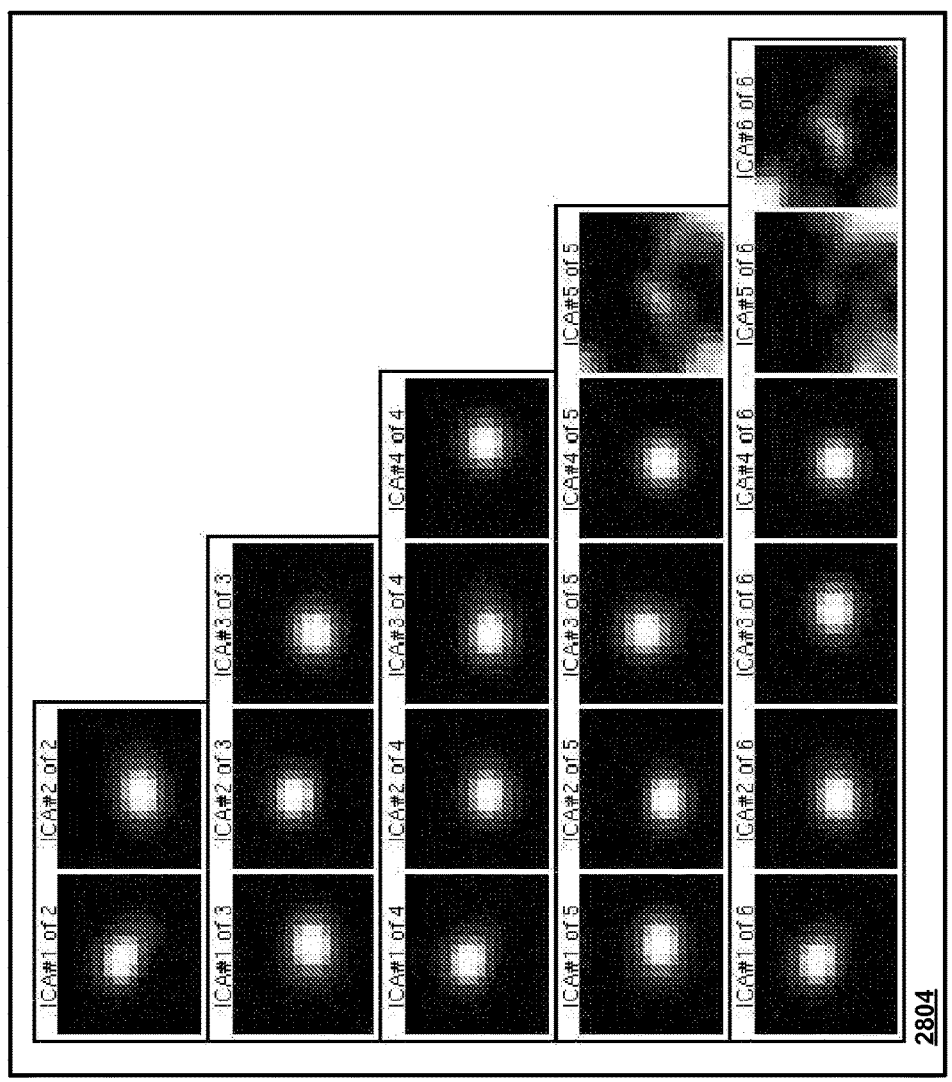
FIG. 28 shows an example twenty-eighth diagram in accordance with the disclosure.
Figure 28:
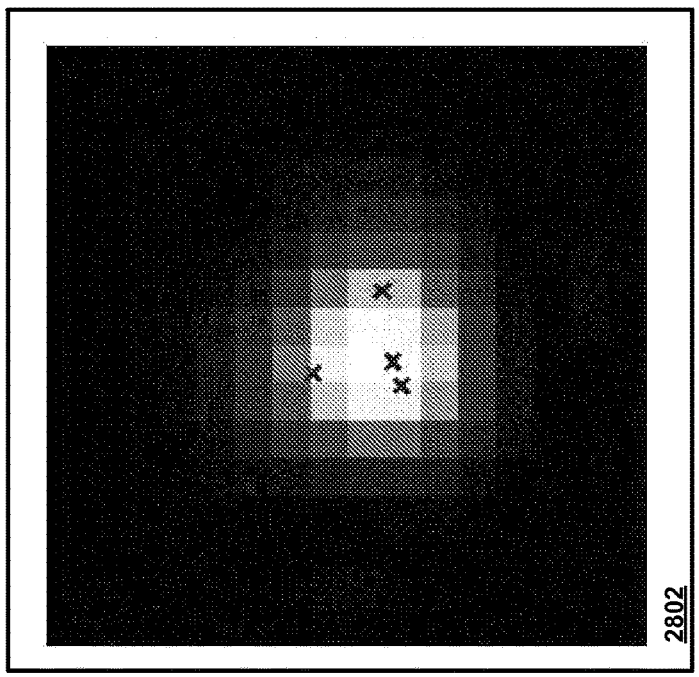

In some embodiments, the input data may be a video of stationary blinking quantum dots. The data may be folded into a two-dimensional matrix, where each row is the time series of a particular pixel. Then, ICA may be performed a number of times to generate a family of potential solutions. The ICA algorithm may be implemented, for example, using the fastICA package algorithm or a similar algorithm. FastICA's inputs include the data matrix and the requested number of components "N", and the output is the set of N independent components. With each iteration an increasing number of emitters can be assumed. Referring now to FIG. 28, an example twenty-eighth diagram 2800 is shown in accordance with the principles of the present disclosure. In particular, the twenty-eighth diagram 2800 shows in slide 2802 and slide 2804 an example of a solution set for simulated data. In this example, the true number of emitters is four.

While ICA is described herein as an example other algorithms may also be used. For example, any number of blind source separation algorithms may be used. For example, any scheme that maximizes non-Gaussianity as a measure of statistical independence. Various other algorithms that consider the different temporal characteristics of the emitters may be used without limitation.

A pattern emerges by examining the spatial characteristics of the potential solutions where once the number of emitters is overestimated, spurious results that do not resemble the system PSF are returned, as shown in the right most elements in the last two rows in slide 2804. When the number of emitters is underestimated, the returned independent components are often a superposition of two emitters. The result is less obvious in the present example where the emitters are unresolved, but simulations with easily resolved emitters clearly exhibited this tendency. Embodiments may exploit this tendency to estimate the number of emitters in the scene. Each set of potential solutions may be given a score that measures the maximum error of any one of the returned components as compared to the theoretical PSF. This comparison may for example be calculated by computing the L-2 norm of the difference between the data and the ideal PSF in Fourier space; the calculation may be performed in Fourier space to account for possible lateral shifts. Other metrics may be used to consider the spatial characteristics of the emitters. Some examples include the likelihood function, mutual information, Fisher information, weighted norms, etc. A theoretical, experimental, or statistical model, or any combination thereof, may be included as well as prior knowledge with respect to the statistics, shape, or spectrum of the emitters.

Figure 29:
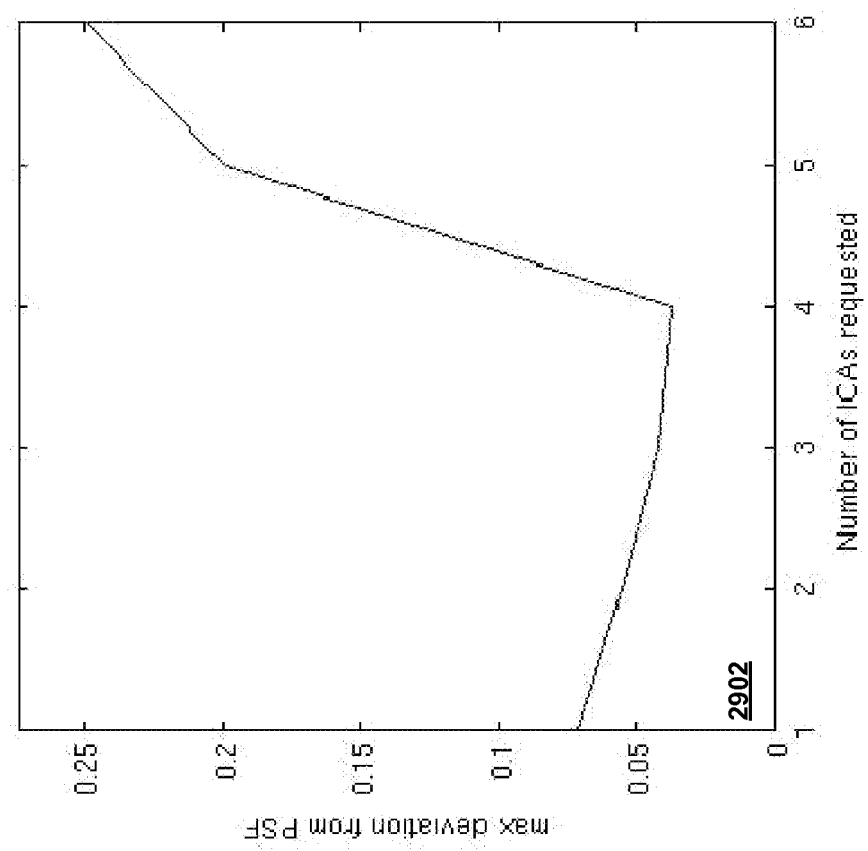
FIG. 29 shows an example twenty-ninth diagram in accordance with the disclosure.

Referring now to FIG. 29, an example twenty-ninth diagram 2900 is shown in accordance with the principles of the present disclosure. In particular, the twenty-ninth diagram 2900 includes a plot 2902 that displays scores associated with the solution set in FIG. 28. The number of emitters in the scene is assumed to be the set of results that immediately precedes the largest first derivative (forward difference) of the score set. In other words, the correct solution may be assumed to be the one in which no spurious components are returned. The derivative may be used instead of the absolute minimum because it may be less likely to underestimate the number of emitters, especially in the case of closely spaced emitters. This may be understood by examining the score plot 2902 in FIG. 29; the detectable change in the event of overestimation is much more dramatic than in the case of underestimation.

Figure 30:
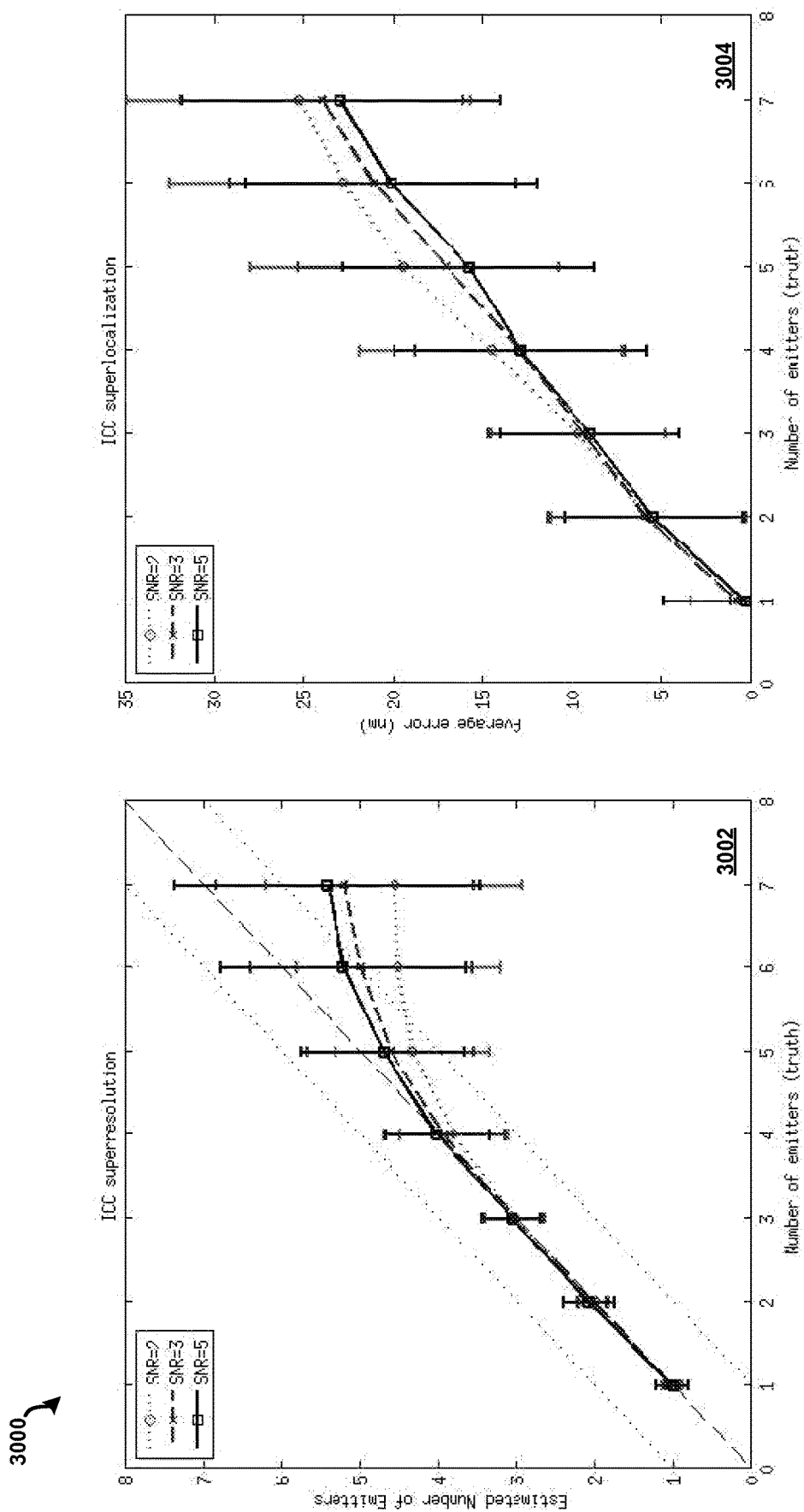
FIG. 30 shows an example thirtieth diagram in accordance with the disclosure.

In Monte Carlo simulations, several emitters were placed randomly within a diffraction limited spot, given random blinking behavior, and combined with background noise and shot noise. Referring now to FIG. 30, an example thirtieth diagram 3000 is shown in accordance with the principles of the present disclosure. In particular, the thirtieth diagram 3000 includes a plot 3002 and a plot 3004 that display a summary of results of the Monte Carlo simulations. For each number of emitters from one to seven, a random set of unresolved locations is generated, and the ICC algorithm attempts to determine the number of emitters and their locations; this is repeated about 500 times for each number of emitters. As expected, the ability to correctly estimate the number of emitters increases with the signal-noise ratio (SNR). With experimentally achievable SNRs, the ICC algorithm may at least reliably resolve up to five emitters within a diffraction limited spot. At greater densities, the number of emitters may be underestimated. Further simulations show that these super-resolved emitters may be localized to a high precision. As expected, localization precision depends on the noise level and emitter density, but typical noise levels allow localization as good as about 17 nm when five emitters are located within a diffraction-limited spot.

Experiments were performed to test the ICC superresolution method. A fluorescence microscope was built using a 405 nm diode laser as the excitation source, and a 1.3 NA 100× Zeiss objective collected the fluorescence from the 525 nm quantum dots from Invitrogen. A 100 mm tube lens was selected to give 62.5× magnification on a Hamamatsu Orca-Flash 2.0 CMOS camera. This system resulted in slight over-sampling of the PSF, with 3.5 pixels across the full-width at half-maximum of the PSF. A test sample composed of quantum dots scattered across a cover slip was imaged for 500 frames with an exposure time of 200 ms per frame, giving a total acquisition time of less than two minutes.

Figure 31:
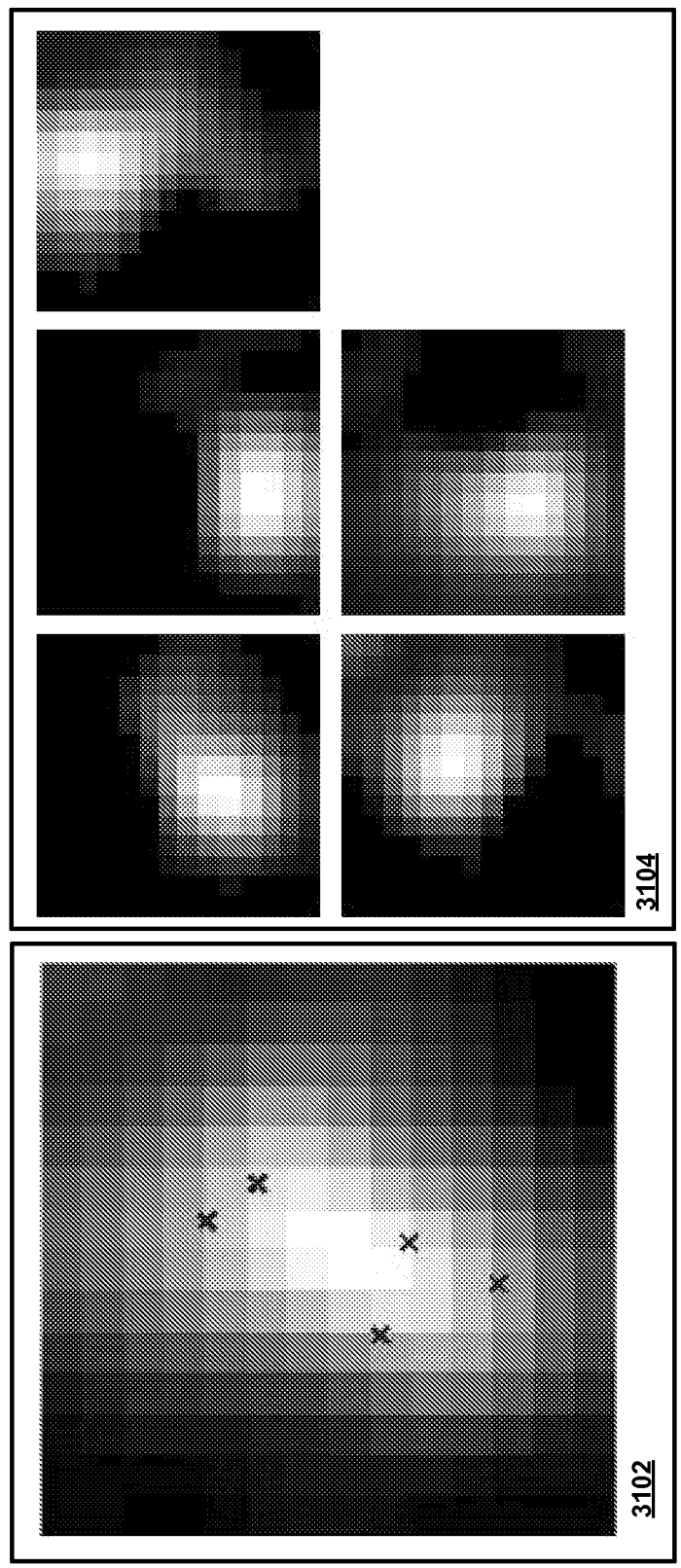
FIG. 31 shows an example thirty-first diagram in accordance with the disclosure.

Referring now to FIG. 31, an example thirty-first diagram 3100 is shown in accordance with the principles of the present disclosure. In particular, the thirty-first diagram 3100 includes results of the ICC analysis of a short video section in a slide 3102 and a slide 3104. In the normal fluorescence image, there are no clearly-resolved emitters, but the ICC analysis suggests there are five unresolved emitters. FIG. 31 shows the average image of the video, as well as the estimated locations of the emitters and their separated images. The distance between neighboring emitters is between about 85 nm and about 230 nm in all cases, and the furthest distance between two of the emitters is about 420 nm. For comparison, this system's diffraction-limited spot is about 493 nm in diameter. Therefore, all five emitters have been superresolved.

As may be understood from the foregoing, embodiments include superresolution techniques capable of resolving dense clusters of quantum dots. The simulations validate the method, showing the ability to resolve emitters that would normally be unresolved. Experimental data shows super-resolution well beyond the diffraction limit.

IV. Summary

As may be understood in light of the foregoing description in connection with the drawings, the present disclosure is generally directed to or towards imaging or measurement methods and systems. For example, in at least a first aspect, methods and systems for finding the 3D orientation and position of dipole or dipole-like particles and single molecules are disclosed. It is contemplated that there are many advantages and/or benefits associated with such methods and systems. For example, such methods and systems may enable the estimation of at least one of position and angular orientation of a particle, molecule, or any other element. For example, at least a portion of a radiation pattern emitted by a particle in response to an excitation beam directed to a medium containing the particle may be imaged, and at least one of position and angular orientation of the particle within the medium may be estimated based on an imaged radiation pattern.

In some embodiments, at least one of position and angular orientation of the particle within the medium may be estimated based on an assumption that the radiation pattern is dipole or dipole-like. Other embodiments are possible. In some embodiments, a measurement may be output, such as for display or further processing for example, that provides a three-dimensional coordinate representation of position of the particle within the medium. In some embodiments, a measurement may be output, such as for display or further processing for example, that provides an axis-angle representation of angular orientation of the particle within the medium. The disclosure however is not so limited.

For example, in some embodiments, at least the portion of the radiation pattern may be imaged using a single particular optical or imaging channel, and position and angular orientation of the particle may be estimated or approximated based on total intensity of the imaged radiation pattern. In some embodiments, at least the portion of the radiation pattern may be imaged using a plurality of optical or imaging channels, and position and angular orientation of the particle may be estimated or approximated based on total intensity of the imaged radiation pattern. The disclosure however is not so limited.

For example, in some embodiments, at least the portion of the radiation pattern may be imaged using a plurality of optical or imaging channels with orthogonal linear polarization states. In some embodiments, at least the portion of the radiation pattern may be imaged using a plurality of optical or imaging channels with orthogonal elliptical polarization states. In some embodiments, at least the portion of the radiation pattern may be imaged at a single particular focal plane. In some embodiments, at least the portion of the radiation pattern may be imaged at a first focal plane and a second different focal plane. The disclosure however is not so limited.

In some embodiments, radiation emitted by the particle may be modulated in at least one of spatial or temporal phase, amplitude, or polarization. In some embodiments, radiation emitted by the particle may be modulated to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

Such methods and systems may further enable the estimation and storage in memory of at least one of positional and angular representation of at least one particle within a sample. For example, in some embodiments, a source, of an imaging or measurement system, may be arranged and configured to output an excitation beam that is directed to a sample containing at least one particle that emits a dipole or dipole-like radiation pattern when impinged by the excitation beam. In some embodiments, at least one sensor, of the imaging or measurement system, may be arranged and configured to capture at least one image of at least a portion of a radiation pattern emitted by the at least one particle in response to impingement by the excitation beam. In some embodiments, at least one processing device, of the imaging or measurement system, may be coupled to the at least one sensor and configured to estimate and store in memory a positional and angular representation of the at least one particle within the sample based on the at least one image. The disclosure however is not so limited.

For example, in some embodiments, at least one output device, of the imaging or measurement system, may be coupled to the at least one processing device and configured to output a measurement that provides a three-dimensional coordinate representation of position of the at least one particle within the sample, and a measurement that provides an axis-angle representation of angular orientation of the at least one particle within the sample. In some embodiments, the at least one sensor may be positioned along a particular optical path of the imaging or measurement system, and the at least one processing device is configured to estimate and store in memory the positional and angular representation of the at least one particle within the sample based on total intensity of at least the portion of the radiation pattern. The disclosure however is not so limited.

For example, in some embodiments, the at least one sensor is a first sensor, and the imaging or measurement system may include or comprise a beam splitter configured and arranged to direct a radiation emitted by the at least one particle along a first optical path of the imaging or measurement system that includes the first sensor and a second optical path of the imaging or measurement system that includes a second sensor. In this example, the at least one processing device may be coupled to the first and second sensor and may be configured to estimate and store in memory position and angular orientation of the at least one particle based on a first radiation pattern captured by the first sensor and a second radiation pattern captured by the second sensor. The disclosure however is not so limited.

For example, in some embodiments, the at least one processing device may be configured to estimate and store in memory position and angular orientation of the at least one particle based on total intensity of the first radiation pattern and the second radiation pattern. In some embodiments, the imaging or measurement system may include or comprise a beam splitter that is a polarizing beam splitter, and the at least one processing device may be configured to estimate and store in memory position and angular orientation of the at least one particle based on combination of the first radiation pattern and the second radiation pattern that have orthogonal linear polarization states. In some embodiments, the imaging or measurement system may include or comprise a beam splitter that is a polarizing beam splitter, and the at least one processing device may be configured to estimate and store in memory position and angular orientation of the at least one particle based on combination of the first radiation pattern and the second radiation pattern that have orthogonal elliptical polarization states. The disclosure however is not so limited.

For example, in some embodiments, a masking module, of the imaging or measurement system, may be disposed along a particular optical path with the at least one sensor, and the masking module may be arranged and configured modulate radiation emitted by the at least one particle in at least one of phase, time, amplitude, or polarization. In some embodiments, a masking module, of the imaging or measurement system, may be disposed along a particular optical path with the at least one sensor to selectively modulate radiation emitted by the at least one like particle to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

Such methods and systems may further enable a computing system or device that implements aspects of the present disclosure. For example, a computing system or device may at least include one or more processors and a memory communicatively coupled with and readable by the one or more processors and having stored therein processor-readable instructions that, when executed by the one or more processors, cause the one or more processors to perform a calculation to estimate, and store within the memory for processing, position and angular orientation of at least one particle within a sample based on an imaged radiation pattern emitted by the at least one particle in response to impingement by an excitation beam directed to the sample containing the at least one particle. In this example, radiation emitted by the at least one particle may be modulated in at least one of spatial or temporal phase, amplitude, or polarization prior to imaging thereof. The disclosure however is not so limited.

For example, in some embodiments, at least one output device of the computing system or device may be coupled to the one or more processors, where the processor-readable instructions when executed by the one or more processors may further cause the one or more processors to output to the at least one output device a measurement that provides a three-dimensional coordinate representation of position of the at least one particle within the sample, and a measurement that provides an axis-angle representation of angular orientation of the at least one particle within the sample. In some embodiments, radiation emitted by the at least one particle may be selectively modulated prior to imaging thereof to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions. The disclosure however is not so limited.

For example, in at least a second aspect, methods and systems for generating helical beams and helical point spread functions are disclosed. It is contemplated that there are many advantages and/or benefits associated with such methods and systems. For example, such methods and systems may enable the generation of at least one of point spread functions (PSFs) or helical beams. For example, radiation emitted by one or more emitters may be passed through at least one mask module disposed within an optical system to generate a single-helix PSF, a multi-helix PSF, or a helical beam. The disclosure however is not so limited.

For example, in some embodiments, the at least one mask module may include or comprise at least one phase mask that includes a number of optical phase vortices or phase screw dislocations. In some embodiments, the at least mask module may include or comprise at least one mask that modulates one or more properties of at least a portion of radiation emitted by the one or more emitters according to a predetermined application-specific requirement. In some embodiments, one or more of the following may generated: the single-helix PSF of light intensity in three-dimensional space; the multi-helix PSF of light intensity in three-dimensional space; and the helical beam. The disclosure however is not so limited.

For example, in some embodiments, the at least one mask module may include comprises at least one phase mask that includes a number of optical phase vortices or phase screw dislocations located along about one or more lines. In some embodiments, the at least one mask module may include or comprise at least one mask that exhibits apodization. In some embodiments, radiation emitted by one or more emitters may be selectively modulated to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions.

Such methods and systems may further enable generation of a point spread function (PSF) of helical form. For example, an optical system may include one or more of one or more light sources, one or more masks disposed within the optical system, a lens system disposed within the optical system, one or more sensor arrays disposed within the optical system, where the sensor arrays may be configured to capture one or more images of at least one particle, and one or more central processing units or graphical processing units to control the optical system and process data received by the one or more sensor arrays to generate the PSF of helical form. The disclosure however is not so limited.

For example, in some embodiments, at least one of the one or more masks may include a number of optical phase vortices or phase screw dislocations. In some embodiments, at least one of the one or more masks are selectively predefined to optimize at least one of Cramer Rao lower bound for estimation of one or more particular parameters; Fisher information; Mutual information; Strehl Ratio; background; signal to noise ratio; position and effect of zeros of the optical transfer function; energy efficiency; side lobes; peak to background; or uniformity in three dimensions. In some embodiments, the one or more masks may generate one of a single-helix and a multi-helix of light intensity in three-dimensional space when emitted radiation is passed therethrough. In some embodiments, at least one mask of the one or more masks may include a number of optical phase vortices or phase screw dislocations located along about one or more lines. In some embodiments, at least one mask of the one or more masks may exhibit apodization. The disclosure however is not so limited.

For example, in some embodiments, the one or more central processing units or graphical processing units may control the optical system and process data received by the one or more sensor arrays to localize the at least one particle in three dimensions. In some embodiments, the one or more central processing units or graphical processing units may control the optical system and process data received by the one or more sensor arrays to image the at least one particle in three dimensions. In some embodiments, the one or more central processing units or graphical processing units control the optical system and process data received by the one or more sensor arrays to estimate range of the at least one particle. In some embodiments, the one or more central processing units or graphical processing units may control the optical system and process data received by the one or more sensor arrays to image the at least one particle over time in three dimensions. The disclosure however is not so limited.

For example, in some embodiments, the one or more central processing units or graphical processing units may control the optical system and process data received by the sensor arrays to image and localize one or more emitters over time in three dimensions and reconstruct structure of an object by assembling three-dimensional positions of emitter localizations. in some embodiments, the one or more central processing units or graphical processing units may control the optical system and process data received by the one or more sensor arrays to image in three-dimensions, where at least one of: rotation free pattern may be used as a reference for restoration; optical encoding may be estimated from a resulting image using Maximum Likelihood Estimation or a Bayesian estimator to restore an image locally; at least one of multiple images may be used to estimate an original three dimensional function; and multiple images may be used to estimate the original three dimensional function using a depth-from-defocus operation with local diffusion operations, non-local diffusion operations, or expectation maximization algorithms.

Such methods and systems may further enable a non-transitory processor-readable medium that implements aspects of the present disclosure. For example, a non-transitory processor-readable medium may be incorporated within an axial ranging system and may include or comprise stored therein or thereon processor-readable instructions configured to cause one or more processors to estimate from an optically encoded image using Maximum Likelihood Estimation or Bayesian estimator to locate axial location of an object. The non-transitory processor-readable may include or comprise stored therein or thereon processor-readable instructions configured to cause one or more processors to estimate a particular three-dimensional function from multiple images. The non-transitory processor-readable may include or comprise stored therein or thereon processor-readable instructions configured to cause one or more processors to estimate a particular three-dimensional function from multiple images using depth-from-defocus actions with local diffusion operations, non-local diffusion operations, or expectation maximization algorithms. The disclosure however is not so limited.

For example, in at least a third aspect, methods and systems for super-resolution and super-localization of dense arrays of emitters are disclosed. It is contemplated that there are many advantages and/or benefits associated with such methods and systems. For example, such methods and systems may enable estimation of a number of emitters within a sample. For example, at least one of spatial, temporal, or spectral data associated with emission of radiation from emitters contained within a sample may be received by a computing system or device, and a number of emitters within the sample may be estimated from at least one of spatial, temporal, or spectral characteristics of all solution outputs among a finite set of solution outputs. In this example, a solution output may correspond to a superposition of corresponding spatial, temporal, or spectral characteristics for or associated with each or every emitter within the sample. The disclosure however is not so limited.

For example, in some embodiments, radiation emitted by the emitters may be passed through an optical system to optimize estimating the number of emitters within the sample. In some embodiments, it may be determined whether spatial characteristics resemble a system point spread function based on the all solution outputs. In some embodiments, at least one parameter may be output, such as for display or further processing for example, that provides a representation of the estimated number of emitters. In some embodiments, position of at least one of the number of emitters within the sample may be estimated. In some embodiments, a measurement may be output that provides a three-dimensional coordinate representation of position of the at least one of the number of emitters within the sample. The disclosure however is not so limited. For example, in some embodiments, angular orientation of at least one of the number of emitters within the sample may be estimated. In some embodiments, a measurement may be output that provides an axis-angle representation of angular orientation of the at least one of the number of emitters within the sample. In some embodiments, the emitters are stationary blinking emitters, molecules, or quantum dots.

Such methods and systems may further enable a computing system or device that implements aspects of the present disclosure. For example, a computing system or device may include at least one of one or more processors and a memory communicatively coupled with and readable by the one or more processors and having stored therein processor-readable instructions that, when executed by the one or more processors, cause the one or more processors to perform a calculation to estimate, and store within the memory for further processing, a number of emitters within a sample from at least one of spatial, temporal, or spectral characteristics of all solution outputs among a finite set of solution outputs based upon a corresponding one of spatial, temporal, or spectral data associated with emission of radiation from emitters contained within the sample. The disclosure however is not so limited.

For example, in some embodiments, the one or more processors may have stored therein processor-readable instructions that, when executed by the one or more processors, cause the one or more processors to determine whether spatial characteristics resemble a system point spread function based on the all solution outputs. In some embodiments, the one or more processors may have stored therein processor-readable instructions that, when executed by the one or more processors, cause the one or more processors to output at least one parameter that provides a representation of the estimated number of emitters. In some embodiments, the one or more processors may have stored therein processor-readable instructions that, when executed by the one or more processors, cause the one or more processors to estimate position of the number of emitters within the sample. In some embodiments, the one or more processors may have stored therein processor-readable instructions that, when executed by the one or more processors, cause the one or more processors to output a measurement that provides a three-dimensional coordinate representation of position of the number of emitters within the sample.

Such methods and systems may further enable a non-transitory processor-readable medium that implements aspects of the present disclosure. For example, a non-transitory processor-readable medium may include or comprise stored therein or thereon processor-readable instructions configured to cause one or more processors to receive video data of stationary blinking emitters. The non-transitory processor-readable medium may include or comprise stored therein or thereon processor-readable instructions configured to create a two-dimensional matrix from the video data, where each row is a time series of a particular pixel. The non-transitory processor-readable medium may include or comprise stored therein or thereon processor-readable instructions configured to perform blind source separation a plurality of times with a different assumed number of blinking emitters. The non-transitory processor-readable medium may include or comprise stored therein or thereon processor-readable instructions configured to examine at least one of spatial, temporal, and spectral characteristics of particular solutions. The non-transitory processor-readable medium may include or comprise stored therein or thereon processor-readable instructions configured to estimate a number of the stationary blinking emitters from the at least one of spatial, temporal, and spectral characteristics of particular solutions. The disclosure however is not so limited.

For example, in some embodiments, the processor-readable instructions may be configured to cause one or more processors to determine whether the spatial characteristics resemble a system point spread function based on the particular solutions. In some embodiments, the processor-readable instructions may be configured to cause one or more processors to output for display the estimated number of the stationary blinking emitters. In some embodiments, the processor-readable instructions may be configured to cause one or more processors to estimate position of the number of the stationary blinking emitters within a medium containing the number of the stationary blinking emitters. In some embodiments, the processor-readable instructions may be configured to further cause one or more processors to estimate angular orientation of the number of the stationary blinking emitters within a medium containing the number of the stationary blinking emitters.

Accordingly, imaging or measurement methods and systems may at least include methods and systems for finding the three-dimensional orientation and position of multiple dipole-like particles and single molecules, methods and systems for generating helical beams and helical spread functions, and methods and systems for super-resolution and super-localization of dense arrays of emitters.

Figure 32:
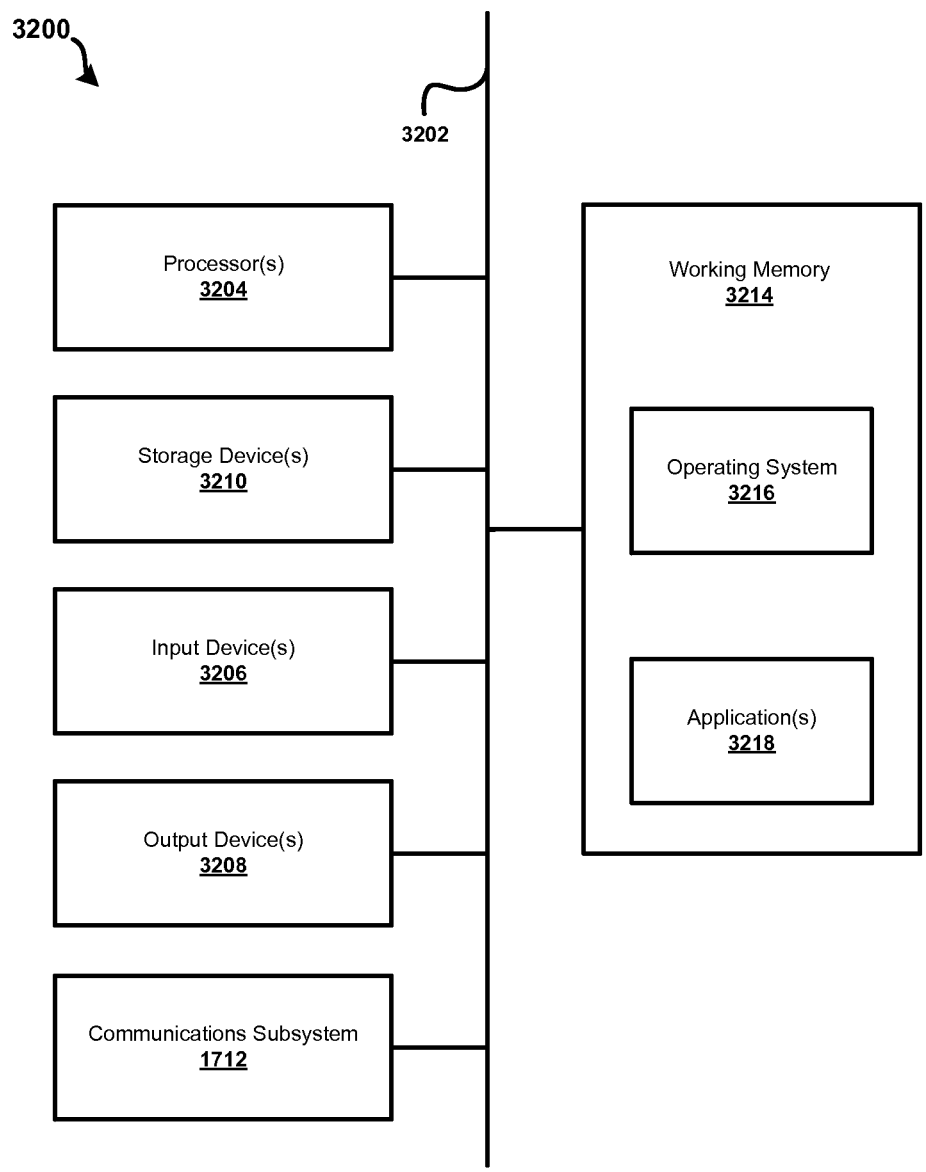
FIG. 32 shows an example computer system or device.

FIG. 32 shows an embodiment of an example computer system or device 3200 in accordance with the present disclosure. An example of a computer system or device includes a desktop computer, laptop computer, smartphone, and any other type machine configured for performing calculations. In particular, the example computer device 3200 may be configured to implement various imaging techniques, measurement techniques, and processing techniques or algorithms described in accordance with the present disclosure.

The computer device 3200 is shown comprising hardware elements that may be electrically coupled via a bus 3202 (or may otherwise be in communication, as appropriate). The hardware elements may include a processing unit with one or more processors 3204, including without limitation one or more general-purpose processors and/or one or more special-purpose processors (such as digital signal processing chips, graphics acceleration processors, and/or the like); one or more input devices 3206, which can include without limitation a remote control, a mouse, a keyboard, and/or the like; and one or more output devices 3208, which can include without limitation a presentation device (e.g., television), a printer, and/or the like.

The computer system 3200 may further include (and/or be in communication with) one or more non-transitory storage devices 3210, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 3200 might also include a communications subsystem 3212, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 3212 may permit data to be exchanged with a network (such as the network described below, to name one example), other computer systems, and/or any other devices described herein. In many embodiments, the computer system 3200 will further comprise a working memory 3214, which may include a random access memory and/or a read-only memory device, as described above.

The computer device 3200 also can comprise software elements, shown as being currently located within the working memory 3214, including an operating system 3216, device drivers, executable libraries, and/or other code, such as one or more application programs 3218, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 3210 described above. In some cases, the storage medium might be incorporated within a computer system, such as computer system 3200. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 3200 and/or might take the form of source and/or installable code, which, upon compilation and/or installation on the computer system 3200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 3200) to perform methods in accordance with various embodiments of the invention. According to a set of embodiments, some or all of the procedures of such methods are performed by the computer system 3200 in response to processor 3204 executing one or more sequences of one or more instructions (which might be incorporated into the operating system 3216 and/or other code, such as an application program 3218) contained in the working memory 3214. Such instructions may be read into the working memory 3214 from another computer-readable medium, such as one or more of the storage device(s) 3210. Merely by way of example, execution of the sequences of instructions contained in the working memory 3214 may cause the processor(s) 3204 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 3200, various computer-readable media might be involved in providing instructions/code to processor(s) 3204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 3210. Volatile media may include, without limitation, dynamic memory, such as the working memory 3214.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 3204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 3200.

The communications subsystem 3212 (and/or components thereof) generally will receive signals, and the bus 3202 then might carry the signals (and/or the data, instructions, etc. carried by the signals) to the working memory 3214, from which the processor(s) 3204 retrieves and executes the instructions. The instructions received by the working memory 3214 may optionally be stored on a non-transitory storage device 3210 either before or after execution by the processor(s) 3204.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Still further, different arrangements of the components depicted in the drawings or described above, as well as components and steps not shown or described are possible. Similarly, some features and sub-combinations are useful and may be employed without reference to other features and sub-combinations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   emitting, by a source of an optical system, an excitation beam;
   directing, through a lens of the optical system, the excitation beam to a medium containing a particle;
   directing, by one or more optical components of the optical system, at least a portion of a radiation pattern emitted by the particle in response to the excitation beam to a signal processing unit that includes a plurality of optical channels;
   introducing an engineered aberration into a first optical channel of the plurality of optical channels;
   imaging the at least the portion of the radiation pattern using the first optical channel to generate a first image;
   imaging the at least the portion of the radiation pattern using a second optical channel of the plurality of optical channels to generate a second image, wherein at least one of a position or an angular orientation of the particle within the medium is encoded in a combination of the first image and the second image; and
   estimating at least angular orientation of the particle within the medium based on both the first image and the second image.

2. The method of claim 1, wherein the estimating is based on an assumption that the radiation pattern is modeled as a dipole.

3. The method of claim 1, further comprising outputting a measurement that provides a three-dimensional coordinate representation of position of the particle within the medium.

4. The method of claim 1, further comprising outputting a measurement that provides a representation of the angular orientation of the particle within the medium.

5. The method of claim 1, wherein the engineered aberration comprises at least one of: a number of optical phase vortices; a number of phase screw dislocations, a double-helix point spread function (PSF), a multi-helix PSF, or a single-helix PSF.

6. The method of claim 1, wherein the at least the portion of the radiation pattern imaged in the first image and the at least the portion of the radiation pattern imaged in the second image have orthogonal linear polarization states.

7. The method of claim 1, wherein the at least the portion of the radiation pattern imaged in the first image and the at least the portion of the radiation pattern imaged in the second image have orthogonal elliptical polarization states.

8. The method of claim 1, wherein the imaging the at least the portion of the radiation pattern comprises imaging the at least the portion of the radiation pattern at a single particular focal plane.

9. The method of claim 1, wherein the imaging the at least the portion of the radiation pattern comprises imaging the at least the portion of the radiation pattern at a first focal plane and a second different focal plane.

10. The method of claim 1, further comprising modulating radiation emitted by the particle in at least one of spatial phase, temporal phase, amplitude, or polarization.

11. The method of claim 1, further comprising optimizing the engineered aberration for determination of the angular orientation of the particle or for determination of the angular orientation and a position of the particle.

12. The method of claim 11, wherein the optimizing comprises optimizing based on at least one of the following metrics: Cramer Rao lower bound, Fisher information, Sensitivity, Mutual information, Strehl Ratio, background, signal to noise ratio, position and effect of zeros of the optical transfer function energy efficiency, side lobes, peak to background, or uniformity in three dimensions.

13. The method of claim 1, further comprising determining the Green tensor response of the optical system for determination of the angular orientation of the particle or for determination of the angular orientation and a position of the particle in three dimensional space.

14. The method of claim 1, further comprising estimating a position of the particle in three dimensional space, wherein the particle is a single molecule.

15. The method of claim 1, wherein at least one of the one or more optical channels includes a specific mask to introduce the engineered aberration, the method further comprising optimizing the specific mask for determination of the angular orientation of the particle or for determination of the angular orientation and a position of the particle in three dimensional space.

16. The method of claim 1, wherein at least one of the one or more optical channels includes a specific mask to introduce the engineered aberration and wherein the specific mask comprises at least one of: a surface relief optical element, a phase mask, a diffractive optical element, a hologram, an amplitude mask, a graded index of refraction optical element, an apodization mask, a spatial light modulator, a reflective optical element, an artificial dielectric optical element, a lens, or a metamaterial optical element.

17. An imaging system, comprising:
a source arranged and configured to output an excitation beam that is directed through a lens of the imaging system to a sample containing at least one particle that emits a radiation pattern that is modeled as a dipole when impinged by the excitation beam;
one or more optical components arranged and configured to direct the radiation pattern to a signal processing unit; and
the signal processing unit arranged and configured to receive the radiation pattern, wherein the signal processing unit includes one or more optical channels and at least one of the one or more optical channels includes a sensor array arranged and configured to capture at least one image of at least a portion of the radiation pattern emitted by the at least one particle in response to impingement by the excitation beam;
a module to introduce a specific aberration into at least one of the one or more optical channels, wherein the module to introduce the specific aberration comprises at least one of a specific mask or a defocus module configured to defocus the system with respect to the at least one particle; and
at least one processing device coupled to the sensor array and configured to estimate and store in memory at least angular orientation of the at least one particle within the sample based on the at least one image;
wherein:
the at least one optical channel comprises a first optical channel;
the sensor array comprises a first sensor array;
the at least one image comprises at least a first image;
the at least one optical channel further includes a second optical channel;
the second optical channel includes a second sensor array arranged and configured to capture at least a second image of at least a portion of the radiation pattern emitted by the at least one particle in response to impingement by the excitation beam;
at least one of the position or the angular orientation of the at least one particle within the sample is encoded in a combination of the first image and the second image; and
the at least one processing device is further coupled to the second sensor array, wherein the at least one processing device is configured to estimate and store in memory at least angular orientation of the at least one particle within the sample based on both the first image and the second image.

18. The system of claim 17, further comprising at least one output device coupled to the at least one processing device and configured to output a measurement that provides a three dimensional coordinate representation of position of the at least one particle within the sample, and a measurement that provides an axis-angle representation of angular orientation of the at least one particle within the sample.

19. The system of claim 17, wherein the module to introduce the specific aberration comprises the specific mask and the specific mask comprises at least one of: a surface relief optical element, a phase mask, a diffractive optical element, a hologram, an amplitude mask, a graded index of refraction optical element, an apodization mask, a spatial light modulator, a reflective optical element, an artificial dielectric optical element, a lens, or a metamaterial optical element.

20. The system of claim 17, wherein the at least the portion of the radiation pattern captured in the first image and the at least the portion of the radiation pattern captured in the second image have orthogonal linear polarization states.

21. The system of claim 17, wherein the at least the portion of the radiation pattern captured in the first image and the at least the portion of the radiation pattern captured in the second image have orthogonal elliptical polarization states.

22. The system of claim 17, wherein the specific aberration is optimized for determination of the angular orientation of the at least one particle or for determination of the angular orientation and a position of the particle.

23. The system of claim 22, wherein the specific aberration is optimized based on at least one of Cramer Rao lower bound, Fisher information, Sensitivity, Mutual information, Strehl Ratio, background, signal to noise ratio, position and effect of zeros of the optical transfer function, energy efficiency, side lobes, peak to background, or uniformity in three dimensions.

24. The system of claim 17, wherein the module to introduce the specific aberration comprises a specific mask and wherein the specific mask is optimized for determination of the angular orientation of the at least one particle or for determination of the angular orientation and a position of the particle.

25. A computing system, comprising:
one or more processors; and
a memory communicatively coupled with and readable by the one or more processors and having stored therein processor-readable instructions that, when executed by the one or more processors, cause the one or more processors to perform or control performance of operations comprising:
emitting, by a source of an optical system, an excitation beam;
directing, through an objective lens of the optical system, the excitation beam to a medium containing a particle;
directing, by one or more optical components of the optical system, at least a portion of a radiation pattern emitted by the particle in response to the excitation beam to a signal processing unit that includes a plurality of optical channels;
introducing an engineered aberration into a first optical channel of the plurality of optical channels;
imaging the at least the portion of the radiation pattern using the first optical channel to generate a first image;
imaging the at least the portion of the radiation pattern using a second optical channel of the plurality of optical channels to generate a second image, wherein at least one of a position or an angular orientation of the particle within the medium is encoded in a combination of the first image and the second image; and
estimating at least angular orientation of the particle within the medium based on both the first image and the second image.

26. The computing system of claim 25, wherein introducing the engineered aberration into the first optical channel comprises defocusing the optical system.

27. The computing system of claim 25, wherein introducing the engineered aberration into the first optical channel comprises introducing, by an engineered mask, the engineered aberration into the first optical channel.

* * * * *